(12) United States Patent
Schechter et al.

(10) Patent No.: US 12,410,553 B2
(45) Date of Patent: ***Sep. 9, 2025

(54) ROBOTIC LAUNDRY SORTING DEVICES, SYSTEMS, AND METHODS OF USE

(71) Applicant: Monotony.ai, Inc., Watertown, MA (US)

(72) Inventors: Stuart E. Schechter, Newton, MA (US); Benjamin D. Bixby, Newton Highlands, MA (US); Samuel Duffley, Somerville, MA (US); Samuel M. Felton, Belmont, MA (US); Wilson J. Mefford, Watertown, MA (US); Elliot Sinclair Pennington, Lexington, MA (US); Ross O. Schlaikjer, Somerville, MA (US); Jesse Sielaff, Norfolk, MA (US); Gabriella McLellan, Brighton, MA (US); Marissa A. Bennett, Waltham, MA (US)

(73) Assignee: MONOTONY.AI, INC., Watertown, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/748,634

(22) Filed: Jun. 20, 2024

(65) Prior Publication Data

US 2024/0337065 A1      Oct. 10, 2024

Related U.S. Application Data

(63) Continuation of application No. 18/469,639, filed on Sep. 19, 2023, now Pat. No. 12,043,954, which is a
(Continued)

(51) Int. Cl.
*G06F 17/00* (2019.01)
*B07C 5/08* (2006.01)
(Continued)

(52) U.S. Cl.
CPC ............... *D06F 93/00* (2013.01); *B07C 5/08* (2013.01); *B07C 5/342* (2013.01); *B07C 5/36* (2013.01);
(Continued)

(58) Field of Classification Search
CPC ...... D06F 93/00; D06F 34/18; D06F 2103/06; B07C 5/08; B07C 5/342; B07C 5/36;
(Continued)

(56) References Cited

U.S. PATENT DOCUMENTS 4,036,365 A     7/1977    Rosenfeld
4,885,853 A    12/1989    Mccabe
(Continued)

FOREIGN PATENT DOCUMENTS

CN      103582728 A     2/2014
EP        0679755 A1   11/1995
(Continued)

OTHER PUBLICATIONS

The $1,000 laundry-folding robot is back and it's fine, I guess. (Year: 2019).*
(Continued)

*Primary Examiner* — Ronnie M Mancho
(74) *Attorney, Agent, or Firm* — MYERS BIGEL, P.A.

(57) ABSTRACT

Systems for autonomously batching a plurality of separated laundry articles into sorted loads for washing and drying are described. For example, each one of a plurality of collection bins is configured to receive a sorted load of separated articles including at least one common one of one or more washing and drying characteristics. A plurality of conveyors are configured to receive thereon the bins and position one bin into a loading position adjacent to an exit orifice of a sorting surface. At least one sensor disposed at least one of on, adjacent to, and within the surface is configured to detect
(Continued)

the washing and drying characteristics. A controller in operable communication with a drive of the plurality of conveyors and the at least one sensor is configured to instruct the conveyors to move the bins to batch each separated laundry article into a bin matching the washing and drying characteristics.

23 Claims, 57 Drawing Sheets

Related U.S. Application Data continuation of application No. 18/185,854, filed on Mar. 17, 2023, now Pat. No. 11,802,368, which is a continuation of application No. 17/503,902, filed on Oct. 18, 2021, now Pat. No. 11,643,769.

(60) Provisional application No. 63/093,236, filed on Oct. 18, 2020.

(51) Int. Cl.
| | |
|---|---|
| B07C 5/342 | (2006.01) |
| B07C 5/36 | (2006.01) |
| B25J 9/00 | (2006.01) |
| B25J 9/04 | (2006.01) |
| B25J 15/02 | (2006.01) |
| B25J 19/02 | (2006.01) |
| B25J 21/00 | (2006.01) |
| D06F 34/18 | (2020.01) |
| D06F 93/00 | (2006.01) |
| D06F 103/06 | (2020.01) |

(52) U.S. Cl.
CPC ............. *B25J 9/0084* (2013.01); *B25J 9/045* (2013.01); *B25J 15/0206* (2013.01); *B25J 19/021* (2013.01); *B25J 21/00* (2013.01); *D06F 34/18* (2020.02); *B07C 2501/0063* (2013.01); *D06F 2103/06* (2020.02); *G05B 2219/39469* (2013.01); *G05B 2219/40532* (2013.01)

(58) Field of Classification Search
CPC . B07C 2501/0063; B25J 9/0084; B25J 9/045; B25J 15/0206; B25J 19/021; B25J 21/00; B25J 15/0233; G05B 2219/39469; G05B 2219/40532
USPC .......................................... 206/606; 700/248
See application file for complete search history.

(56) References Cited

U.S. PATENT DOCUMENTS

| | | | |
|---|---|---|---|
| 5,595,467 A | 1/1997 | Jensen | |
| 6,089,810 A | 7/2000 | Heinz et al. | |
| 6,287,066 B1 | 9/2001 | Heinz et al. | |
| 6,618,968 B1 | 9/2003 | Nielsen | |
| 6,655,890 B1 | 12/2003 | Weir | |
| 6,826,856 B1 | 12/2004 | Mccabe | |
| 7,448,152 B2 | 11/2008 | Jensen et al. | |
| 9,789,508 B2 * | 10/2017 | Baumgartner | A61L 9/122 |
| 10,189,692 B2 | 1/2019 | High et al. | |
| 10,875,752 B2 | 12/2020 | High et al. | |
| 10,919,709 B2 | 2/2021 | Mattern et al. | |
| 11,053,620 B2 | 7/2021 | Alif | |
| 11,535,977 B2 | 12/2022 | Coney et al. | |
| 11,643,769 B2 * | 5/2023 | Schechter | B25J 9/0084 414/13 |
| 2002/0157190 A1 | 10/2002 | Imai et al. | |
| 2004/0105736 A1 | 6/2004 | Nielsen | |
| 2005/0012349 A1 | 1/2005 | Rauch et al. | |
| 2006/0191170 A1 | 8/2006 | Jensen et al. | |
| 2006/0191171 A1 | 8/2006 | Jensen et al. | |
| 2008/0149460 A1 | 6/2008 | Harris | |
| 2012/0046783 A1 | 2/2012 | Kechel | |
| 2012/0099947 A1 | 4/2012 | Heinz et al. | |
| 2012/0103029 A1 | 5/2012 | Darwin et al. | |
| 2012/0308339 A1 | 12/2012 | Mccabe | |
| 2014/0219732 A1 | 8/2014 | Thorpe | |
| 2015/0361610 A1 | 12/2015 | Yano | |
| 2016/0216712 A1 | 7/2016 | Baumgartner et al. | |
| 2017/0066003 A1 * | 3/2017 | Baumgartner | A61L 9/14 |
| 2019/0321984 A1 | 10/2019 | Yamazaki | |
| 2020/0042822 A1 | 2/2020 | Chae | |
| 2020/0332449 A1 | 10/2020 | Alif | |
| 2022/0098779 A1 | 3/2022 | Coney et al. | |
| 2022/0120030 A1 * | 4/2022 | Schechter | B25J 19/021 |
| 2023/0077460 A1 | 3/2023 | Hickman et al. | |
| 2023/0220611 A1 * | 7/2023 | Schechter | B25J 15/0233 |

FOREIGN PATENT DOCUMENTS

| | | | | |
|---|---|---|---|---|
| EP | 1498539 A1 | 1/2005 | | |
| EP | 2677078 A1 | 12/2013 | | |
| EP | 3280839 A1 | 2/2018 | | |
| GB | 1525491 A | 9/1978 | | |
| WO | 9713914 A1 | 4/1997 | | |
| WO | 02077355 A1 | 10/2002 | | |
| WO | 2017153511 A1 | 9/2017 | | |
| WO | 2017182309 A1 | 10/2017 | | |
| WO | 2019072751 A1 | 4/2019 | | |
| WO | 2020079125 A1 | 4/2020 | | |
| WO | 2021243073 A1 | 12/2021 | | |
| WO | WO-2022082101 A1 * | 4/2022 | | B07C 5/08 |

OTHER PUBLICATIONS

The laundry folding robot you've always wanted is coming next year (Year: 2023).*

International Search Report and Written Opinion corresponding to PCT/US2021/055412, Jan. 31, 2022, (12 pages).

Bell, Karissa, "The $1,000 laundry-folding robot is back and it's fine, I guess", Washable Middle East. Retrieved from: https://me.mashable.com/tech/1573/the-1000-laundry-folding-robot-is-back-and-its-fine-i-guess, Jan. 7, 2019, (11 pages).

Chicago CD, "The Heavy Duty Automatic Flatwork Separating System Cascade®", Bulletin #7560; available prior to filing, (4 pages).

Herbert Kannegiesser GMBH, "SmartLaundry with laundry Carts: The Success Story of the "Warener Waschfee"", Retrieved from: https://www.kannegiesser.com/global/en/company/breaking-news/article/smartlaundry-with-laundry-carts-the-success-story-of-the-warener-waschfee.html, Nov. 3, 2020, (1 page).

Inwatec, "Fully Automatic Sorting of Soiled Workwear", Youtube video retrieved from: https://www.youtube.com/watch?v=mfOcVpMNdHg, Feb. 16, 2018, (1 page).

Inwatec, "Line 3: Automatic Sorting", Retrieved from: https://inwatec.dk/products/line-3-automatic-sorting/; available as of filing date, (4 pages).

Inwatec, "Soiled Side Sorting of the Future: Robot, RFID, X-ray, Automatic Sorting", Youtube video retrieved from: https://www.youtube.com/watch?v=-oDMVnP_p8, Mar. 26, 2018, (1 page).

Paton, Scott, "Stepping Into the Future-AI in the Laundry", Retrieved from: https://laundryledger.com/the-future-of-ai-based-automation-in-the-laundry-industry/, Aug. 26, 2020, (3 pages).

Poe, Matt, "Artificial Intelligence: Future of Laundry Operations? (Part 1) Difference between artificial intelligence, automation", Retrieved from: https://americanlaundrynews.com/articles/artificial-intelligence-future-laundry-operations-part-1, Dec. 17, 2020, (2 pages).

Williams, Martyn, "The laundry folding robot you've always wanted is coming next year", PCWorld. Retrieved from: https://www.pcworld.com/article/410548/the-laundry-robot-youve-always-wanted-is-coming-next-year.html, Oct. 4, 2016, (4 pages).

* cited by examiner

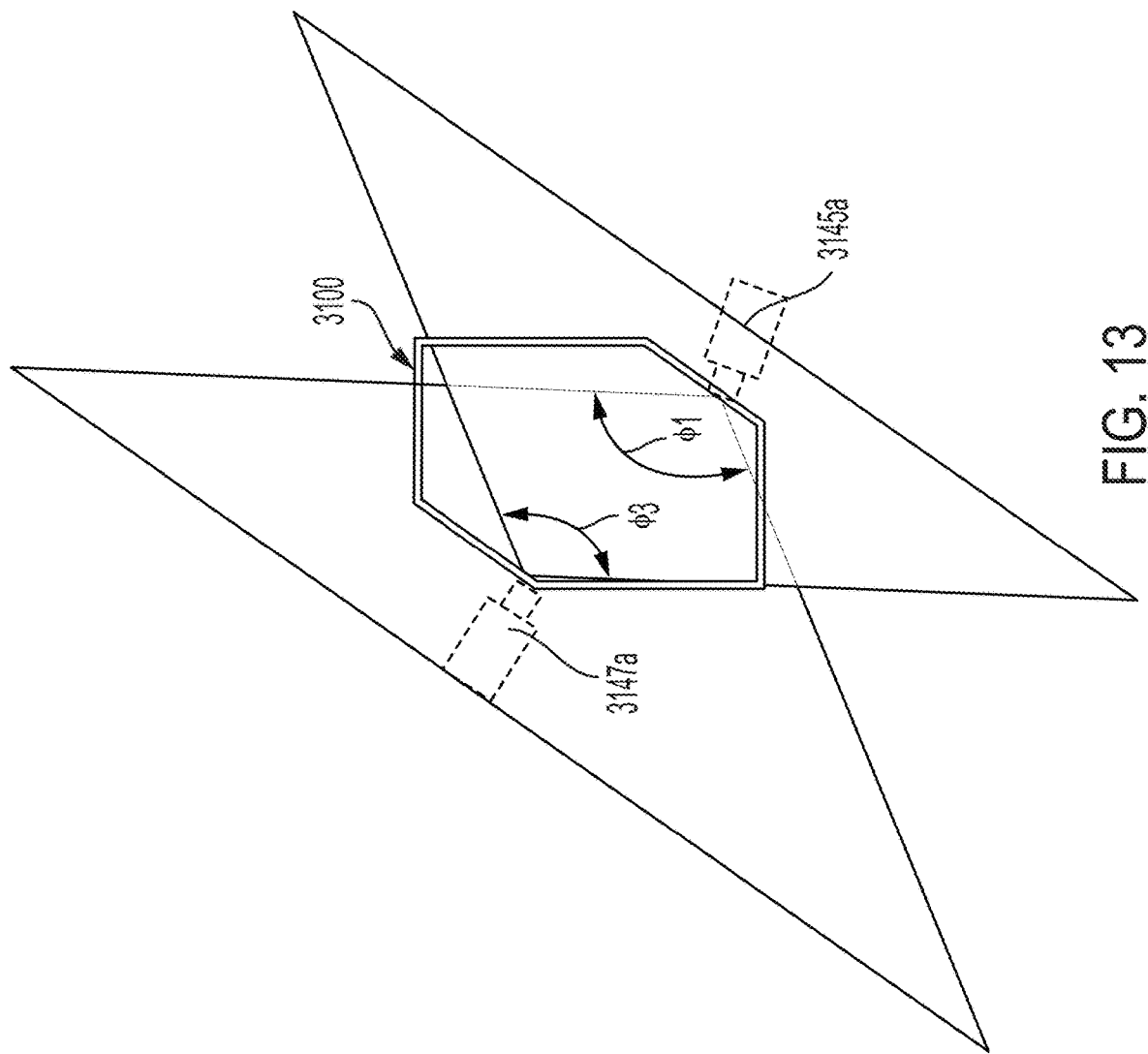

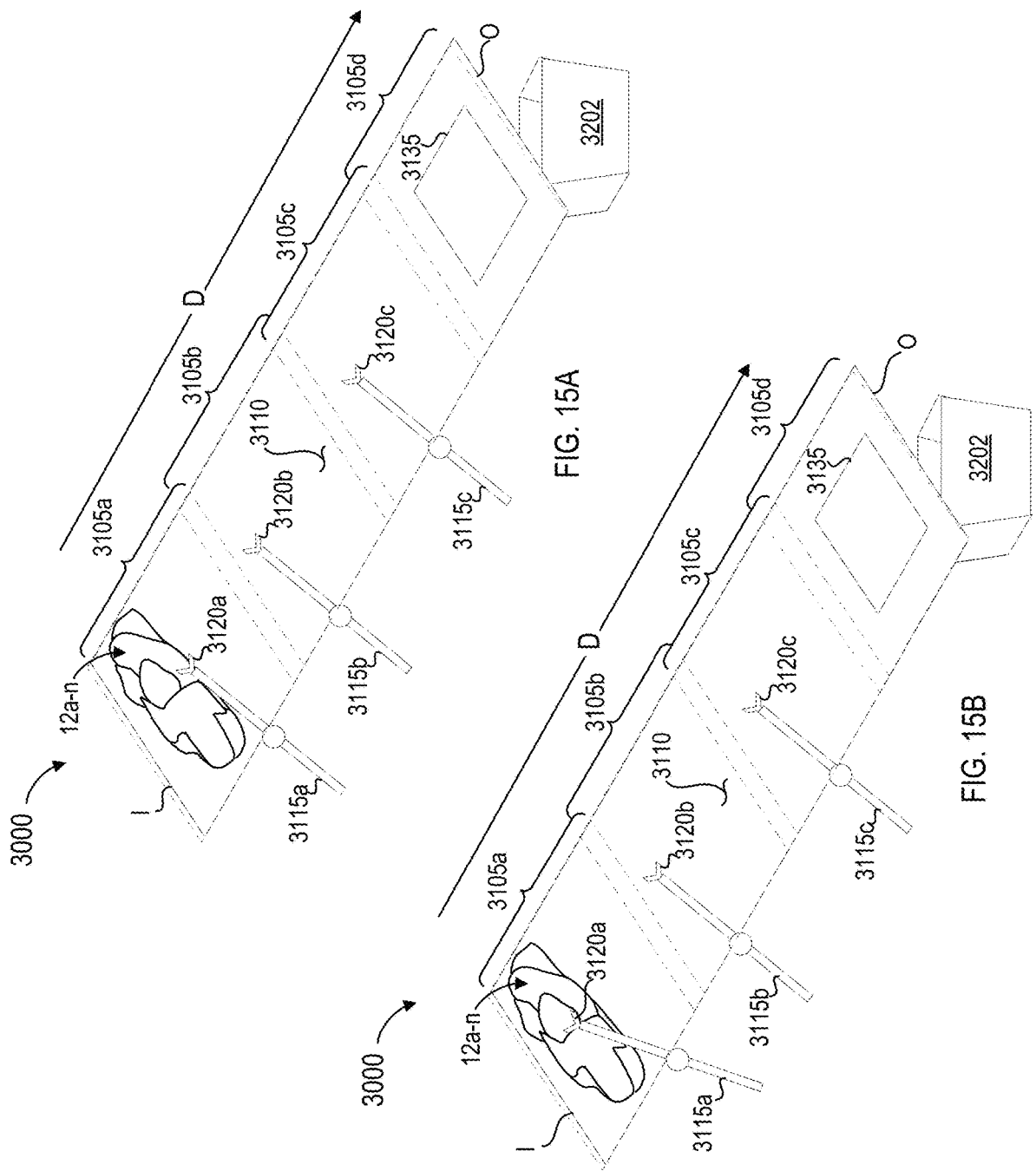

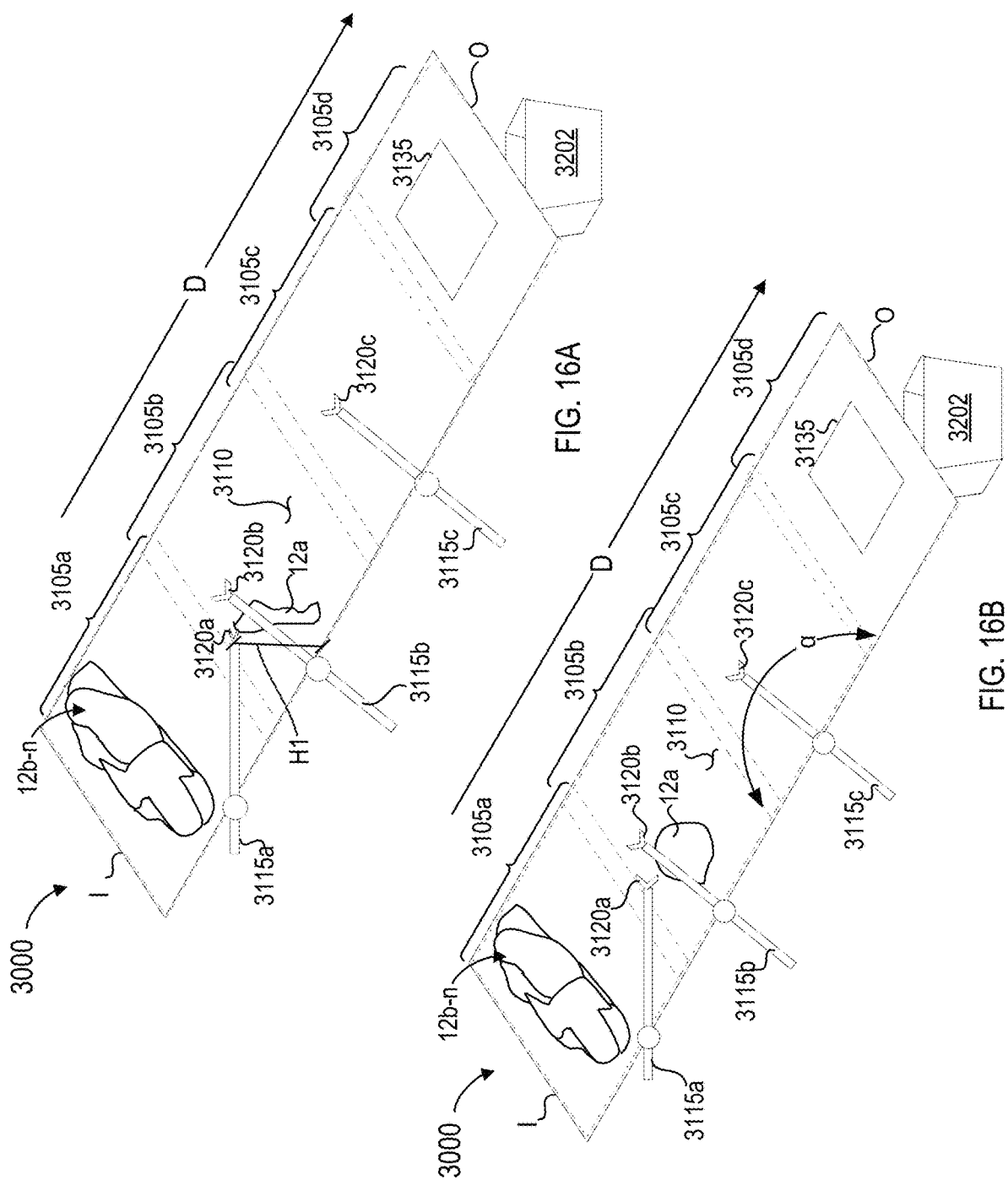

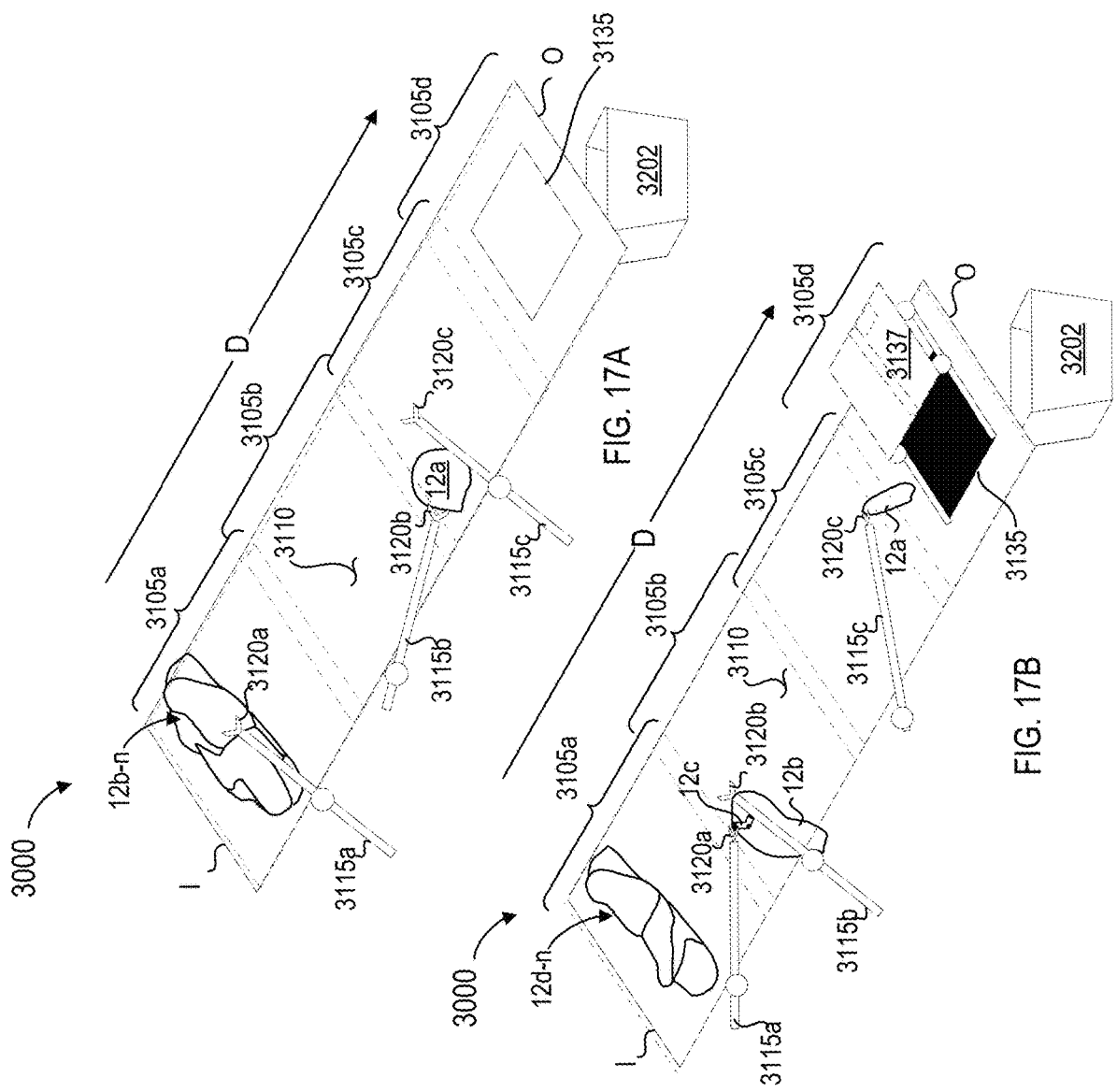

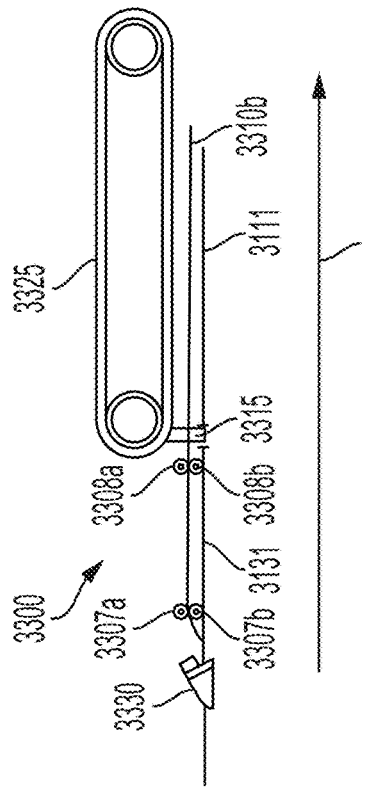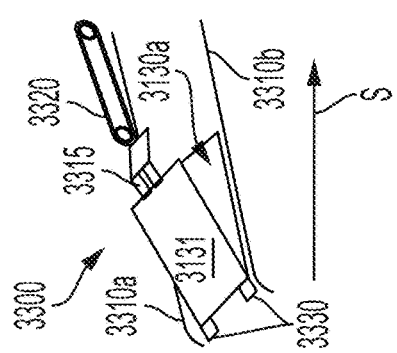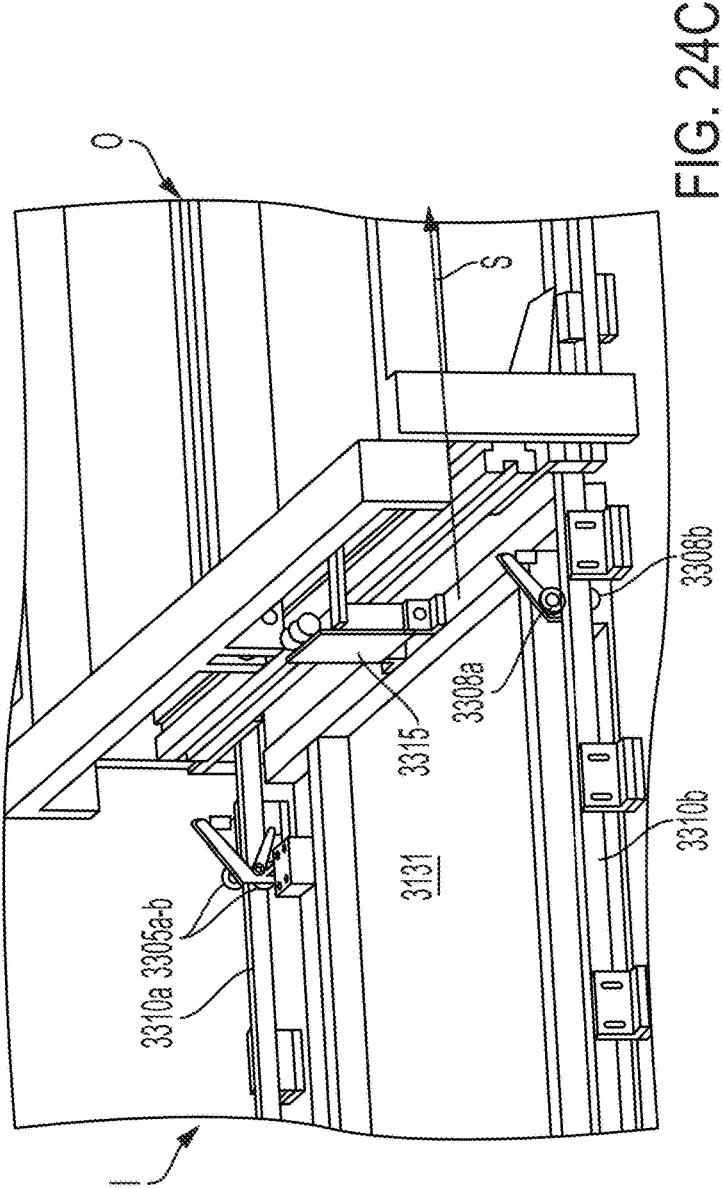
FIG. 24A
FIG. 24B
FIG. 24C

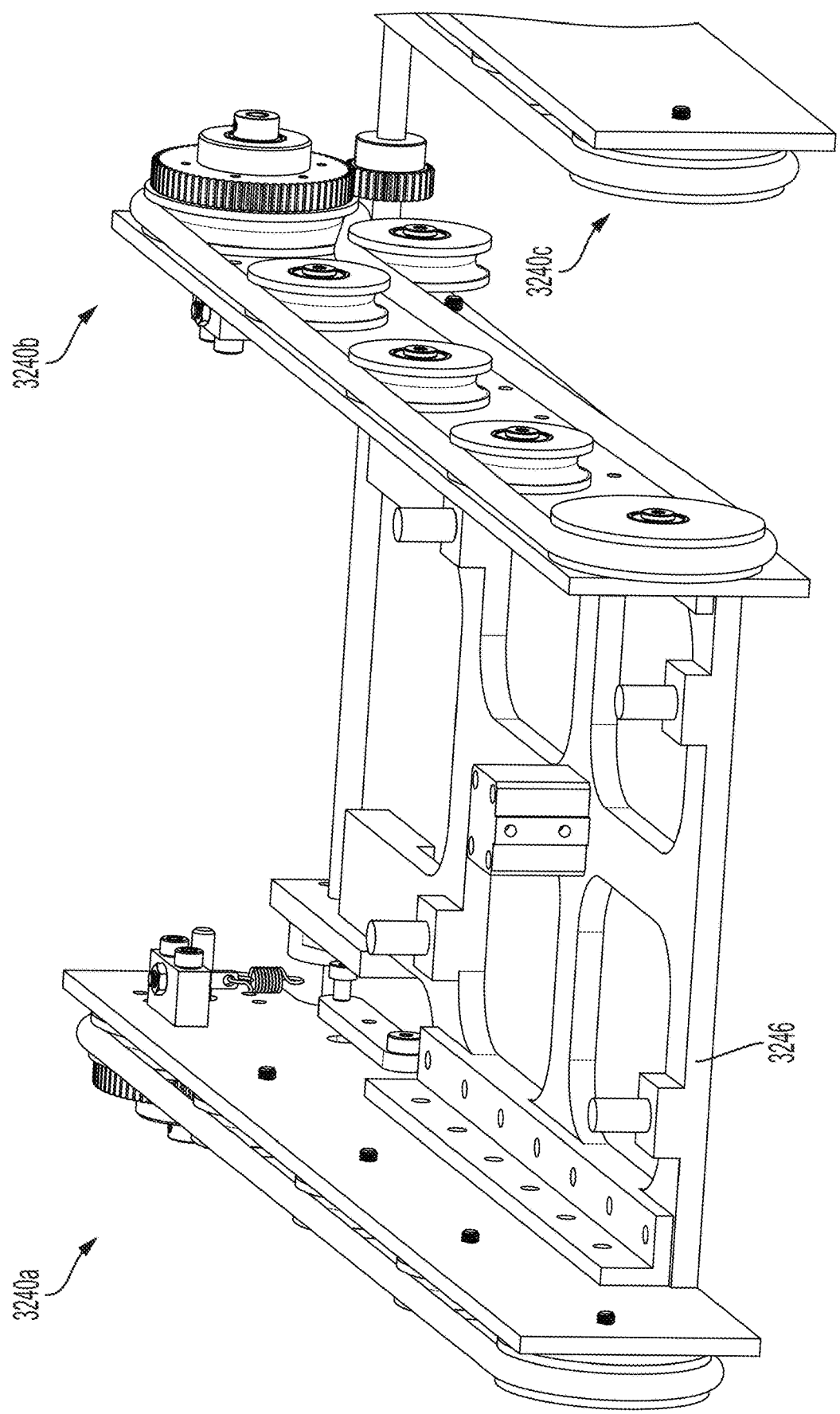

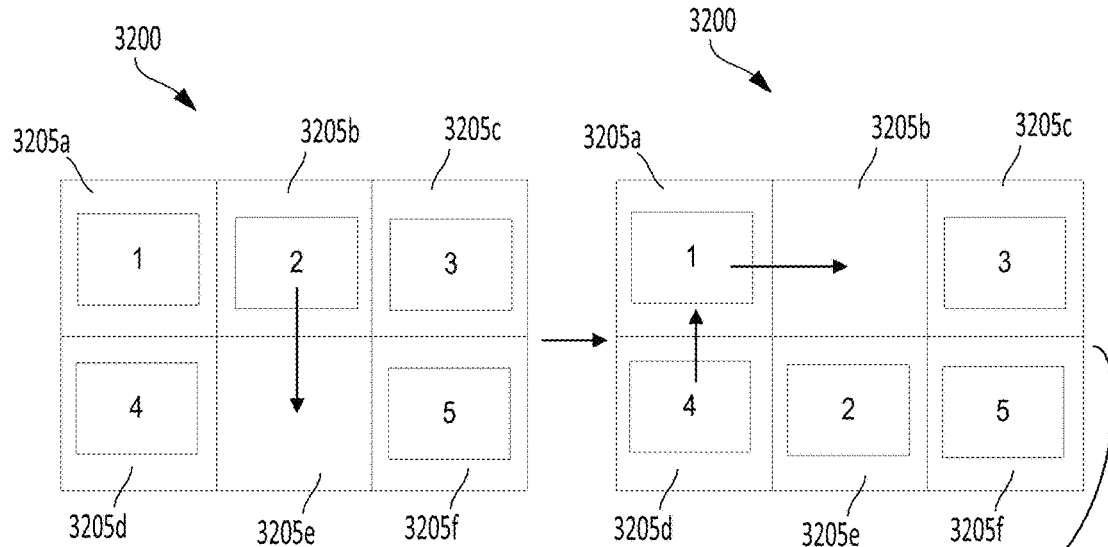
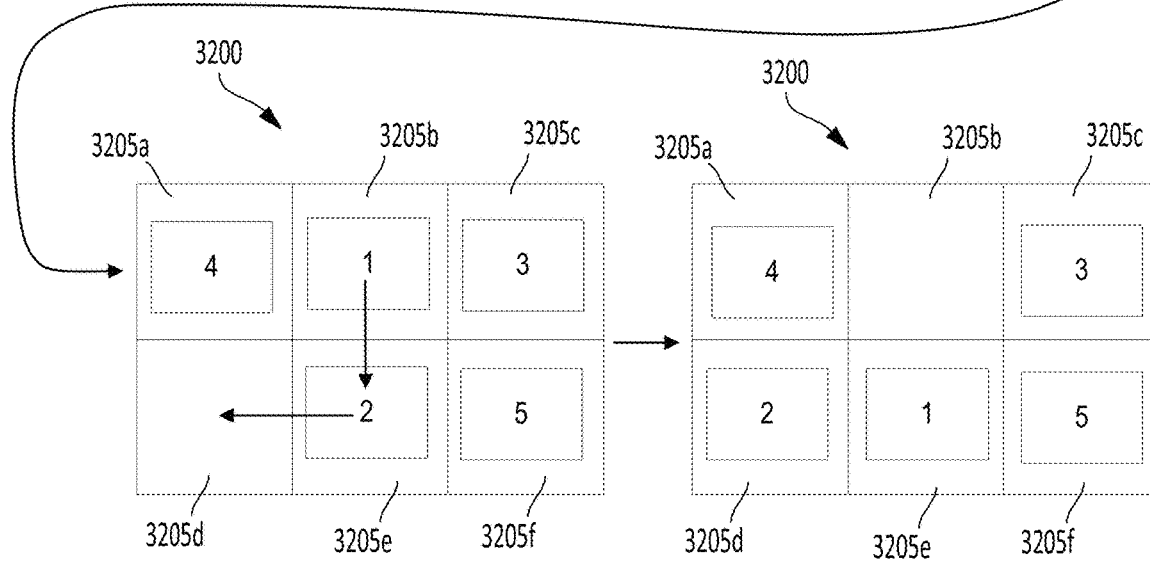
FIG. 57A  FIG. 57B  FIG. 57C  FIG. 57D

ROBOTIC LAUNDRY SORTING DEVICES, SYSTEMS, AND METHODS OF USE

CROSS-REFERENCE TO RELATED APPLICATIONS

This application is a continuation application of U.S. patent application Ser. No. 18/469,639 filed Sep. 19, 2023, titled, "Robotic Laundry Sorting Devices, Systems, and Methods of Use," which is a continuation application of U.S. patent application Ser. No. 18/185,854 filed Mar. 17, 2023, titled, "Robotic Laundry Sorting Devices, Systems, and Methods of Use," which is a continuation application of U.S. patent application Ser. No. 17/503,902 filed Oct. 18, 2021, titled, "Robotic Laundry Sorting Devices, Systems, and Methods of Use," which claims priority under 35 U.S.C. § 119 (e) to U.S. Provisional Patent Application Ser. No. 63/093,236 filed Oct. 18, 2020, titled "Robotic Laundry Sorting Devices, Systems, And Methods of Use," the entirety of which application is hereby incorporated by reference.

BACKGROUND

The present disclosure is directed to robotic laundry devices, systems, and methods.

Automating and outsourcing mundane, time-consuming household chores to robotic devices is increasingly common. Time saving home robots include, for example, floor vacuuming and floor washing robots. Outsourcing responsibilities include, for example, engaging grocery shopping and delivery services, and manually operated and human-operator dependent laundry washing and dry-cleaning pick up and return services.

Many homes are appointed with a dedicated washer and dryer for family use. Domestic washers and dryers are increasingly sophisticated and include IoT connectivity features and push notifications for alerting users about cycle progress and energy and resource usage. These technologically advanced machines, however, require human interaction and cannot eliminate the time required for processing loads of laundry in the home. Although more modern, "high efficiency" machines are equipped with sensors for metering water usage and dryer temperatures, the efficiency gains are capped by the constraints of sequentially processing single loads of laundry. Grey water is output to the city water and sewer system for mitigation with each load of laundry processed. Energy is consumed with each load of laundry washed and dried.

Households can outsource laundry chores to gig worker services and/or laundromat facilities for a fee in exchange for time. Laundromats and gig services offering residential mixed load laundering services, however, require human interaction for intake and sorting of dirty laundry, transferring loads from washer to dryer, and then manually folding clean laundry. These are costly processes as measured in time, energy consumption, water consumption, and wastewater output, and they rely on human intervention to keep the process running at every transition and throughout several process steps. This invites delays at every stage. Because these processes are human-dependent and inefficient, the costs are passed along to customers outsourcing their laundry for cleaning. Human-reliant laundering services also require that employees touch the belongings of the customer, potentially exposing the employee to contaminants in the dirty laundry and potentially exposing the clean laundry to transferable pathogens, dust, hair, and other debris emanating from a laundromat employee. In addition to potentially introducing undesirable contact contamination from the employees processing the loads of laundry, a privacy barrier is breached. Outsourcing household laundry to a laundromat or gig economy worker involves employees interacting with customers' personal belongings including bodily worn garments.

Industrial laundry services exist for handling uniform, batched business-related items, such as batches of hospital or hotel bed sheets, batches of medical scrubs, and batches of hotel towels, each batch having consistent characteristics between and within loads for determining expectedly consistent washing and drying processes. Such industrial machines are tailor-made to accept one type of laundry item of one size or style. For example, unique folding machines exist to accept a dedicated one of washed flat sheets, fitted sheets, hotel towels, and hotel bathrobes. These machines require human operators to load the washed article into its dedicated machine, which is sized and designed to fold that one type and size of article. This type of process line relies on a human operator for properly aligning and loading the clean article into the machine, which could introduce bodily contaminants, bacteria, and viral matter into the clean articles. Like laundromat services and gig workers washing in their home appliances, these industrial services rely on human intervention and potentially introduce bio-contaminants into clean loads of laundry. Because these services are only profitable by processing large volumes of like items, these industrial processors are generally subscription-based services for large clients like hotels and hospitals producing standard-size, repeat laundry articles and are not available to consumers at an individual household level. Additionally, these services are configured to combine laundry from more than one source and are not configured to isolate and process separate loads for individual households.

Autonomous robotic devices are provided to process loads of household laundry. Such devices eliminate human contact with deformable laundry articles. As such, the devices need to be designed to be efficient and reliable for replacing the common, human-dependent chore of laundry.

SUMMARY

In one example, an autonomous sorting device for separating and sorting a plurality of amassed deformable articles includes an enclosed channel, a plurality of arms, an inlet orifice, an outlet orifice, at least one sensor, and a controller. The enclosed channel includes a plurality of sequential work volumes and a stationary floor extending between an inlet end and an outlet end of the channel. A portion of the stationary floor is within a first work volume of the plurality of sequential work volumes being configured to receive thereon the plurality of deformable articles adjacent the inlet end. The plurality of arms are disposed in series along the enclosed channel. Each one of the plurality of arms includes an actuatable terminal gripper configured to selectively grasp at least one of the plurality of deformable articles and at least one drive configured to at least one of rotate, tilt, extend, and retract the terminal gripper, each of the plurality of arms being associated with one of the plurality of sequential work volumes. The inlet orifice is disposed in at least one of a ceiling and a wall of the enclosed channel, and the plurality of deformable articles are received into the enclosed channel through the inlet orifice. The outlet orifice is disposed adjacent the outlet end in at least one of a wall of the enclosed channel and the stationary floor, each one of the plurality of deformable articles exiting the enclosed channel through the outlet orifice. The at least one sensor is disposed at least one of on, adjacent to, and within one or more of the plurality of sequential work volumes. The at least one sensor is configured to detect at least one of the plurality of deformable articles disposed within at least one of the plurality of sequential work volumes, and output a signal indicative of at least one of the presence and location of the at least one of the plurality of deformable articles relative to the terminal gripper of one of the plurality of arms associated with the at least one of the plurality of sequential work volumes within which that at least one of the plurality of deformable articles is detected. The controller is in operable communication with the at least one drive and the at least one sensor. The controller is configured to receive a signal from the at least one sensor indicative of detecting at least one of the plurality of deformable articles being disposed within at least one of the plurality of sequential work volumes. The controller is configured to determine a location of the at least one of the plurality of deformable articles on the stationary floor relative to an arm associated with one of the plurality of sequential work volumes within which the at least one of the plurality of deformable articles is detected. The controller is configured to instruct the at least one drive to position a terminal gripper to grasp the at least one of the plurality of deformable articles, the terminal gripper being disposed on the arm associated with the at least one of the plurality of sequential work volumes within which the at least one of the plurality of deformable articles is detected. The controller is configured to instruct an actuator of the terminal gripper to close on the at least one of the plurality of deformable articles, instruct the at least one drive to raise the closed terminal gripper of the associated arm and the grasped at least one of the plurality of deformable articles to a hoist height above the stationary floor and rotate toward the outlet end into an adjacent work volume, instruct the actuator of the terminal gripper to open the gripper to release the at least one of the plurality of deformable articles in the adjacent work volume, receive a signal from the at least one sensor configured to detect the released at least one of the plurality of deformable articles within the adjacent work volumes, and determine, based on the received signal, a state including at least one of: one or more of the plurality of deformable articles are present on the stationary floor, none of the plurality of deformable articles are present on the stationary floor, and one of the plurality of deformable laundry articles exited the enclosed channel through the outlet orifice.

Implementations of the device may include one or more of the following features.

In examples, the plurality of deformable articles are non-uniform.

In examples, the plurality of sequential work volumes includes three or more work volumes.

In examples, the outlet orifice is disposed in a last work volume of the plurality of sequential work volumes, the last work volume being adjacent the outlet end.

In examples, the outlet orifice is disposed in the stationary floor of a last of the plurality of sequential work volumes.

In examples, a number of work volumes including the plurality of sequential work volumes is one greater than the number of the plurality of arms and each of the plurality of arms is associated with a work volume directly adjacent at least one other work volume associated with one of the plurality of arms.

In examples, the plurality of sequential work volumes includes three or more work volumes and the plurality of arms includes three or more arms, each of the three or more arms being associated with one of the three or more work volumes.

In examples, the plurality of sequential work volumes includes three or more work volumes and an outlet-facing end of each of the three or more work volumes overlaps with an inlet-facing end of an adjacent sequential one of the three or more work volumes such that each arm of the plurality of arms is configured to extend into one or more adjacent work volumes of the plurality of sequential work volumes.

In examples, the controller is further configured to, based on determining one or more deformable articles are present on the stationary floor in the adjacent work volume, iteratively determine a location of the at least one of the plurality of deformable articles on the stationary floor relative to an arm associated with the adjacent work volume, instruct the at least one drive of the arm associated with the adjacent work volume to position the terminal gripper of the arm associated with the adjacent work volume at the determined location to grasp the at least one of the plurality of deformable articles, instruct an actuator of the terminal gripper of the arm associated with the adjacent work volume to close on the at least one of the plurality of deformable articles, instruct the at least one drive to raise the closed terminal gripper of the arm associated with the adjacent work volume and the grasped at least one of the plurality of deformable articles to a hoist height above the stationary floor and rotate toward the outlet end into a next sequential adjacent work volume of the three or more work volumes, instruct the actuator of the terminal gripper to open the gripper to release the at least one of the plurality of deformable articles in the next sequential adjacent work volume, receive a signal from the at least one sensor configured to detect the at least one of the plurality of deformable articles, and determine, based on the received signal, a state including at least one of the following conditions: one or more of the plurality of deformable articles are present on the stationary floor, none of the plurality of deformable articles are present on the stationary floor, and one of the plurality of deformable articles exited the enclosed channel through the outlet orifice. In examples, the controller is configured to stop iterating when the plurality of deformable articles exits the enclosed channel through the outlet orifice as solitary deformable articles.

In examples, the controller is further configured to instruct two or more of the plurality of arms to operate simultaneously within each associated one of the plurality of sequential work volumes. The terminal grippers of the two or more of the plurality of arms operating simultaneously can simultaneously grasp at least one of the plurality of deformable articles.

In examples, the controller is further configured to, based on determining none of the plurality of deformable articles are present on the stationary floor in the adjacent work volume, receive a signal from the at least one sensor indicative of at least one of the plurality of deformable articles remaining disposed within the one of the plurality of sequential work volumes preceding the adjacent work volume, determine a location of the at least one of the plurality of deformable articles on the stationary floor relative to the associated arm, instruct the at least one drive to position the terminal gripper of the associated arm at the determined location to grasp the at least one of the plurality of deformable articles, instruct an actuator of the terminal gripper of the associated arm to close on the at least one of the plurality of deformable articles, instruct the at least one drive to raise the closed terminal gripper of the associated arm and the grasped at least one of the plurality of deformable articles to a hoist height above the stationary floor and rotate toward the outlet end into the adjacent work volume, instruct the actuator of the terminal gripper to open the gripper to release the at least one of the plurality of deformable articles in the adjacent work volume, and determine, based on the received signal, a state including at least one of the following conditions: one or more of the plurality of deformable articles are present on the stationary floor, none of the plurality of deformable articles are present on the stationary floor, and one of the plurality of deformable articles exited the enclosed channel through the outlet orifice.

In examples, the enclosed channel is fully enclosed on all sides and at the inlet and outlet ends. The inlet orifice and outlet orifice can each further include an actuated covering for selectively exposing and sealing each of the orifices, the controller being in operative communication with the actuation of each covering.

In examples, the stationary floor includes a substantially level surface from the inlet end to the outlet end. The stationary floor can include a substantially continuous surface throughout all of the plurality of sequential work volumes.

In examples, the enclosed channel is raised.

In examples, the one or more bins are configured to be disposed beneath the stationary floor, each of the one or more bins being configured to receive one or more of the plurality of deformable articles having one or more characteristics associated with at least one of the one or more bins. One of the one or more bins (e.g., sorting bins) can be disposed beneath the exit orifice for receiving each one of the plurality of deformable articles exiting the enclosed channel individually.

In examples, each of the one or more bins includes an identification marker for associating an identity of the bin. The one or more characteristics can include at least one of color, size, material composition, article type, degree of dirtiness, and fabric heat tolerance. The device can include an actuated carousel in operable communication with the controller, the actuated carousel being configured to receive thereon the one or more bins and rotate the one or more bins beneath the enclosed channel to match a characteristic of one of the one or more bins positioned beneath the outlet orifice with the one or more characteristics of each one of the plurality of deformable articles exiting the enclosed channel. In examples, the identification marker includes at least one of a machine-readable serial number, a bar code, a machine-readable QR code, an RFID code, NFC tag, a WIFI enabled tag, a ZIGBEE enabled tag, and an active radio telemetry system. A memory in communication with the controller can be configured to store at least one relation including one of the one or more characteristics associated with the bin, the bin identification marker for each of the one or more bins, and a customer identity shared by the plurality of deformable articles received into the enclosed channel.

In examples, the controller is in communication with a communication network and a remote terminal in communication with the communication network is configured to receive a customer input including the one or more characteristics associated with the plurality of deformable articles.

In examples the at least one sensor is configured to detect the one or more characteristics of each one of the plurality of deformable articles and output a signal to the controller including the detected one or more characteristics. The at least one sensor can include at least one of a 3-D camera, an IR sensor, a 2-D camera, LIDAR, LADAR, a sonar proximity sensor, an ultrasonic ranging sensor, a radar sensor, a pair of stereo depth cameras, and a spectrometer. In examples, the at least one sensors outputs at least one of depth map, RGB images, and IR images. The at least one sensor can be configured to output 3-D image data to the controller. The at least one sensor are configured to output one or more 2-D images to the controller. In examples, the at least one sensor is a camera, and the camera is calibrated to the floor of the enclosed channel and one or more of the plurality of arms.

In examples, the controller is further configured to determine, based on a comparison of a received output signal of the at least one sensor to data stored in a memory in communication with the controller, at least one of an article type, an article color, an article size, and an article fabric. At least one of the at least one sensor is a 2-D camera and the data associated with repositioned deformable laundry article is size invariant image data. The memory can further include a neural network and determining the one or more characteristics of each one of the plurality of deformable articles includes processing the received output signal of the at least one sensor of each of the plurality of work volumes with a neural network classifier.

In examples, the controller is further configured to receive an output signal including an image, determine, based on the output signal, a number of pixels in each of an upper half and a lower half of the image, the number of pixels being representative of at least one deformable article being grasped by a terminal gripper and held at a hoist height, and determine based on the number of pixels in the lower half of the image exceeding a preset threshold that the at least one deformable article is a large sized article.

In examples, the controller is further configured to receive an output signal including an image of a deformable article in the enclosed channel, determine, based on the output signal and a calibrated coordinate space, where in the calibrated coordinate space each pixels of the image lies, and determine at least one of a location, shape, and size of the deformable article. In examples, the at least one sensor is a camera and the camera is calibrated to the floor of the enclosed channel and one or more of the plurality of arms.

In examples, the controller is further configured to determine, based on receiving a signal from the at least one sensor disposed within at least one of the plurality of sequential work volumes, that none of the plurality of deformable articles remain on the stationary floor in any of the plurality of sequential work volumes. Upon determining that none of the plurality of deformable articles remain on the stationary floor in any of the plurality of sequential work volumes, the controller is further configured to instruct an actuator of the carousel to transit the one or more bins of the sorted plurality of deformable articles to one or more autonomous combination washing and drying machines.

In examples, a retractable cleaner is configured to advance through the enclosed channel from the inlet end to the outlet end while cleaning one or more interior surfaces. The retractable cleaner can form the inlet wall of the enclosed channel in a fully retracted position. In implementations, the retractable cleaner includes a planar profile contoured and fitted to a cross sectional profile of the enclosed channel. The retractable cleaner includes an actuatable cleaning drive in operable communication with the controller. Upon determining that none of the plurality of articles remain on the stationary floor in any of the sequential work volumes, the controller is configured to instruct the retractable cleaner to advance from the inlet end to the outlet end of the enclosed channel. The controller can be configured to instruct the plurality of arms to retract from their associated work volumes prior to the retractable cleaner advancing through the plurality of work volumes such that only the terminal gripper of each of the plurality of arms remains within an associated work volume. The retractable cleaner can include a slot configured to pass over and clean the terminal gripper.

In examples, one or more UV lights are in operable communication with the controller. The one or more UV lights illuminate the one or more sequential work volumes of the enclosed channel after the retractable cleaner advances to the outlet end and retracts to the inlet end. The one or more UV lights can be disposed on an interior surface of the enclosed channel. The controller can be further configured to instruct the plurality of arms fully extend into the enclosed channel before the one or more UV lights are illuminated.

In examples, the retractable cleaner further includes one or more wheels extending from a face of the retractable cleaner for guiding motion of the retractable cleaner along one or more interior surfaces of the enclosed channel.

In examples, the retractable cleaner further includes a plurality of spray ports disposed along a continuous outer surface of the retractable cleaner facing the one or more interior surfaces of the enclosed channel. A service line can be in fluid communication with the plurality of spray ports. The service line can be configured to provide a cleaning fluid for application to the one or more interior surfaces via the plurality of ports. The cleaning fluid includes at least one of steam, water, detergent, germicide, and pesticide. The service line can further include at least one of a vacuum line and a power conduit.

In examples, the retractable cleaner further includes a plurality of evacuation ports disposed along the continuous outer surface of the retractable cleaner facing the one or more interior surfaces of the enclosed channel. The plurality of evacuation ports can be in operative communication with the vacuum line for suctioning remaining moisture from the one or more interior surfaces of the enclosed channel upon advancement of the retractable cleaner through the enclosed channel.

In examples, the retractable cleaner includes a squeegee on a trailing edge of the continuous outer surface of the retractable cleaner facing the one or more interior surfaces of the enclosed channel.

In examples, the device further includes at least one fill sensor in communication with the controller. The at least one fill sensor is configured to detect an occupied volume of the one or more bins. The at least one fill sensor can be an optical sensor configured to detect a minimum threshold fill line and a maximum threshold fill line disposed on an interior surface of one of the one or more bins positioned beneath the exit orifice. The fill sensor can be configured to detect whether the of one or more of the plurality of deformable articles received in the one of the one or more bins reaches or surpasses the minimum threshold fill line. In examples, the maximum threshold fill line is a top edge of the one of the one or more bins, and the fill sensor is configured to output a signal indicative of the occupied volume of the one of the one or more bins being with a threshold range between the minimum threshold fill line and maximum threshold fill line. Upon determining an occupied volume of the one of the one or more bins is within a threshold range indicative of being filled, the controller is further configured to instruct the carousel to unload the filled one of the one or more bins containing the sorted plurality of deformable articles to an autonomous combination washing and drying machine.

In examples, the at least one fill sensor is a weight sensor disposed beneath the one of the one or more bins positioned beneath the exit orifice and configured to detect whether the weight of the one of the one or more bins reaches or surpasses a minimum threshold weight indicative of a bin full condition. The weight sensor can be a scale.

In examples, the at least one fill sensor is configured to output a signal indicative of a bin full condition. Upon determining a bin full condition, the controller is further configured to instruct the carousel to unload the filled one of the one or more bins containing the sorted plurality of deformable articles to an autonomous combination washing and drying machine.

In examples, the plurality of deformable articles includes one or more loads of dirty household laundry. The plurality of deformable articles can include two or more article types of at least one of different sizes, different shapes, different colors, and different fabrics.

In examples, the device further includes an actuated outlet door in operable communication with the controller. The controller can be further configured to receive a signal from the at least one sensor indicative of the presence of a deformable article above the outlet orifice, and actuate the outlet door to reveal the outlet orifice when a deformable article is positioned above the outlet orifice for exiting the channel.

In examples, the inlet orifice is disposed in ceiling of the enclosed channel. The device further includes an actuatable inlet door in operable communication with the controller. The actuatable inlet door is configured to selectively seal and expose the inlet orifice. Upon alignment of a sealed container containing the plurality deformable articles above the inlet orifice, the controller is further configured to actuate the inlet door to reveal the inlet orifice. In examples, the device further includes a pair of rotatable clamps configured to engage the container and rotate the container to an inverted position for dropping the plurality of deformable articles onto the stationary floor of the enclosed channel. A hinged lid of the sealed container can be configured to open into the inlet orifice upon rotation to an inverted position.

In examples, the plurality of arms of the device each further include a rod configured to extend from an anchor at corresponding individually anchored positions. The rod includes a fully extended length of between about 0.25 m and 4 m. The anchor includes at least one drive, and the at least one drive includes a pan drive, a tilt drive, and an extend drive. The controller can be further configured to drive the at least one drive in at least one of alternating side-to-side and alternating up and down motions to shake a grasped deformable article of the plurality of deformable articles at the hoist height.

In examples, each one of the plurality of arms includes between one and three degrees of freedom.

In examples, each one of the plurality of arms includes at least one compliant joint. The at least one compliant joint can include a compliant wrist disposed between the extendable rod and the terminal gripper.

In examples, the terminal gripper of each of the plurality of arms includes at least two actuatable fingers. The at least two actuatable fingers can include an overmold including a durometer of between about 40 A to 80 A.

In examples, the terminal gripper of each of the plurality of arms is at least one of cable driven and pneumatically driven, and an actuator of each terminal gripper is in operable communication with the controller.

In examples, the device further includes a wrist disposed between each of the plurality of arms and an associated terminal gripper. The wrist includes one or more sensors configured to detect forces applied to the terminal gripper.

In examples, each anchor is disposed on a base outside the enclosed channel and the associated one of the plurality of arms disposed on the base extends through a side wall of the enclosed channel. The device can further include a plurality of openings in a sidewall of the enclosed channel, each of the plurality of openings being configured to receive a rod of each one of the plurality of arms therethrough and a seal disposed about each of the plurality of openings through which the rod of each one of the plurality of arms extends. The seal can include and/or be manufactured from a flexible material configured to stretch as the rod extends, pans, tilts, and retracts. The seal can be pleated and compressible. The seal can be configured to enable the rod to retract so that only the terminal gripper remains exposed within the enclosed channel. The flexible material can include at least one of NEOPRENE, vinyl, rubber, plastic, leather, urethane, silicone, and elastane (SPANDEX).

In examples, a plurality anchors each associated with the plurality of arms are disposed on at least one of a wall, the stationary floor, and the ceiling of the enclosed channel.

In examples, the hoist height is a predetermined hoist height. The predetermined hoist height can include a range of between about 0.5 to 4 m above the stationary floor.

In examples, the device further includes one or more weight sensors disposed on each of the plurality of arms. The one or more weight sensor are in operative communication with the controller and configured to continuously detect a rate of change as each one of the plurality of deformable laundry articles is raised. The controller is configured to determine each one of the plurality of deformable laundry articles is raised to a hoist height when the one or more weight sensors detect an unchanging rate of change of measured weight.

In examples, the at least one sensor of the device includes at least one of a 3-D camera, an IR sensor, a 2-D camera, LIDAR, LADAR, a sonar proximity sensor, an ultrasonic ranging sensor, a radar sensor, and a pair of stereo depth cameras. The at least one sensor can output to the controller at least one of a depth map, RGB images, and IR images. The at least one sensor can be configured to output 3-D image data to the controller. Additionally or alternatively, the at least one sensor can be configured to output one or more 2-D images to the controller. In examples, the at least one sensor is a camera and the camera is calibrated to the floor of the enclosed channel and one or more of the plurality of arms.

In examples, determining a location of the at least one of the plurality of deformable articles on the stationary floor further includes determining one or more grip points on the at least one of the plurality of deformable articles. In examples, the one or more grip points are disposed on a high point of the at least one of the plurality of deformable articles. Additionally or alternatively, the one or more grip points are disposed on an edge of the at least one of the plurality of deformable articles.

In examples, the at least one sensor is disposed outside the enclosed channel above one or more of the plurality of sequential work volumes.

In examples, the at least one sensor is disposed adjacent a transparent window in a ceiling of the enclosed channel and includes a field of view encompassing the associated work volume.

In examples, the at least one sensor is disposed within the enclosed channel adjacent one of the plurality of arms and includes a field of view encompassing the work volume associated with the adjacent one of the plurality of arms.

In one example, a method of robotically sorting a plurality of deformable laundry articles into loads for washing includes receiving, at a controller, a signal from at least one sensor disposed at least one of on, adjacent to, and within one or more of a plurality of sequential work volumes, the signal being indicative of at least one of the plurality of deformable laundry articles being disposed within the at least one of the plurality of sequential work volumes. The method includes determining, based on the received signal, a location of the at least one of the plurality of deformable articles on a stationary floor within at least one of the plurality of sequential work volumes, the plurality of sequential work volumes being constituent to an enclosed channel and the stationary floor extending between an inlet end and an outlet end of the enclosed channel, a portion of the stationary floor adjacent the inlet end being configured to receive thereon the plurality of deformable laundry articles. The method includes instructing at least one drive of at least one of a plurality of arms disposed in series along the enclosed channel to at least one of rotate, tilt, extend, and retract a terminal gripper configured to selectively grasp at least one of the plurality of deformable laundry articles at the determined location, each one of the plurality of arms being associated with one of the plurality of sequential work volumes. The method includes instructing, by the controller, an actuator of the terminal gripper to close on the at least one of the plurality of deformable laundry articles. The method includes instructing the at least one drive to raise the closed terminal gripper and the grasped at least one of the plurality of deformable laundry articles to a hoist height above the stationary floor, and rotate toward the outlet end into an adjacent work volume. The method includes instructing the actuator of the terminal gripper to open the gripper to release the at least one of the plurality of deformable laundry articles in the adjacent work volume, receiving a signal from at least one sensor in the adjacent work volume of the plurality of sequential work volumes, and determining, based on the received signal, a state including at least one of the following: one or more of the plurality of deformable laundry articles are present on the stationary floor, one or more of the plurality of deformable laundry articles are not present on the stationary floor, and one the plurality of deformable laundry articles exited the enclosed channel through an outlet orifice disposed in the stationary floor adjacent the outlet end.

Implementations of the method may include one or more of the following features.

In examples, the plurality of sequential work volumes includes three or more work volumes.

In examples, the outlet orifice is disposed in a last work volume of the plurality of sequential work volumes, the last work volume being adjacent the outlet end.

In examples, the outlet orifice is disposed in the stationary floor of a last of the plurality of sequential work volumes.

In some examples, a number of work volumes including the plurality of sequential work volumes is one greater than the number of the plurality of arms and each of the plurality of arms is associated with a work volume directly adjacent at least one other work volume associated with one of the plurality of arms.

In examples, the plurality of sequential work volumes includes three or more work volumes, and the plurality of arms includes three or more arms. Each of the three or more arms is associated with one of the three or more work volumes.

In examples, the plurality of sequential work volumes includes three or more work volumes and an outlet-facing end of each of the three or more work volumes overlaps with an inlet-facing end of an adjacent sequential one of the three or more work volumes such that each arm of the plurality of arms is configured to extend into one or more adjacent work volumes of the plurality of sequential work volumes.

In examples, the method further includes, based on determining clothes are present on the stationary floor in the adjacent work volume, iteratively determining a location of the at least one of the plurality of deformable laundry articles on the stationary floor relative to an arm of the plurality of arms associated with the adjacent work volume, instructing the at least one drive of the arm associated with the adjacent work volume to position the terminal gripper of the arm associated with the adjacent work volume at the determined location to grasp the at least one of the plurality of deformable laundry articles, instructing an actuator of the terminal gripper of the arm associated with the adjacent work volume to close on the at least one of the plurality of deformable laundry articles, instructing the at least one drive to raise the closed terminal gripper of the arm associated with the adjacent work volume and the grasped at least one of the plurality of deformable laundry articles to a hoist height above the stationary floor and rotate toward the outlet end into a next sequential adjacent work volume of the three or more work volumes, instructing the actuator of the terminal gripper to open the gripper to release the at least one of the plurality of deformable laundry articles in the next sequential adjacent work volume, receiving a signal from the at least one sensor configured to detect the at least one of the plurality of deformable laundry articles in the next sequential adjacent work volume of the plurality of sequential work volumes, and determining, based on the received signal, a state including at least one of the following: one or more of the plurality of deformable laundry articles are present on the stationary floor, one or more of the plurality of deformable laundry articles are not present on the stationary floor, and one of the plurality of deformable laundry articles exited the enclosed channel through the outlet orifice.

In examples, the method further includes stopping iterating when each one of the plurality of deformable laundry articles exits the enclosed channel through the outlet orifice as a solitary deformable article.

In examples, the method further includes instructing two or more of the plurality of arms to operate simultaneously within each associated one of the plurality of sequential work volumes. The terminal grippers of the two or more of the plurality of arms operating simultaneously are configured to simultaneously grasp at least one of the plurality of deformable articles.

In examples, the method further includes instructing the at least one drive to move the terminal gripper in at least one of alternating side-to-side and alternating up and down motions to shake a grasped deformable article of the plurality of deformable articles at the hoist height.

In examples, the at least one sensor of the device includes at least one of a 3-D camera, an IR sensor, a 2-D camera, LIDAR, LADAR, a sonar proximity sensor, an ultrasonic ranging sensor, a radar sensor, and a pair of stereo depth cameras. The at least one sensor can output to the controller at least one of a depth map, RGB images, and IR images. The at least one sensor can be configured to output 3-D image data to the controller. Additionally or alternatively, the at least one sensor can be configured to output one or more 2-D images to the controller. In examples, the at least one sensor is a camera and the camera is calibrated to the floor of the enclosed channel and one or more of the plurality of arms.

In examples, determining a location of the at least one of the plurality of deformable articles on the stationary floor further includes determining one or more grip points on the at least one of the plurality of deformable articles. In examples, the one or more grip points are disposed on a high point of the at least one of the plurality of deformable articles. Additionally or alternatively, the one or more grip points are disposed on an edge of the at least one of the plurality of deformable articles.

In examples, the method further includes, based on determining clothes are not present on the stationary floor in the adjacent work volume, receiving a signal from the at least one sensor indicative of at least one of the plurality of deformable laundry articles remaining disposed within the one of the plurality of sequential work volumes preceding the adjacent work volume, determining a location of the at least one of the plurality of deformable laundry articles on the stationary floor relative to the associated arm, instructing the at least one drive to position the terminal gripper of the associated arm at the determined location to grasp the at least one of the plurality of deformable laundry articles, instructing an actuator of the terminal gripper of the associated arm to close on the at least one of the plurality of deformable articles, instructing the at least one drive to raise the closed terminal gripper of the associated arm and the grasped at least one of the plurality of deformable laundry articles to a hoist height above the stationary floor and rotate toward the outlet end into the adjacent work volume, instructing the actuator of the terminal gripper to open the gripper to release the at least one of the plurality of deformable laundry articles in the adjacent work volume, and determining, based on the received signal, a state including at least one of the following: one or more of the plurality of deformable laundry articles are present on the stationary floor, one or more of the plurality of deformable laundry articles are not present on the stationary floor, and one of the plurality of deformable laundry articles exited the enclosed channel through the outlet orifice.

In examples, determining a location of the at least one of the plurality of deformable laundry articles on the stationary floor relative to the associated arm includes the controller executing a series of instructions to perform a background subtraction routine on an input signal including a 2D image to locate at least one of the plurality of deformable laundry articles disposed on the stationary floor.

In examples, the background subtraction routine includes outputting a location of a perimeter of the at least one of the plurality of deformable laundry articles on the stationary floor relative to the at least one sensor and a current position of the terminal gripper.

In examples, the method further includes receiving a current signal from the at least one drive indicative of none of the plurality of deformable laundry articles being grasped in the terminal gripper at the hoist height. The controller can determine that the terminal gripper closed without grasping the detected at least one of the plurality of deformable laundry articles and repeat the steps of determining a location of the at least one of the plurality of deformable laundry articles on the stationary floor relative to an arm of the plurality of arms associated with the adjacent work volume, instructing the at least one drive of the arm associated with the adjacent work volume to position the terminal gripper of the arm associated with the adjacent work volume at the determined location to grasp the at least one of the plurality of deformable laundry articles, and instructing an actuator of the terminal gripper of the arm associated with the adjacent work volume to close on the at least one of the plurality of deformable laundry articles.

In examples, the method further includes receiving a contact sensor signal from at least one contact sensor on a gripping surface of the terminal gripper indicative of none of the plurality of deformable laundry articles being grasped in the terminal gripper at the hoist height. The method further includes determining that the terminal gripper closed without grasping the detected at least one of the plurality of deformable laundry articles and repeating the steps of determining a location of the at least one of the plurality of deformable laundry articles on the stationary floor relative to an arm of the plurality of arms associated with the adjacent work volume, instructing the at least one drive of the arm associated with the adjacent work volume to position the terminal gripper of the arm associated with the adjacent work volume at the determined location to grasp the at least one of the plurality of deformable laundry articles, and instructing an actuator of the terminal gripper of the arm associated with the adjacent work volume to close on the at least one of the plurality of deformable laundry articles.

In examples, the method further includes, upon the at least one sensor outputting a signal that none of the plurality of deformable articles are present on the stationary floor, receiving another signal output from the at least one sensor. In examples, the signal includes a 2D image, and the controller is configured to determine a perimeter of at least one of the plurality of deformable articles disposed on the stationary floor. In examples, the another signal includes a 3D image and the controller is further configured to determine a height above the stationary floor of at least one article of the plurality of deformable articles disposed on the stationary floor. In examples, the another signal includes a 2D image and the controller is further configured to perform a background subtraction routine to locate at least one of the plurality of deformable articles disposed on the stationary floor.

In examples, one or more bins are configured to be disposed beneath the stationary floor, and each of the one or more bins is configured to receive one or more of the plurality of deformable laundry articles having one or more characteristics associated with at least one of the one or more bins. In examples, one of the one or more bins (e.g., sorting bins) is disposed beneath the exit orifice for receiving each one of the plurality of deformable laundry articles exiting the enclosed channel individually. In examples, each of the one or more bins includes an identification marker for associating an identity of the bin. The one or more characteristics include at least one of color, size, material composition, article type, degree of dirtiness, and fabric heat tolerance.

In examples, the method further includes actuating a carousel in operable communication with the controller, the carousel being configured to receive thereon the one or more bins. Actuating the carousel includes repositioning the one or more bins beneath the enclosed channel to match a characteristic of one of the one or more bins positioned beneath the outlet orifice with the one or more characteristics of each one of the plurality of deformable laundry articles exiting the enclosed channel.

In examples, the identification marker includes at least one of a machine-readable serial number, a bar code, a machine-readable QR code, an RFID code, NFC tag, a WIFI enabled tag, a ZIGBEE enabled tag, and an active radio telemetry system.

In examples, the method further includes storing on a memory in communication with the controller, at least one relation including one of the one or more characteristics associated with the bin, the bin identification marker for each of the one or more bins, and a customer identity shared by the plurality of deformable laundry articles received into the enclosed channel. In examples, the method further includes receiving the one or more characteristics associated with the plurality of deformable laundry articles via a communication network configured to receive a customer input at a remote terminal in wired or wireless communication with the controller in communication with the communication network. In examples, the method further includes receiving the one or more characteristics of each one of the plurality of deformable laundry articles as an output signal from the at least one sensor in communication with the controller.

In examples, the at least one sensor includes at least one of a 3-D camera, an IR sensor, a 2-D camera, LIDAR, LADAR, a sonar proximity sensor, an ultrasonic ranging sensor, a radar sensor, a pair of stereo depth cameras, and a spectrometer. The at least one sensor can output to the controller at least one of a depth map, RGB images, and IR images. The at least one sensor can be configured to output 3-D image data to the controller. Additionally or alternatively, the at least one sensor can be configured to output one or more 2-D images to the controller. In examples, the at least one sensor is a camera and the camera is calibrated to the floor of the enclosed channel and one or more of the plurality of arms.

In examples, the controller is further configured to determine, based on a comparison of a received output signal of the at least one sensor to data stored in a memory in communication with the controller, at least one of an article type, an article color, an article size, and an article fabric. In examples, the at least one of the at least one sensor is a 2-D camera and the data associated with the deformable laundry article is size invariant image data. In examples, the memory further includes a neural network, and determining the one or more characteristics of each one of the plurality of deformable laundry articles includes processing the received output signal of the at least one sensor associated with each one of the plurality of work volumes with a neural network classifier.

In examples, the method further includes receiving, by the controller, an output signal including an image, determining, based on the output signal, a number of pixels in each of an upper half and a lower half of the image, the number of pixels being representative of at least one deformable laundry article being grasped by a terminal gripper and held at a hoist height, and determining based on the number of pixels in the lower half of the image exceeding a preset threshold that the at least one deformable laundry article includes a large sized article.

In examples, the method further includes receiving, by the controller, an output signal including an image of a deformable article in the enclosed channel, determining, based on the output signal and a calibrated coordinate space, where in the calibrated coordinate space each pixels of the image lies, and determining at least one of a location, shape, and size of the deformable article.

In examples, the method further includes determining, based on receiving a signal from the at least one sensor disposed within each of the plurality of sequential work volumes, that none of the plurality of deformable articles remain on the stationary floor in any of the plurality of sequential work volumes. In examples, the method further includes upon determining that none of the plurality of deformable articles remain on the stationary floor in any of the plurality of sequential work volumes, instructing an actuator of a carousel supporting one or more bins for collecting the one or more deformable laundry articles to transit the one or more bins of the sorted plurality of deformable articles to one or more autonomous combination washing and drying machines.

In examples, the method further includes receiving, by the controller, an output signal of at least one fill sensor. The at least one fill sensor is configured to detect an occupied volume of the one or more bins. In examples, the fill sensor is an optical sensor focused on a minimum threshold fill line and a maximum threshold fill line disposed on an interior surface of one of the one or more bins positioned beneath the exit orifice. The fill sensor is configured to detect whether the of one or more of the plurality of deformable laundry articles received in the one of the one or more bins reaches or surpasses the minimum threshold fill line. The maximum threshold fill line can be a top edge of the one of the one or more bins. In examples, the method further includes receiving, by the controller, an output signal from the fill sensor indicative of the occupied volume of the one of the one or more bins being with a threshold range between the minimum threshold fill line and maximum threshold fill line. Upon determining an occupied volume of the one of the one or more bins is within a threshold range indicative of being filled, the method includes instructing the carousel to transit the filled one of the one or more bins containing the sorted plurality of deformable laundry articles to an autonomous combination washing and drying machine. Additionally or alternatively, in examples, the at least one fill sensor is a weight sensor disposed beneath the one of the one or more bins positioned beneath the exit orifice and configured to detect whether the weight of the one of the one or more bins reaches or surpasses a minimum threshold weight indicative of a bin full condition.

The at least one fill sensor is configured to output a signal indicative of a bin full condition. Upon determining a bin full condition, the method includes instructing the carousel to unload the filled one of the one or more bins containing the sorted plurality of deformable laundry articles to an autonomous combination washing and drying machine.

In examples, the at least one sensor of the device includes at least one of a 3-D camera, an IR sensor, a 2-D camera, LIDAR, LADAR, a sonar proximity sensor, an ultrasonic ranging sensor, a radar sensor, and a pair of stereo depth cameras. In examples, the method further includes receiving by the controller one or more outputs from the at least one sensor including at least one of a depth map, RGB images, and IR images. The at least one sensor can be configured to output 3-D image data to the controller. Additionally or alternatively, the at least one sensor can be configured to output one or more 2-D images to the controller. In examples, the at least one sensor is a camera and the camera is calibrated to the floor of the enclosed channel and one or more of the plurality of arms.

In examples, determining a location of the at least one of the plurality of deformable articles on the stationary floor further includes determining one or more grip points on the at least one of the plurality of deformable articles. In examples, the one or more grip points are disposed on a high point of the at least one of the plurality of deformable articles. Additionally or alternatively, the one or more grip points are disposed on an edge of the at least one of the plurality of deformable articles. In examples, the at least one sensor is disposed outside the enclosed channel above each of the plurality of sequential work volumes. Additionally or alternatively, in examples, the at least one sensor is disposed adjacent a transparent window in a ceiling of the enclosed channel and includes a field of view encompassing the associated work volume. Additionally or alternatively, in examples, the at least one sensor is disposed within the enclosed channel adjacent an associated one of the plurality of arms and includes a field of view encompassing the associated work volume.

In examples, the controller includes at least one controller in operable communication with the at least one drive and the at least one sensor. In examples, the controller is in communication with a communication network and one or more memory stores in communication with the communication network. The controller can be in communication with one or more other controllers in remote communication with the communication network. The communication network is at least one of a wired and wireless network.

BRIEF DESCRIPTION OF THE DRAWINGS

FIG. 13 depicts an end view cross section schematic of an implementation of a machine vision system of the autonomous laundry separating and sorting system.

FIG. 15A depicts a schematic perspective view of a portion of an implementation of an autonomous laundry separating and sorting system at the start of a sorting process.

FIG. 15B depicts the implementation of the autonomous laundry separating and sorting system of 15A at a next step in the sorting process.

FIG. 16A depicts the implementation of the autonomous laundry separating and sorting system of 15B at a next step in the sorting process.

FIG. 16B depicts the implementation of the autonomous laundry separating and sorting system of 16A at a next step in the sorting process.

FIG. 17A depicts the implementation of the autonomous laundry separating and sorting system of 16B at a next step in the sorting process.

FIG. 17B depicts the implementation of the autonomous laundry separating and sorting system of 17A at a next step in the sorting process.

FIG. 24A depicts a perspective side view schematic of the actuatable inlet orifice door of FIG. 23.

FIG. 24B depicts a side view schematic of the actuatable inlet orifice door of FIG. 23.

FIG. 24C depicts a partial perspective side view schematic of the actuatable inlet orifice door of FIG. 23.

FIG. 54 depicts an end perspective view of the plurality of interoperative pop up transfer roller assemblies of FIG. 53.

FIGS. 57A-D depict a sequence of moves of a plurality of bins disposed on a load constructor for filling beneath an outlet orifice of a separating and sorting robot.

DETAILED DESCRIPTION

This disclosure relates to autonomous robotic devices, systems, and methods for handling residential loads of laundry without relying on human labor and human related injuries, inefficiencies, theft, and potential contamination. Laundry articles are collected from households and delivered to one or more process lines for cleaning, packing, and returning to the households. The autonomous processes are time and cost efficient, eliminate human intervention-based delays, eliminate line workers and associated potential introduction of human contaminants introduced by line workers, and eliminate any concerns with having private personal items handled by strangers. The system includes one or more autonomous process lines comprising a plurality of autonomous robotic devices configured to work in concert to process one or more dirty loads of household laundry from a collection of dirty, non-uniform articles to individually separated, cleaned, folded, and packed laundry articles. The plurality of autonomous robotic devices operate without human intervention to efficiently and effectively launder a plurality of customers' dirty items, including masses of both uniform and non-uniform articles. This disclosure relates to autonomous robotic devices configured to separate individual articles from a mass of a plurality of dirty laundry articles, sort the individual articles into one or more loads of laundry according to one or more load construction guidelines, and introduce the one or more loads of laundry to one or more combination washer dryers.

Figure 1:
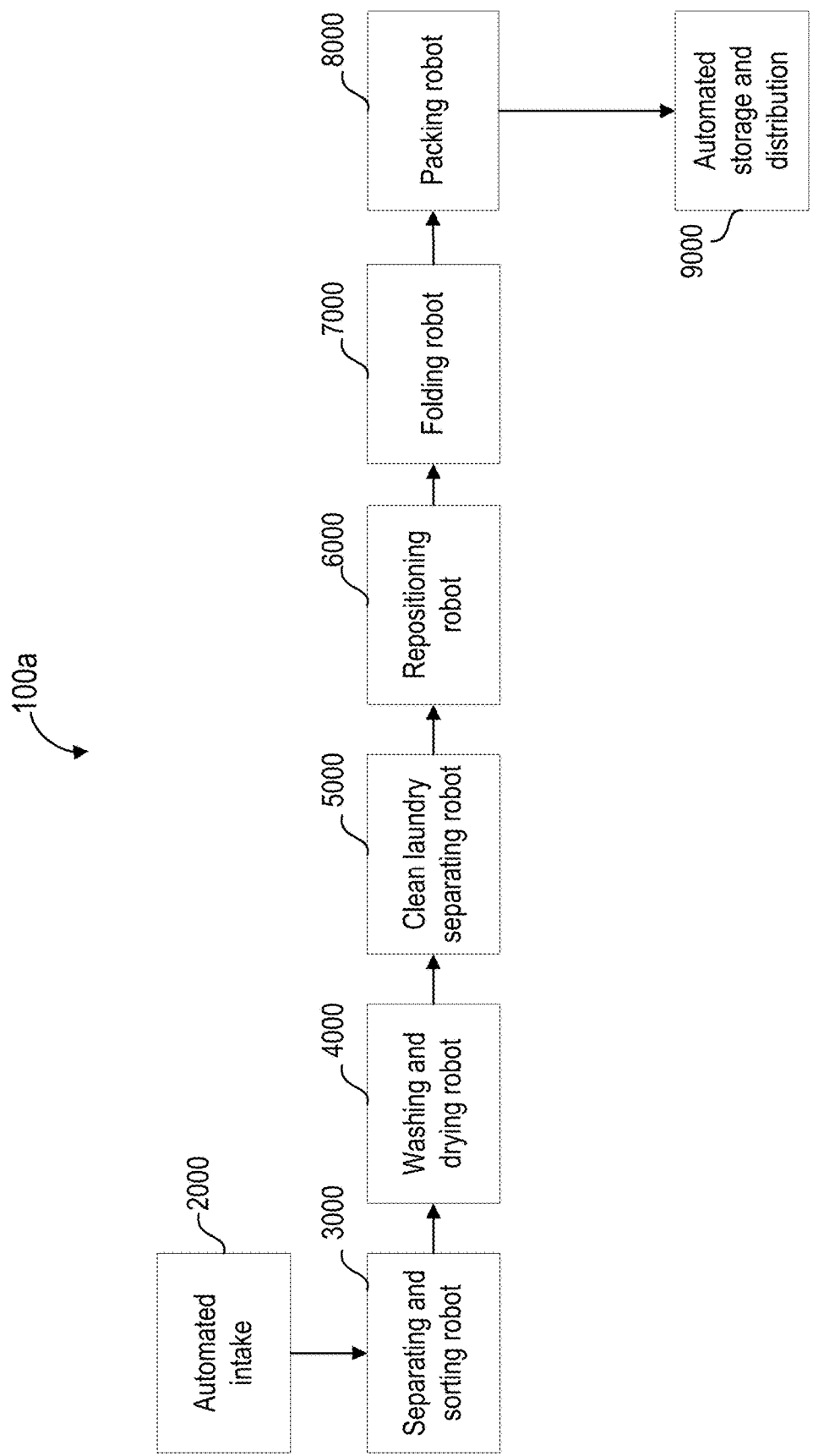
FIG. 1 depicts a schematic of an example autonomous robotic laundry process line.

As shown in FIGS. 1, in implementations of the system, a process line 100a comprises a plurality of autonomous robots configured to operate in series without human intervention to process and transport dirty laundry through the cleaning process, folding and repackaging the clean laundry for return to a household. In one implementation, the process line 100a comprises an automated intake robot 2000 for receiving a load of dirty household laundry comprising a plurality of deformable laundry articles. The deformable laundry articles can be non-uniform in type, size, shape, thickness, color, and fabric (e.g., material type). For example, the plurality of deformable laundry articles can include items commonly laundered in homes, such as sheets, towels, tablecloths, curtains, and adult and children's garments, for example, tee shirts, pants, socks, undergarments, dresses, dress shirts, and blouses. The autonomous intake robot 2000 is configured to introduce the plurality of deformable laundry articles to a separating and sorting robot 3000 configured to separate out each one of the deformable laundry articles of the plurality of deformable laundry articles. In implementations, the separating and sorting robot 3000 is configured to sort each one of the separated deformable laundry articles into one or more related batches for washing. In implementations, the separating and sorting robot 3000 is configured to intelligently batch the separated each one of the deformable laundry articles according to a programmed sorting algorithm based, for example, on criteria including at least one of material color, material type, article size, customer washing preference, water temperature requirements, stain treatment requirements, and load size (e.g., weight and/or physical volume). In implementations, the separating and sorting robot 3000 is configured to identify and record the number and types of garments in the load of laundry and provide this information to one or more robots of the process line 100a.

The separating and sorting robot 3000 outputs one or more intelligently sorted batches of deformable laundry articles to one or more washing and drying robots 4000 for laundering. The one or more washing and drying robots 4000 output the clean laundry articles to a clean laundry separating robot 5000. Implementations of the clean laundry separating robot 5000 can be similar or identical to the separating and sorting robot 3000. The clean laundry separating robot 5000 is configured to separate a load of clean laundry into individual deformable laundry articles for introduction into a repositioning robot 6000. In implementations, the repositioning robot 6000 receives a single deformable laundry article and manipulates and repositions it for automated introduction into a folding robot 7000, which automatically folds the laundry article for introduction to a packing robot 8000. In implementations, the packing robot 8000 automatically and autonomously packs the clean load of laundry comprising the plurality of clean and folded deformable laundry articles in a shipping container for automated redistribution to the customer. In implementations, the shipping container is a reusable container, or box (e.g., a box with a removable lid for scaling contents within). In implementations, the shipping container is a disposable container. In implementations, the shipping container is a non-deformable container with an ingress protection rating that includes an intrusion protection rating of 5 or 6 and a moisture protection rating of any and all of 1 through 6 in accordance with the Ingress Protection Code, IEC standard 60529. In reusable implementations, the shipping container can be washable.

Figure 2:
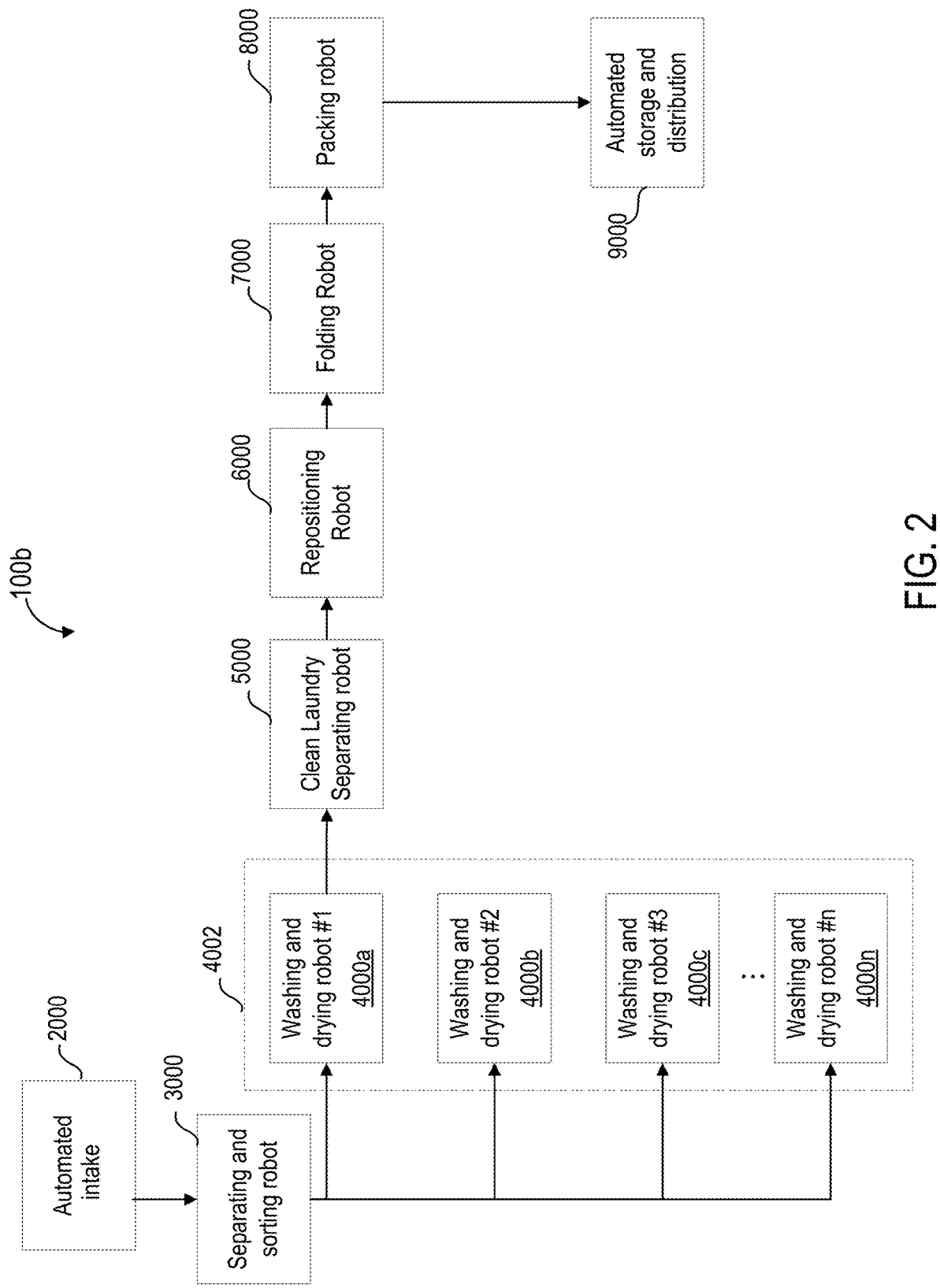
FIG. 2 depicts a schematic of an example autonomous robotic laundry process line including one intake and output and a plurality of washing and drying robots.
Figure 3:
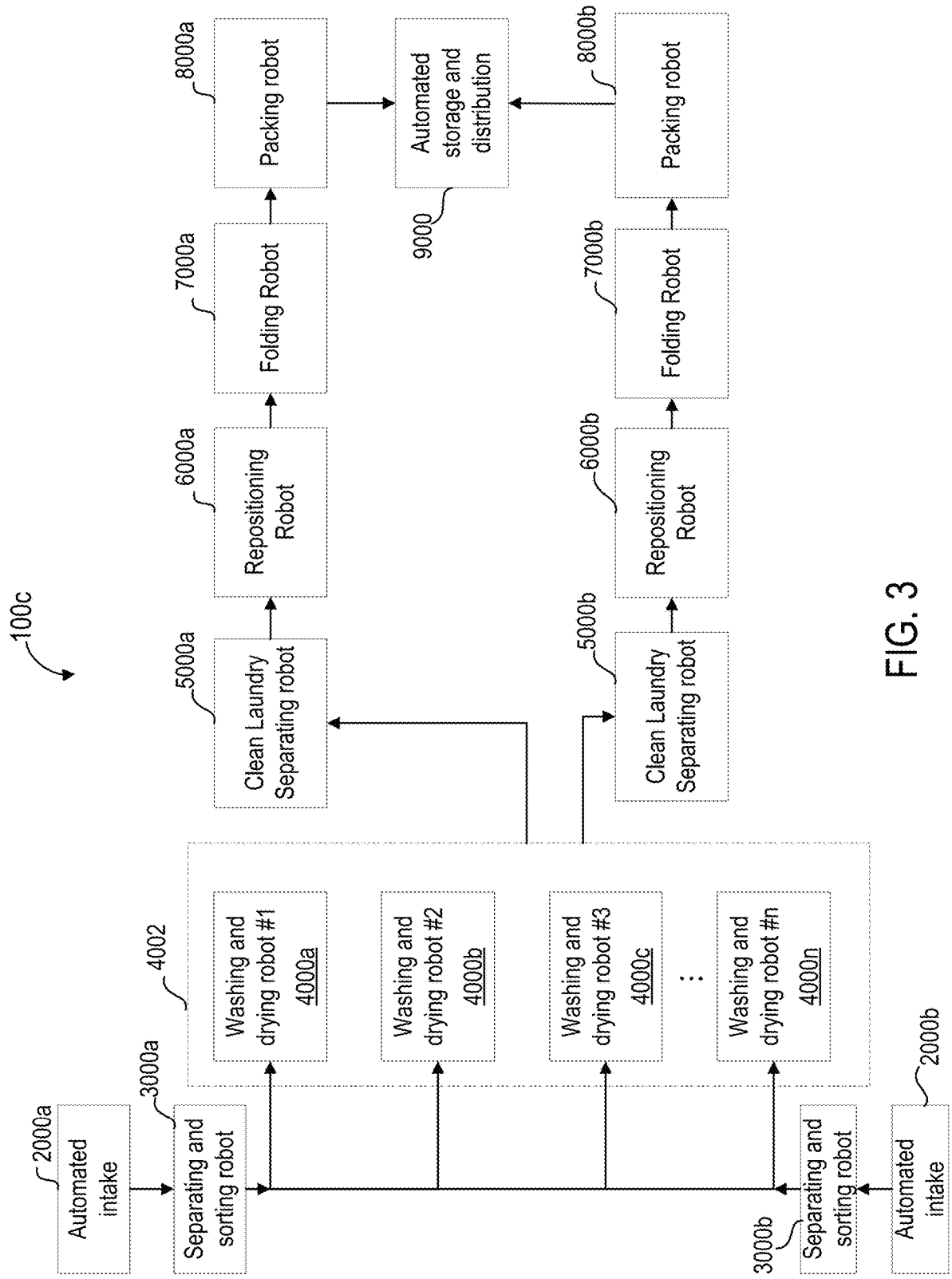
FIG. 3 depicts a schematic of a plurality of autonomous robotic laundry process lines including a plurality of intakes and outputs and a plurality of washing and drying robots.

Implementations of the process line 100a of household laundry cleaning robots can comprise one or more of each of the robots depicted in FIG. 1. For example, as shown in FIG. 2, each autonomous process line 100b can include a bank 4002 of washing and drying robots 4000a-n. In other implementations, as shown in FIG. 3, the autonomous process line 100c includes a bank 4002 of washing and drying robots 4000a-n shared by two or more sets of automated intake robots 2000a-b and dirty laundry separating and sorting robots 3000a-b and two or more sets of clean laundry separating robots 5000a-b, repositioning robots 6000a-b, folding robots 7000a-b, and packing robots 8000a-b. Additionally, two or more of the robots can be combined in a single module in alternate implementations. In implementations, one or more of the robots in the process line 100a-c are configured to communicate over wired connections or wireless communication protocols. For example, in implementations, one or more robots in the process line 100a-c can communicate with another one or more robots in the process line 100a-c over a wired BUS, LAN, WLAN, 4G, 5G, LTE, Ethernet, BLUETOOTH, or other IEEE 801.11 standard.

Figure 4:
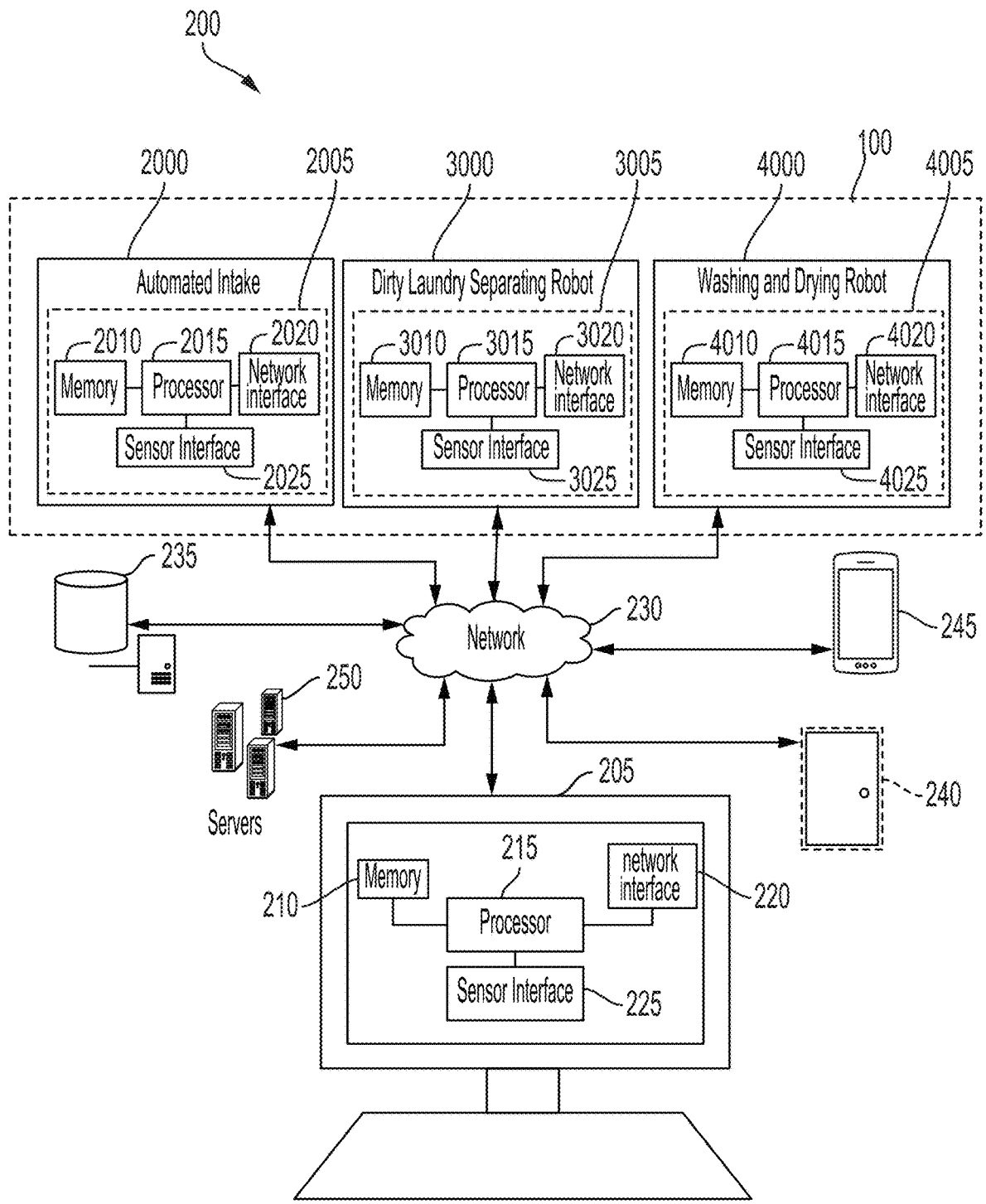
FIG. 4 depicts a schematic example of a system for controlling an autonomous robotic laundry process line.

Referring to FIG. 4, an example of a system 200 of operatively connected robots is shown. FIG. 4 depicts a schematic implementation of a portion of an autonomous robotic process line 100, 100a-c. A dirty laundry separating and sorting robot 3000 is in operative communication with an automated intake robot 2000 configured to provide a plurality of dirty laundry items from a single customer (e.g., one household) to the dirty laundry separating and sorting robot 3000. The dirty laundry separating and sorting robot 3000 is configured to provide intelligently sorted and batched loads of dirty deformable laundry articles to the washing and drying robot 4000 for effective and efficient washing and drying. The washing and drying robot 4000 is in operative communication with a clean laundry separating robot 5000 and outputs a load of clean laundry for separation by the clean laundry separating robot 5000. Each robot 2000, 3000, 4000 includes a controller 2005, 3005, 4005 configured to operate the associated robot and the one or more controllers prompt intermediary wheel robots, conveyors, and/or carriers to transfer the one or more deformable articles 12 between sequential robots in the process line 100, 100a-c.

For example, in implementations, the autonomous dirty laundry separating and sorting robot 3000 includes a controller 3005. The controller 3005 includes a processor 3015 in communication with a memory 3010, a network interface 3020, and a sensor interface 3025. The processor 3015 can be a single microprocessor, multiple microprocessors, a many-core processor, a microcontroller, and/or any other general purpose computing system that can be configured by software and/or firmware. In implementations, the memory 3010 contains any of a variety of software applications, data structures, files and/or databases. In one implementation, the controller 3005 includes dedicated hardware, such as single-board computers, application specific integrated circuits (ASICs), and field programmable gate arrays (FPGAs).

A network interface 3020 is configured to couple the controller 3005 to a network 230. The network 230 may include both private networks, such as local area networks, and public networks, such as the Internet. It should be noted that, in some examples, the network 230 may include one or more intermediate devices involved in the routing of packets from one endpoint to another. In implementations, the network interface 3020 is coupled to the network 230 via a networking device, such as a bridge, router, or hub. In other implementations, the network 230 may involve only two endpoints that each have a network connection directly with the other. In implementations, the network interface 3020 supports a variety of standards and protocols, examples of which include USB (via, for example, a dongle to a computer), TCP/IP, Ethernet, Wireless Ethernet, BLUETOOTH, ZigBee, M-Bus, CAN-bus, IP, IPV6, UDP, DTN, HTTP, FTP, SNMP, CDMA, NMEA and GSM. To ensure data transfer is secure, in some examples, the controller 3005 can transmit data via the network interface 3020 using a variety of security measures including, for example, TLS, SSL or VPN. In implementations, the network interface 3020 includes both a physical interface configured for wireless communication and a physical interface configured for wired communication. According to various embodiments, the network interface 3020 enables communication between the controller 3005 of the dirty laundry separating and sorting robot 3000 and at least one of the plurality of robots 2000, 4000, 5000, 6000, 7000, 8000, 9000 of the process line 100, 100a-c.

Additionally or alternatively, the network interface 3020 is configured to facilitate the communication of information between the processor 3015 and one or more other devices or entities over the network 230. For example, in implementations, the network interface 3020 is configured to communicate with a remote computing device such as a computing terminal 205, database 235, server 240, smartphone 245, and server farm 250. In implementations, the network interface 3020 can include communications circuitry for at least one of receiving data from a database 235 and transmitting data to a remote server 240, 250. In some implementations, the network interface 3020 can communicate with a remote server over any of the wired protocols previously described, including a WI-FI communications link based on the IEEE 802.11 standard.

In some examples in accordance with FIG. 4, the network 230 may include one or more communication networks through which the various autonomous robots and computing devices illustrated in FIG. 4 may send, receive, and/or exchange data. In various implementations, the network 230 may include a cellular communication network and/or a computer network. In some examples, the network 230 includes and supports wireless network and/or wired connections. For instance, in these examples, the network 230 may support one or more networking standards such as GSM, CMDA, USB, BLUETOOTH®, CAN, ZigBee®, Wireless Ethernet, Ethernet, and TCP/IP, among others. In implementations, the network 230 can implement broadband cellular technology (e.g., 2.5 G, 2.75 G, 3 G, 4 G, 5 G cellular standards) and/or Long-Term Evolution (LTE) technology or GSM/EDGE and UMTS/HSPA technologies for high-speed wireless communication.

Although the controller 3005 is described herein in particular, one or more of the plurality of robots 2000, 4000, 5000, 6000, 7000, 8000, 9000 of the process line 100 includes similar components having similar functionality.

Figure 5:
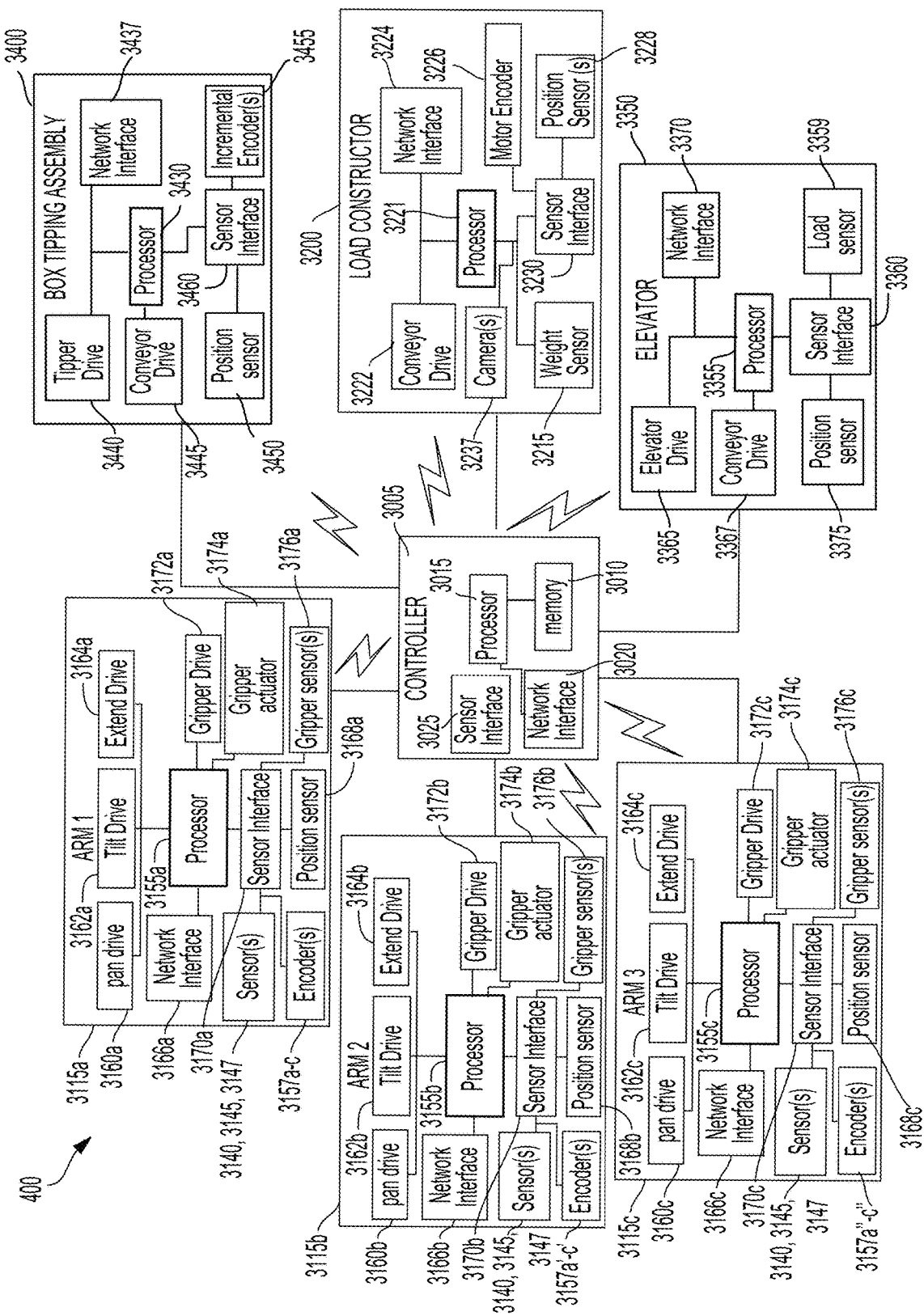
FIG. 5 depicts a schematic example of a system of autonomous devices configured to separate and sort household laundry articles.

Turning to FIG. 5, a schematic of an implementation of an autonomous separating and sorting system 400 is shown. The system 400 includes one or more of the features and devices described with regard to the embodiments of FIGS. 1-4. In implementations, the separating and sorting system 400 comprises a plurality of interactive autonomous robotic devices. In implementations the system 400 comprises a separating and sorting device 3000 comprising at least three arms and a controller 3005, an elevator 3350 for raising a box 3500 of dirty articles to a height above the separating and sorting robot 3000, a box tipping assembly 3400 for receiving the box 3500 of dirty articles 12 from the elevator and overturning the bin into the separating and sorting robot 3000, and a load constructor 3200 for collecting sorted and/or batched dirty laundry articles exiting the separating and sorting robot 3000. In implementations, the controller 3005 is in wired or wireless operative communication with processors and drives of all of the foregoing. Each autonomous device of the implementation of the system 400 of FIG. 5 will subsequently be described with regard to implementations.

Turning now to FIGS. 6-11, an implementation of an autonomous sorting device 3000 (also alternatively referred to hereinafter as the "device," "robotic device," and "separating and sorting robot") for separating individual dirty laundry articles of a plurality of deformable laundry articles and sorting the individual deformable laundry article into bins for washing. The plurality of deformable articles comprise one or more loads of dirty household laundry. Because the one or more loads of dirty household laundry can comprise two or more article types of at least one of different sizes, different shapes, different colors, and different fabrics, the autonomous sorting device 3000 is configured to separate each article from a pile, a bin, and/or a tangled clump of dirty laundry articles and place each separated article 12 in a specific group of articles with matching washing and drying requirements. As will be described subsequently with regard to implementations, the parameters for specific groupings can be at least one of preset, dynamically determined, and requested by a customer. The autonomous sorting device 3000 thereby autonomously separates and sorts an unsorted mass of dirty laundry into batches of dirty laundry articles for washing and drying. For example, the device 3000 can separate colored articles from white articles for separate batching, washing and drying, and the device 3000 can separate and batch towels for separate washing and drying. For example, the device 3000 can separate and batch delicate articles for washing and drying together or as individual articles, and the device 3000 can identify and batch one or more stained articles requiring individualized stain treatment.

In implementations, the device 3000 includes an enclosed channel 3100 comprising a plurality of sequential work volumes 3105a-d and a stationary floor 3110 extending between an inlet end "I" and an outlet end "O" of the enclosed channel 3100. In implementations, the stationary floor 3110 comprises a substantially level surface extending from the inlet end I to the outlet end O. Additionally or alternatively, the stationary floor 3110 comprises a substantially continuous surface extending throughout all of the plurality of sequential work volumes 3105a-d. In implementations, the enclosed channel 3100 is raised above a ground floor and/or mezzanine platform. In implementations, the enclosed channel 3100 comprises the floor 3110, a ceiling 3111, and four walls 3112a-d. (For illustrative purposes, the floor 3110, ceiling 3111 and four walls 3112a-d are shown as transparent in FIGS. 10-11.) As described later with regard to implementations of autonomously introducing a plurality of deformable laundry articles 12 into the enclosed channel 3100, a portion 3110a of the stationary floor 3110 within a first work volume 3105a of the plurality of sequential work volumes 3105a-d is configured to receive thereon the plurality of deformable articles 12a-n adjacent the inlet end I. In implementations, the device 3000 includes a plurality of arms 3115a-c disposed in series along the enclosed channel 3100, each one of the plurality of arms 3115a-c comprising an actuatable terminal gripper 3120a-d configured to selectively grasp at least one of the plurality of deformable articles 12a-n and at least one drive motor 3125a-c configured to at least one of rotate, tilt, extend, and retract the terminal gripper 3120a-c, each of the plurality of arms 3115a-d associated with a corresponding one of the plurality of sequential work volumes 3105a-d.

The device 3000 includes at least one selectively sealed in inlet orifice 3130, 3130a-b and an outlet orifice 3135. Additionally or alternatively, the outlet orifice 3135 is selectively sealed by an actuatable door or covering. Additionally or alternatively, the outlet orifice 3135 is selectively sealed by an air curtain in operable communication with the controller 3005. The at least one inlet orifice 3130, 3130a-b is disposed in at least one of a wall or ceiling of the enclosed channel 3100, and the plurality of deformable articles 12a-n are received into the enclosed channel 3100 through the inlet orifice 3130, 3130a-b. The outlet orifice 3135 is disposed adjacent the outlet end O of the enclosed channel 3100 in at least one of a wall 3112a-d of the enclosed channel and the stationary floor 3110. Each one of the plurality of deformable articles 12a-n exits the enclosed channel 3100 through the outlet orifice 3135. Selectively sealing the at least one inlet orifice 3130, 3130a-b and, in implementations, the outlet orifice 3135, enables containment of loose personal items and other detritus and debris that might accompany an individual household's laundry without contaminating other devices and systems in the process line 100. Additionally, selectively sealing the inlet orifice 3130, 3130a-b and, in implementations, the outlet orifice 3135, enables effective cleaning and disinfecting of the enclosed channel 3100, as will be described subsequently with regard to implementations.

Figure 10:
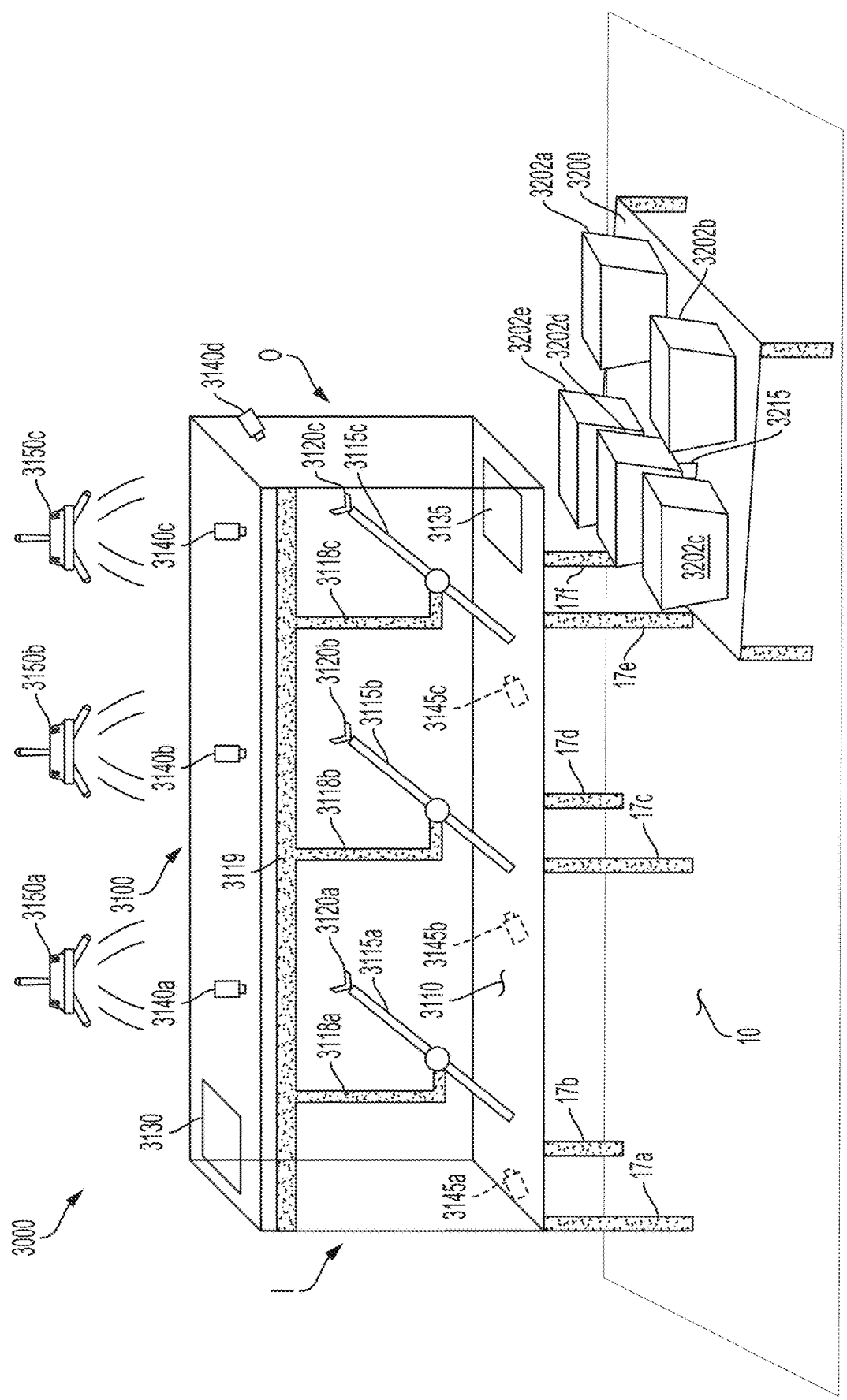
FIG. 10 depicts a schematic view of an implementation of an autonomous laundry separating and sorting system.
Figure 11:
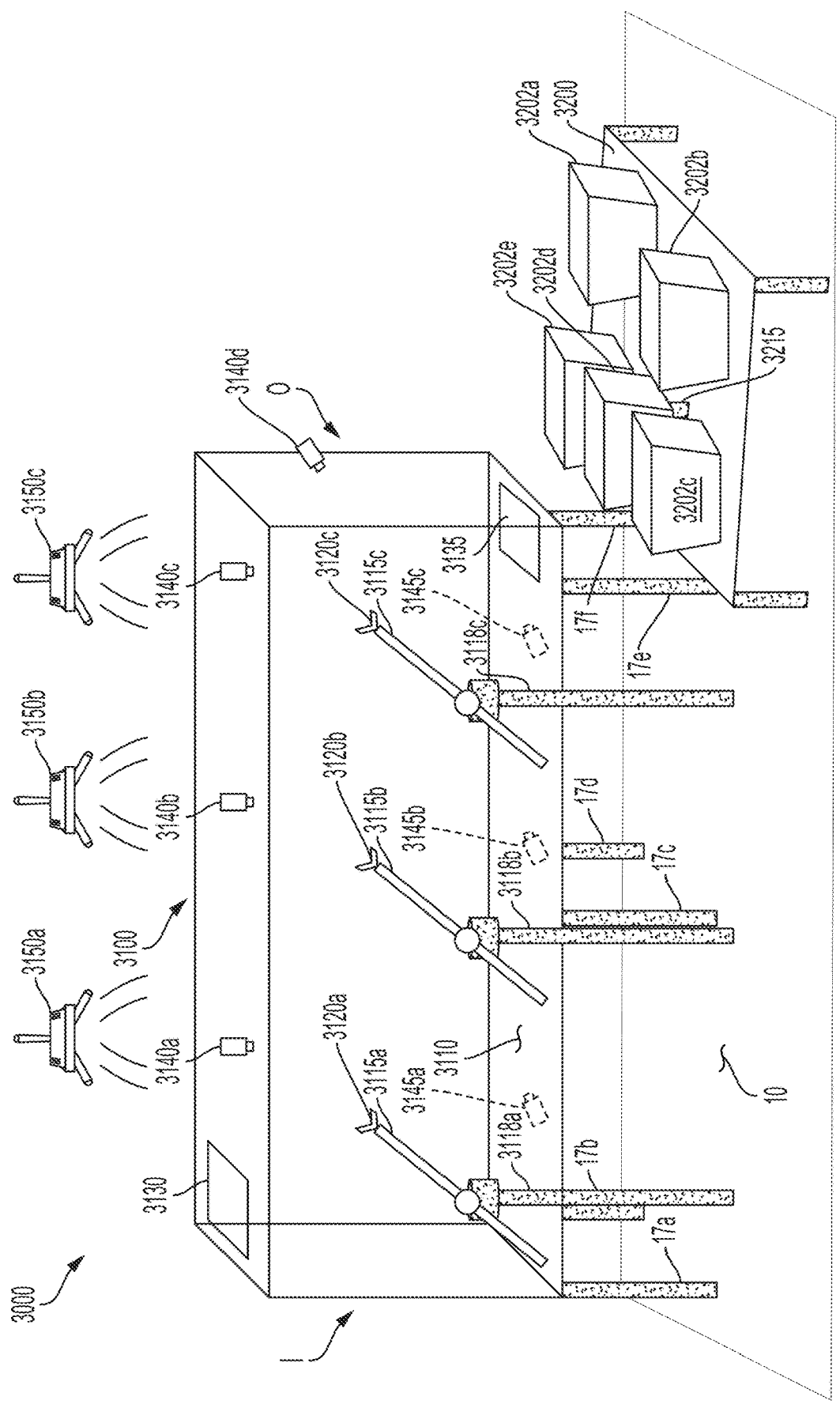
FIG. 11 depicts a schematic view of an implementation of an autonomous laundry separating and sorting system.

As shown in FIGS. 10-11, the device 3000 comprises at least one sensor 3140a-d disposed at least one of on, adjacent to, and within each one of the plurality of sequential work volumes 3105a-d. In implementations, the at least one sensor 3140a-d can include one or more cameras disposed at least one of on, adjacent to, and within each of the sequential work volumes. In implementations, adjacent to includes the at least one sensor being disposed external to a transparent wall or window disposed in a wall 3112a-d, floor 3110, and/or ceiling 3111 of the enclosed channel 3100. For example, in implementations, the at least one sensor 3140a-d comprises one or more cameras adhered to or positioned adjacent plexiglass walls or windows with a field of view trained on the interior of the channel 3100. In implementations, the at least one sensor is a camera, and the camera is calibrated to the floor 3110 of the enclosed channel and one or more of the plurality of arms 3115a-d. The at least one sensor 3140a-d is configured to detect at least one of the plurality of deformable articles 12a-n disposed within an associated one of the plurality of sequential work volumes, and output a signal indicative of at least one of the presence and location of the at least one of the plurality of deformable articles 12a-n relative to the terminal gripper 3120a-c of the one of the plurality of arms 3115a-c associated the one of the plurality of sequential work volumes 3105a-d. In implementations, at least one camera 3140d is disposed adjacent the outlet end O and has a field of view encompassing the outlet orifice 3135 for detecting passage of an article 12 therethrough.

In implementations, the at least one sensor 3140a-d is a single camera comprising a field of view encompassing the entire floor 3110 of the enclosed channel 3100. implementations, the at least one sensor 3140a-d comprises two cameras comprising adjacent fields of view collectively encompassing the entire floor 3110 of the enclosed channel 3100. In implementations, the at least one sensor 3140a-d is three or more cameras comprising adjacent field of views collectively encompassing the entire floor 3110 of the enclosed channel 3100.

The device 3000 comprises a controller, such as controller 3005, that is in operable communication with the at least one drive motor 3125a-c, an actuator 3174a-c of each of the plurality of terminal grippers 3120, and the at least one sensor 3140a-d of each one of the plurality of sequential work volumes 3105a-d. As will be described subsequently with regard to implementations, the controller 3005 is configured to orchestrate movements of the plurality of arms 3115a-c within the enclosed channel 3100 and actuation of the associated terminal grippers 3120a-c to grasp, hoist, and move an initially grasped one or more of the plurality of deformable articles 12a-n down the series of arms 3115a-b such that a single article 12n is grasped by an arm 3115c closest to the exit orifice 3135. The controller 3005 is configured to receive a signal from the at least one sensor 3140a-c in an associated one of the plurality of sequential work volumes 3105a-c indicative of at least one of the plurality of deformable articles 12a-n being disposed within the associated one of the plurality of sequential work volumes 3105a-c. The controller 3005 is configured to determine a location of the at least one of the plurality of deformable articles 12a-n on the stationary floor 3110 relative to the associated arm 3115a-c, instruct the at least one drive motor 3125a-c to position the terminal gripper 3120a-c of the associated arm 3115a-c at the determined location to grasp the at least one of the plurality of deformable articles 12a-n, and instruct an actuator 3174a-c of the terminal gripper 3120a-c of the associated arm 3115a-c to close on and grasp the at least one of the plurality of deformable articles 12a-n. The controller 3005 is configured to instruct the at least one drive motor 3125a-c to raise the closed terminal gripper 3120a-c of the associated arm 3115a-c and the grasped at least one of the plurality of deformable articles 12a-n to a hoist height above the stationary floor, and rotate toward the outlet end O into an adjacent work volume 3115a-d. The controller 3005 is configured to instruct the actuator of the terminal gripper to open the gripper to release the at least one of the plurality of deformable articles 12a-n in the adjacent work volume, and receive a signal from at least one sensor 3140a-d in the adjacent work volume of the plurality of sequential work volumes 3105a-d. The controller 3005 is configured to determine, based on the received signal, at least one of one or more of the plurality of deformable articles 12a-n being present on the stationary floor 3110, none of the plurality of deformable articles 12a-n are present on the stationary floor 3110, and one of the plurality of deformable laundry articles 12a-n exited the enclosed channel through the outlet orifice 3135.

In implementations, such as those of FIGS. 6-9, the plurality of sequential work volumes 3105a-d comprises three or more work volumes, and each of the three or more arms are associated with one of the three or more work volumes. In implementations, the outlet orifice 3135 is disposed in a last work volume 3105d of the plurality of sequential work volumes 3105a-d, which is adjacent the outlet end O of the enclosed channel 3100. In implementations, the outlet orifice 3135 is disposed in the stationary floor 3110 within or adjacent to a last of the plurality of sequential work volumes 3105a-c and, in implementations, is disposed in a terminal work volume 3135d that is shorter in length than the preceding work volumes 31005a-b. In implementations, the number of work volumes comprising the plurality of sequential work volumes 3105a-d is one greater than the number of the plurality of arms 3115a-c and each of the plurality of arms 3115a-c is associated with a work volume directly adjacent at least one other work volume associated with one of the plurality of arms 3115a-c. For example, in FIGS. 6-11, each one of three arms 3115a-c is associated with a corresponding one of three sequential work volumes 3105a-c and a fourth work volume 3105d with no associated arm follows the third work volume 3105c. In implementations, an outlet-facing end of each of the three or more work volumes overlaps with an inlet-facing end of an adjacent sequential one of the three or more work volumes such that each arm of the plurality of arms 3115a-c is configured to extend into one or more adjacent work volumes of the plurality of sequential work volumes 3105a-c.

If the controller 3005 determines one or more of the plurality of deformable articles 12a-n is present on the stationary floor 3110 in the adjacent work volume into which the one or more articles was dropped, the controller 3005 is further configured to iteratively perform one or more grabs, rotations, and drops down the line of sequential arms 3115a-c and work volumes 3105a-c. In implementations, upon determining the presence of one or more of the plurality of deformable articles 12a-n, the controller 3005 is configured to determine a location of the at least one of the plurality of deformable articles 12a-n on the stationary floor 3110 relative to an arm associated with the adjacent work volume, and instruct the at least one drive motor 3125a-c of the arm associated with the adjacent work volume to position the terminal gripper of the arm associated with the adjacent work volume at the determined location to grasp the at least one of the plurality of deformable articles 12a-n.

As will be described subsequently with regard to schematic implementations, the controller 3005 is configured to instruct an actuator 3174a-c of the terminal gripper 3120 of the arm 3115 associated with the adjacent work volume 3105 to close on the at least one of the plurality of deformable articles 12a-n, and instruct the at least one drive 3125a-c to raise the closed terminal gripper of the arm associated with the adjacent work volume and the grasped at least one of the plurality of deformable articles to a hoist height H1 above the stationary floor, and move the gripper 3120 (e.g., at least one of pan, tilt, and extend, e.g., rotate) toward the outlet end O into the next sequential adjacent work volume of the three or more work volumes 3115a-c. The controller 3005 is configured to instruct the actuator of the terminal gripper to open the gripper to release the at least one of the plurality of deformable articles 12a-n in the next sequential adjacent work volume down the line toward the outlet end O of the enclosed channel 3100. As in the previous iteration, the controller 3005 is configured to receive a signal from at least one sensor 3140a-n in the next sequential adjacent work volume of the plurality of sequential work volumes 3115a-c, and determine, based on the received signal, at least one of one or more of the plurality of deformable articles 12a-n being present on the stationary floor 3110, none of the plurality of deformable articles 12a-n are present on the stationary floor 3110, and one of the plurality of deformable articles 12a-n exited the enclosed channel 3100 through the outlet orifice 3135.

Alternatively, in implementations, the rather than an engaged gripper releasing each article 12 on the floor 3110 of an adjacent work volume 3105 following a hoist, the gripper 3120 of an available arm 3115 in a receiving work volume 3105 can grip an edge of the article 12 (e.g., a lowest hanging point), hoist the gripped edge to the hoist height and the longest engaged gripper can release the article 12.

In implementations, the controller 3005 is configured to stop iterating when each one of the plurality of deformable articles 12a-n in a load of dirty articles exits the enclosed channel through the outlet orifice 3135 as a solitary deformable article and no deformable articles remain in the enclosed channel 3100.

In implementations, as will be subsequently described with regard to an illustrative embodiment, the controller 3005 is further configured to instruct two or more of the plurality of arms 3115a-c to operate simultaneously within each respective one of the plurality of sequential work volumes 3105a-c. In implementations, terminal grippers 3120a-c of the two or more of the plurality of arms 3115a-c operating simultaneously are configured to simultaneously grasp at least one of the plurality of deformable articles 12a-b. For example, to determine an article is a large sized item, two or more arms of the plurality of arms 3115a-c can simultaneously grasp the article and rotate apart to spread the article. The controller 3005 can be configured to estimate a size of the article 12 based on a distance separating the engaged terminal grippers 3120a-c once tension is detected in the spread article. Tension can be detected, for example, by one or more sensors in communication the controller 3005 for detecting resistance to movement or by monitoring a motor current of the at least one drive motor 3125a-c of each arm engaged with the article.

As previously described with regard to FIGS. 10-11, the device 3000 comprises at least one sensor 3140a-d, 3145a-c, 3147a-c disposed at least one of on, adjacent to, and within each one of the plurality of sequential work volumes 3105a-d. In examples, the at least one sensor of each work volume of the plurality of work volumes 3105a-d is configured to at least one of detect one of one or more features and capture one or more images of the at least one of the plurality of deformable articles 12a-n disposed in at least one work volume 3105 of the enclosed channel 3100. In implementations, the at least one sensor 3140a-d, 3145a-c, 3147a-c comprises at least one of a 3-D camera, an IR sensor, a 2-D camera, LIDAR, LADAR, a sonar proximity sensor, an ultrasonic ranging sensor, a radar sensor (e.g., including Doppler radar and/or millimeter-wave radar), and a pair of stereo depth cameras. In implementations, at least one sensor outputs to the controller 3005 at least one of a depth map, RGB images, and IR images. In implementations the at least one sensor 3140a-c, 3145a-c, 3147a-c comprises a REALSENSE camera configured to output at least one of a depth map, RGB images, and IR images. In implementations, the at least one sensor 3140a-d, 3145a-c, 3147a-c can be configured to output 3-D image data to the controller 3005. Additionally or alternatively, in implementations, the at least one sensor 3140a-d, 3145a-c, 3147a-c can be configured to output one or more 2-D images to the controller 3005. As previously described, in implementations, the at least one sensor 3140a-d, 3145a-c, 3147a-c comprises a camera, and the camera is calibrated to the floor 3110 of the enclosed channel 3100 and has a field of view encompassing one or more of the plurality of arms 3115a-c.

Figure 12:
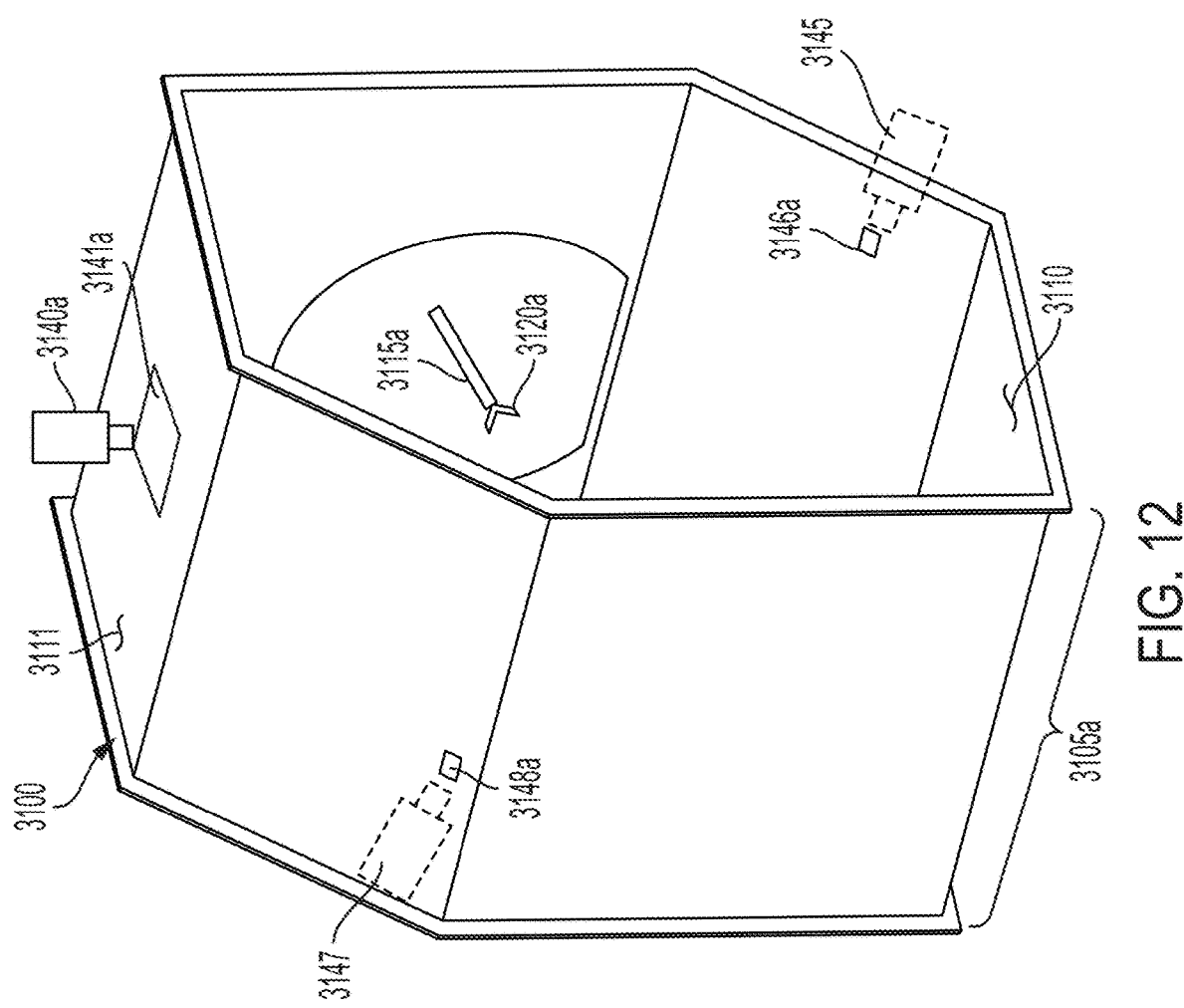
FIG. 12 depicts a perspective partial view of an implementation of the autonomous laundry separating and sorting device.

In implementations, the at least one sensor 3140a-d, 3145a-c, 3147a-c is positioned at least one of on, adjacent to, and within an associated one of the plurality of work volumes 3105a-c such that the at least one sensor 3140a-d, 3145a-c, 3147a-c has an field of view encompassing the stationary floor 3110 within the associated one of the plurality of work volumes 3105a-d. In implementations, the at least one sensor 3140a-d, 3145a-c, 3147a-c comprises a field of view (FOV) encompassing the outer perimeter reachable by an associated one of the plurality of arms 3115a-c. In implementations, as shown in FIGS. 10-13, the at least one sensor 3140a-d, 3145a-c, 3147a-c is disposed outside the enclosed channel 3100, above each of the plurality of sequential work volumes 3105a-c. As shown in FIG. 12 depicting a portion of the enclosed channel 3100 comprising a first work volume 3105a, the at least one sensor 3140a can be disposed adjacent a transparent window 3141a in a ceiling 3111 of the enclosed channel 3100 and comprises a field of view encompassing the stationary floor 3110 within the associated work volume. Additionally or alternatively, as shown by way of example in FIG. 12, the at least one sensor can include at least one of at least one upwardly angled sensor 3145a and at least one transverse sensor 3147a disposed at least one of on, adjacent to, and within an associated work volume 3105a. The at least one upwardly angled sensor 3145a comprises a field of view encompassing the work volume above the floor 3110 and is configured to detect an article 12 suspended by an associated arm 3115a-c above the floor 3110. In implementations, as shown FIGS. 12 and 13, the at least one upward angled sensor 3145a and at least one transverse sensor 3147a are disposed outside the enclosed channel 3100, adjacent each of the plurality of sequential work volumes 3105a-c. In implementations, the at least one upwardly angled sensor 3145a and at least one transverse sensor 3147a can be disposed respectively adjacent a transparent window 3146a on an arm side of the enclosed channel and a transparent window 3148a on a side wall opposite the arm wall. Additionally or alternatively, in implementations, one or more of the at least one transverse sensor 3147a and at least one upwardly angled sensor 3145a can be disposed respectively adjacent a transparent window on an arm side of the enclosed channel and a transparent window on a side wall opposite the arm wall. Although the one or more sensors 3140a, 3145a, 3147a are described with regard to the first work volume 3105a, in implementations, each work volume 3105a-d of the enclosed channel 3100 can comprise one or more of any of the sensors herein described by way of example with reference the first work volume 3105a.

Figure 14B:
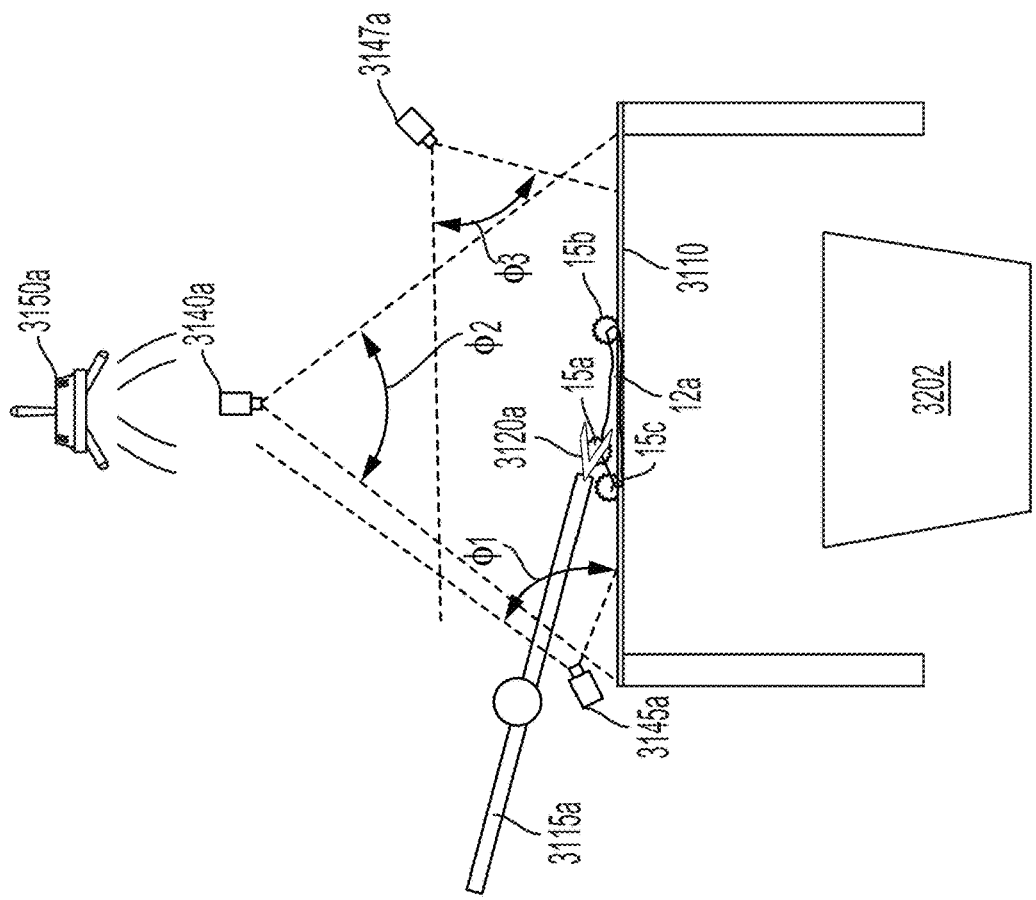
FIG. 14B depicts the end view cross section schematics of FIG. 14 with a gripper engaging one of the grip points of the article.
Figure 14A:
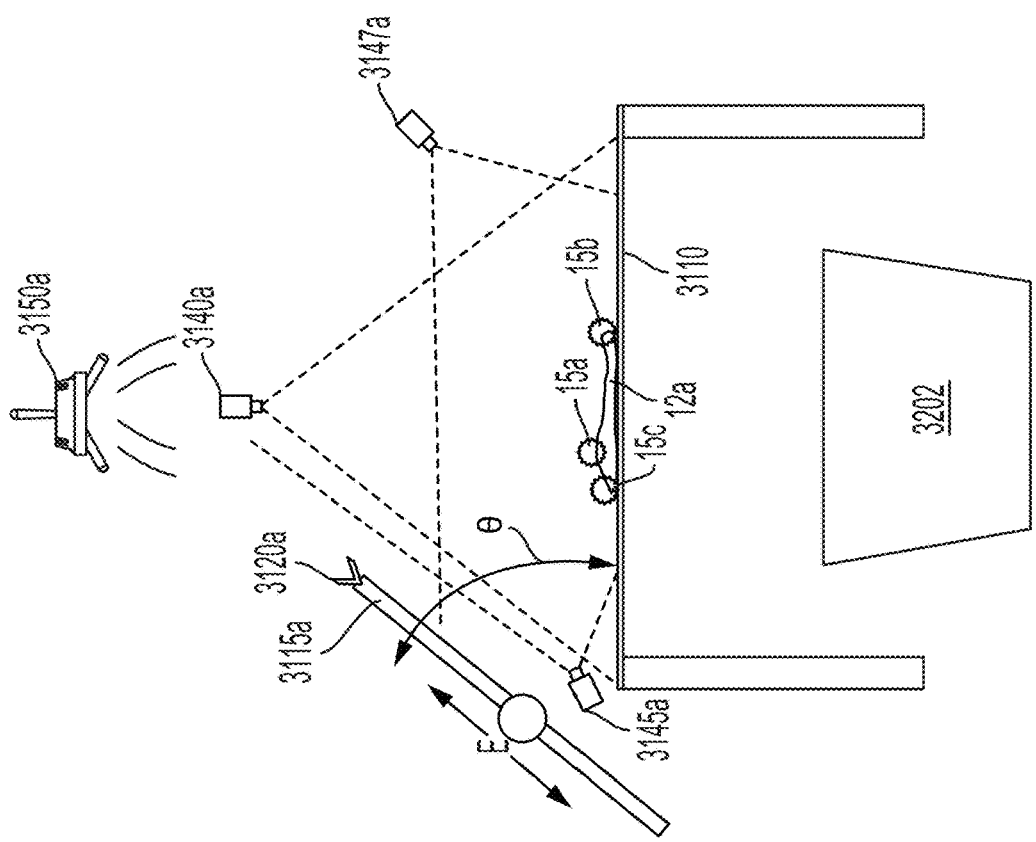
FIG. 14A depicts an end view cross section schematics of an implementation of the autonomous laundry separating and sorting system with enclosure walls removed for clarity to show sensors and determination of grip points of an article.

As shown in the schematic end view of a working volume 3105a in FIG. 13 and the simplified end view showing only the floor 3110 of the enclosed channel 3100 in FIG. 14, in implementations of the device 3000, the at least one sensor comprises at least one sensor 3140a at the ceiling aimed substantially downward at the stationary floor 3110, an upward angled sensor 3145a and a transverse sensor 3147 such that the overlapping fields of view (FOVs) φ1-φ3 cover the entirety of the work volume. Such implementations are particularly advantageous for determining whether and where any one of the plurality of deformable articles 12a-n remains in the enclosed channel 3100 prior to concluding the separating and sorting process on the plurality of deformable articles 12a-n and determining the channel 3100 is dormant and ready to receive a subsequent load of dirty laundry into the enclosed channel for separating and sorting. Alternatively, in implementations, a single sensor of the one or more sensors 3140a, 3145a, 3147a comprises a field of view configured to detect the entirety of one or more work volumes 3105a-c of the enclosed channel 3100.

In implementations, as shown in FIG. 14, determining a location of the at least one of the plurality of deformable articles 12a-n on the stationary floor further comprises determining one or more grip points 15a-15c on the at least one of the plurality of deformable articles 12a-n at which the gripper 3120a will close on the article 12a. In implementations, the one or more grip points 15a-15c are disposed on a high point (e.g., grip point 15a) of the at least one deformable article 12a of the plurality of deformable articles 12a-n. The high point can be a highest point of one or more highest points on the article 12a, the one or more highest points being raised higher than other points on the article 12a relative to the planar surface of the floor 3110 beneath the article 12. Additionally or alternatively, in implementations, one or more grip points 15b-c are disposed on an edge of the at least one of the plurality of deformable articles 12a-n as determined by the controller 3005 based on signals received from the one or more sensors 3140, 3145, 3147. In implementations, as will be subsequently described with regard to embodiments, the controller 3005 is configured to receive or compute a mask of the article 12a to determine the edges of the article 12 (e.g., a continuous outline traced in 2D around the outer periphery of the article 12a on the floor 3110 of the channel 3100) and the one or more grip points 12b-c disposed on the edge.

As previously described with regard to in implementations, the at least one sensor 3140a-c is a camera disposed at, on, or adjacent the ceiling 3111 and/or walls 3112a-d of the enclosed channel 3100. The camera is calibrated to the distance of the stationary floor 3110 and configured to detect a prominence of a deformable article 12 disposed on the floor 3110. In implementations, as shown in FIGS. 10-11 and 14, the device 3000 further comprises one or more light sources 3150a-c in operable communication with the controller 3005. The one or more light sources 3150a-c can comprise at least one of adjustable brightness, intensity, and color. The one or more light sources 3150a-c are configured to adjust lighting within the enclosed channel 3100 for improving perception by the at least one sensor comprising at least one of the at least one senor 3140a-c disposed at, on, or adjacent the ceiling, an upward angled sensor 3145a-c disposed at, or adjacent on of the walls 3112a-d, and a transverse sensor 3147a-c disposed at, or adjacent on of the walls 3112a-d as previously described with regard to implementations. In implementations, one or more of the one or more light sources 3150a-c can be aimed directly or indirectly at the floor 3110 from above or aside the floor 3110. In implementations, the one or more light sources 3150a-c are disposed adjected at least one of the ceiling 3111, one or more walls 3112a-d, and the floor 3110 at least one of within the channel 3100 and external to the channel 3100 and adjacent one or more transparent or diffusive light permitting windows, such as one or more plexiglass windows scaled within the ceiling, walls, and/or floor such that clothing, dirt and debris, loose items, and cleaning fluid do not escape the channel 3100.

Turning now to FIGS. 15A-17B, a series of partial views of the device 3000 are shown for exemplification. A floor 3110 of an enclosed channel is depicted along with a plurality of arms 3115a-c as previously described and boundaries of associated work volumes 3105a-b projected on the floor 3110. As previously described, the controller 3005 is configured to orchestrate movements of the plurality of arms 3115a-c within the enclosed channel 3100 and actuate the associated terminal grippers 3120a-c to grasp, hoist, and release which actuating the at least one motor 3125a-c of each arm 3115a-c to pan, tilt and extend the arm.

In implementations, as shown in FIG. 15A, the controller 3005 is configured to receive a signal from the at least one sensor (e.g., a camera 3140a, 3145a, 3147a) disposed at or adjacent a first work volume 3105a. The signal is indicative of the at least one sensor detecting at least one article 12a of a plurality of deformable articles 12a-n being disposed within the first work volumes 3105a. Because the first work volume 3105a is configured to receive a load of dirty laundry, the at least one article 12a is, in most instances, a mass of a plurality of deformable articles 12a-n, when "n" indicates the maximum number of separate articles in a load of laundry. The plurality of deformable articles 12a-n can be, for example, a pile of non-uniform dirty laundry and the articles comprising the pile of dirty laundry can be overlapped, entangled, and otherwise stuck together or piled atop one another. The controller 3005 is configured to determine a location of the at least one of the plurality of deformable articles 12a-n on the stationary floor 3110 relative to the associated arm 3115a (e.g., the first arm 3115a of the plurality of arms 3115a-c) of the first work volume 3105a.

In implementations, the controller 3005 is configured to aim the gripper 3120a of the first arm 3115a at the center of the area on the floor 3110 occupied by the plurality of deformable articles 12a-n. Additionally or alternatively, as described with regard to FIG. 14, the controller 3005 is configured to aim the gripper 3120a at one of one or more highest points 15a of the plurality of deformable articles 12a-n. Additionally or alternative, the controller 3005 is configured to determine a mask (e.g., mask 3800 of FIG. 46) an article 12 or the plurality of deformable articles 12a-n and edge points as previously described with regard to implementations, and instruct the gripper to aim to engage an article 12 at one of the determined one or more edge points 15b-c. In implementations, the controller 3005 is configured to instruct the gripper 3120 to aim to engage the article at one of the determined one or more edge points 15b-c that is closest to the outlet end O. In implementations, the controller 3005 is configured to determine a mask 3800 of an article 12a or a plurality of articles 12a-n disposed on the floor 3110, randomly select a point 15a within the area of the mask 3800, receive a depth signal from the one or more sensors (e.g., sensors 3140a-c, 3145a-c, 3147a-c), and instruct a gripper 3120 to grab the article 12 at the depth sensed at the selected grip point 15a even if that is not the highest point on the article 12.

As shown in FIG. 15B, the controller 3005 instructs at least one drive 3125a-c to position the terminal gripper 3120a of the first arm 3115a at the determined location to grasp the at least one article 12a of the plurality of deformable articles 12a-n by at least one of rotating, panning, and tilting the arm 3115a and the associated terminal gripper 3120a to the target location. In implementations, the controller 3005 receives a signal form the one or more sensors 3140a-c, 3145a-c, 3147a-c, determines a depth location of the target grip point 15, and determines a target height to which the arm 3115 will move the gripper, the target height being short distance (e.g., 1 cm-3 cm) directly above the target grip point 15. The arm 3115 then moves the gripper 3120 to the target height above the target grip point 15, positioning the joint at the base of the spread gripper fingers 3107a-b (FIGS. 39A-41A) adjacent the article 12 so that the fingers of the gripper 3120 do not push the article 12 away and out of reach. In implementations, the controller 3005 is configured to thus position the gripper so that the fingers 3107a-b of the gripper 3120 close on the target grip point 15 as the arm 3115 is lifting the article 12 off the floor 3110.

With the gripper 3120 positioned at least one of on or directly above the location of the target grip point 15, the controller 3005 instructs an actuator 3174a of the terminal gripper 3120a to close the gripper 3120a on the at least one article 12a of the plurality of deformable articles 12a-n. Additionally or alternatively, in implementations, after selecting the target point 15, the controller 3005 is configured to instruct the one or more drive motors 3125a-c to transit the gripper 3120 to a target location above the determined grip point, then slowly move down at a fraction of the transit speed (e.g. one half, one third, one quarter) in arriving at the target location. The controller 3005 instructs the at least one drive motor 3125a-c to press the gripper 3120 into the article 12 and then retract to a distance at or around 2 cm above the target location grip point while closing the fingers 3107a-b of the gripper 3120 around the grip point of the article 12. In this way, the gripper 3120 is able to grasp small articles successfully, articles such as baby socks and children's gloves, for example, without driving into them at full speed and potentially pushing them out of reach of the gripper fingers 3107a-b.

The controller 3005 is configured to instruct the at least one drive 3125a-c to raise the closed terminal gripper 3120a and the grasped at least one 12a of the plurality of deformable articles 12a-n to a hoist height H1 above the stationary floor 3110, leaving behind articles 12b-n in the received load, where "n" represents the maximum number of separable deformable articles in the received load of deformable laundry articles. As will subsequently be described with regard to implementations, the first gripper 3120a nearest the inlet end I can grasp more than one deformable article 12a-n from the pile of dirty laundry to hand off to the next arm 3115b in an adjacent work volume 3105b. As will be described in detail, the plurality of arms 3115a-c operate in sequence to grasp and release articles down the length of the channel 3100 such that by the third grasp by the third arm 3115c, the more than one initially grasped deformable articles are separated and a single article 12a is held aloft by the final arm 3115c adjacent the outlet O.

In implementations, the device 3000 can include one or more weight sensors disposed each of the plurality of arms 3115s-c, the one or more weight sensor being in operative communication with the controller 3005 and being configured to continuously detect a rate of change as each one of the plurality of deformable laundry articles is raised. The controller 3005 can then determine that one of the plurality of deformable laundry articles is raised to a hoist height when the one or more weight sensors detect an unchanging rate of change of measured weight because the article is lifted completely off the floor 3110 and is no longer supported by the floor 3110, therefore imparting a maximum downward force on the engaged arm 3115a. Additionally or alternatively, the at least one sensor of at least one of a downward angled sensor 3140a-c, a transversely angled sensor 3145a-c (e.g., having a field of view aimed across the channel from one side wall 3112c-d to another), and an upwardly angled sensor 3147a-c, can detect a position of the terminal gripper above the floor 3110 and output a signal to the controller indicative of this height position. Upon receiving the signal, the controller 3005 can then determine that the gripper 3120a is at a hoist height conducive for moving the article into an adjacent work volume 3105b for dropping there. Additionally or alternatively, one or more encoders (e.g., motor encoders 3157a-c, a'-c', a"-c"', FIG. 5) outputs a signal to the controller 3005, and the controller 3005 determines a hoist height of the gripper 3120 engaged with the article 12 by dynamically processing (e.g., processing the one or more encoders signals as the one or more motors 3125a-c are moving the arm 3115) the signal with a calibrated kinematics routine. In implementations, the hoist height is pre-set, and the controller 3005 uses calibrated kinematics to determine when the gripper reaches the pre-set hoist height. Additionally or alternatively, in implementations the at least one sensor 3140a-c, 3145a-c, 3147a-c is configured to detect a gap between the hoisted article and the floor 3110, and output a signal to the controller 3005 for dynamic processing to determine when an article 12 is hoisted to a height at which a detectable gap (e.g., a region from which the detectable article is no longer sensed across the width of the channel 3100) appears between the hoisted article and the floor 3110. In implementations, the at least one sensor 3147a-c comprises a transverse field of view for dynamically detecting the appearance of a gap beneath the article 12 and above the floor 3110.

As shown in FIG. 16A, the controller 3005 instructs the at least one drive motor 3125a-c to at least pan the arm 3115a, gripper 3120a, and hoisted article 12a in the direction D toward the outlet end O of the channel 3100 and into an adjacent work volume 3105b. Additional, the controller 3005 can tilt and extend the first arm 3115a such that the terminal gripper 3120a is positioned within the second work volume 3105b accessible by the second arm 3115b. As shown in FIG. 16B, the controller 3005 is configured to instruct the actuator 3174b of the terminal gripper 3120a to open and release the article 12a in the adjacent work volume 3105b. The controller 3005 receives a signal from at least one sensor (of at least one of a downward angled sensor 3140b, a transversely angled sensor 3145b, and an upwardly angled sensor 3147b) in the adjacent work volume 3105b and determines, based on the received signal, that the at least one deformable article 12a is present on the stationary floor 3110. Similar to the first arm 3115a, the second arm 3115b is configured to grasp the deformable article 12a from the stationary floor 3110 within the associated second work volume 3105b, rotate in the direction D toward the outlet end O of the channel 3100 and release the deformable article in the third work volume 3105c, as shown in FIG. 17A.

In implementations, the controller 3005 is configured to determine whether a terminal gripper 3120a-c missed grasping the article prior to hoisting to the hoist height H1. For example, after the first arm 3115a has hoisted, rotated, and opened the terminal gripper 3120a in a second work volume 3105b, the controller 3005 of the device 3000 can determine that the article is not present on the floor 3110 within the second work volume based on one or more sensor signals from the at least one sensor 3140a-c. The controller 3005 can then at least one of query and receive a signal from the at least one sensor 3140a in the first work volume 3105a and determine a location of the deformable article on the floor 3110 within the first work volume 3105a. The controller 3005 can then repeat the instructions of positioning the terminal gripper 3120a of the first arm 3115a at the determined location to grasp the at least one article 12a of the plurality of deformable articles 12a-n, grasping, raising, rotating, and releasing the article in the second work volume 3105b.

In implementations, as will be described subsequently with regard to the method of operation, the controller 3005 can execute a miss recovery routine. In implementations, the miss recovery routine comprises moving the target grip point 15 inward from an edge by a distance in a range of between about 10-20 mm (e.g., 10 mm, 11 mm, 12 mm, 13 m, 14 mm, 15 mm, 16 mm, 17 mm, 18 mm, 19 mm, 20 mm) in a direction toward the inlet end I with each subsequent attempt after a missed grab. Additionally or alternatively, in implementations, the controller 3005 can determine a center of mass of the mask of the at least one article 12a on the floor 3110 and move the targeted grip point 15 the toward the center of mass with each subsequent attempt after a missed grab. Alternatively, in implementations, the controller 3005 is configured to move the target grip point 15 to some other location within the area of the garment mask (e.g., mask 3800).

Figure 46:
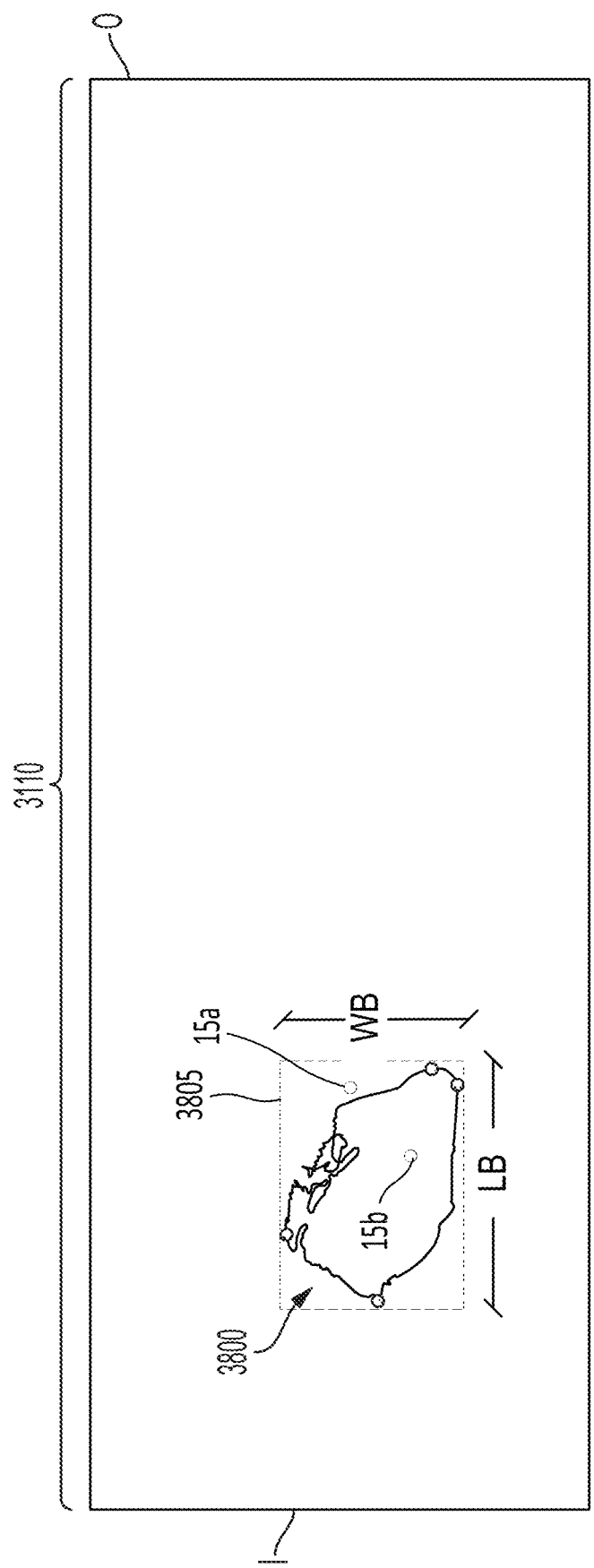
FIG. 46 depicts a schematic of an implementation of image processing to detect an article disposed in the autonomous laundry separating and sorting device.

In implementations, the controller 3005 selects the alternate grip point locations randomly, or by iterating attempted grasps at alternate locations in a deterministic manner. This ensures that the gripper 3120 will find a graspable portion of the article 12, accounting for any spacing between extensions and the core of a garment, such as between sleeves and the torso portions of a shirt, which may place a center of mass in an open location not occupied by the article 12. Additionally or alternatively, in implementations, the controller 3005 is configured to create a bounding box 3805 around the mask 3800 of the article 12 as shown in FIG. 46, the bounding box comprising a length LB and a width WB that places the mask 3800 inside the bounding box 3805. The controller 3005 is configured to choose a random point as the target grip point 15 based on the length LB and width WB of the bounding box, determine whether the grip point 15 is within the mask (e.g., grip point 15b) and not just within in the bounding box (e.g., 15a), and instruct a gripper 3120 to grasp the grip point 15b within the mask area corresponding to the location of the article 12. If the grip point was not within the mask 3800, the controller 3005 randomly selects a new target grip point with the bounding box 3805 and iteratively continues randomly selecting target grip points until a target point is within both the bounding box 3805 and the mask 3800. The randomness of determining a grip point 15 within the bounding box 3805 accounts for the difference in size between an end effector in software path planning (e.g., a single point) and the volume of the gripper 3120, which is a 3D element and not a single point, and results in successful grabs of the article 12 regardless of article size. This enables a gripper 3120 to grab very small items such as baby socks, for example. By comparison, targeting a center of mass could result in the joint at the base of the fingers of the gripper 3120 touching the floor 3110 of the channel 3100 and not reaching the article, even though the center of the gripper 3120 was directly above the given target point, such as an edge point of the small article or a point moved inward from an edge point toward a center of mass.

Additionally or alternatively, in implementations, after selecting the target grip point within the bounding box, the controller 3005 is configured to instruct the one or more drive motors 3125a-c to transit the gripper 3120 to a target location above the determined grip point, then slowly move down at a fraction of the transit speed in arriving at the target location. The controller 3005 instructs the at least one drive motor 3125a-c to press the gripper 3120 into the article and then retract to a distance at or around 2 cm while closing the fingers 3107a-b of the gripper 3120 around the grip point of the article. In this way, the gripper 3120 is able to grasp small articles successfully, articles such as baby socks and children's gloves, for example, without driving into them and potentially pushing them out of reach.

Each of the subsequent arms in the plurality of sequential arms 3115a-c similarly performs a grasp, rotation, and drop down the line of sequential arms 3115a-c and work volumes 3105a-c from the inlet end I to the outlet end O of the channel 3100. By performing sequential grasps, rotations, and drops the device 3000 increases the likelihood that each subsequent grasp will result in the terminal gripper 3120 of an arm 3115 retaining only a single article 12 in the final work volume 3105d for dropping through the outlet orifice 3135. By separating the load of the plurality of deformable articles 12a-n into single articles, the device 3000 is able to sort each one of the plurality of deformable articles 12a-n into a receiving bin 3202 configured to receive a single load of laundry having one or more common characteristics for improved washing and drying. Each article of the plurality of deformable articles 12a-n can be independently detected by the at least one sensor (at least one of a downward angled sensor 3140a-c, a transversely angled sensor 3145a-c, and an upwardly angled sensor 3147a-c), and the controller 3005 can determine one or more characteristics for batching the article into an associated bin 3202a-n. As shown in FIG. 17B, a single article 12a of the plurality of deformable articles 12a-n exits the channel 3100 at the outlet orifice 3135 to be received by a bin 3202 therebeneath.

Also as shown in FIG. 17B, one or more arms of the plurality of arms 3115a-c can operate simultaneously. For example, a third arm 3115c can drop an article 12a through the outlet orifice 3135 into a bin 3202 while a first arm 3115a is rotating into the second work volume 3105b with a hoisted one or more articles 12b-c in its terminal gripper 3120a, leaving behind the remaining plurality of deformable articles 12d-n on the floor 3110 at a load intake position. The first arm 3115b will drop the articles 12b-c from its terminal gripper 3120a onto the floor 3110 in the second work volume 3105b and the terminal gripper 3120b of the second arm 3115b is likely to grasp only one of the two deformable articles 12b-c dropped. Additionally or alternatively, in implementations, the controller 3005 is further configured to drive the at least one drive motor 3125a-c of an arm 3115 of the plurality of arms 3115a-c in at least one of alternating side-to-side and alternating up and down motions to shake a grasped deformable article 12 of the plurality of deformable articles at the hoist height H1. By shaking the terminal gripper 3120 at the hoist height, the arm 3115 can free any articles that may be stuck together, e.g., statically attracted or entangled. This shaking and/or snapping motion will separate two articles hoisted together when only a single article 12 is grasped. This helps prevent two articles 12 from being delivered to a next work volume 3150b-c and therefore helps ensure that only a single article 12 is grasped by the gripper 3120c of the final arm 3115c in the sequentially placed plurality of arms 3115a-c.

Figure 18:
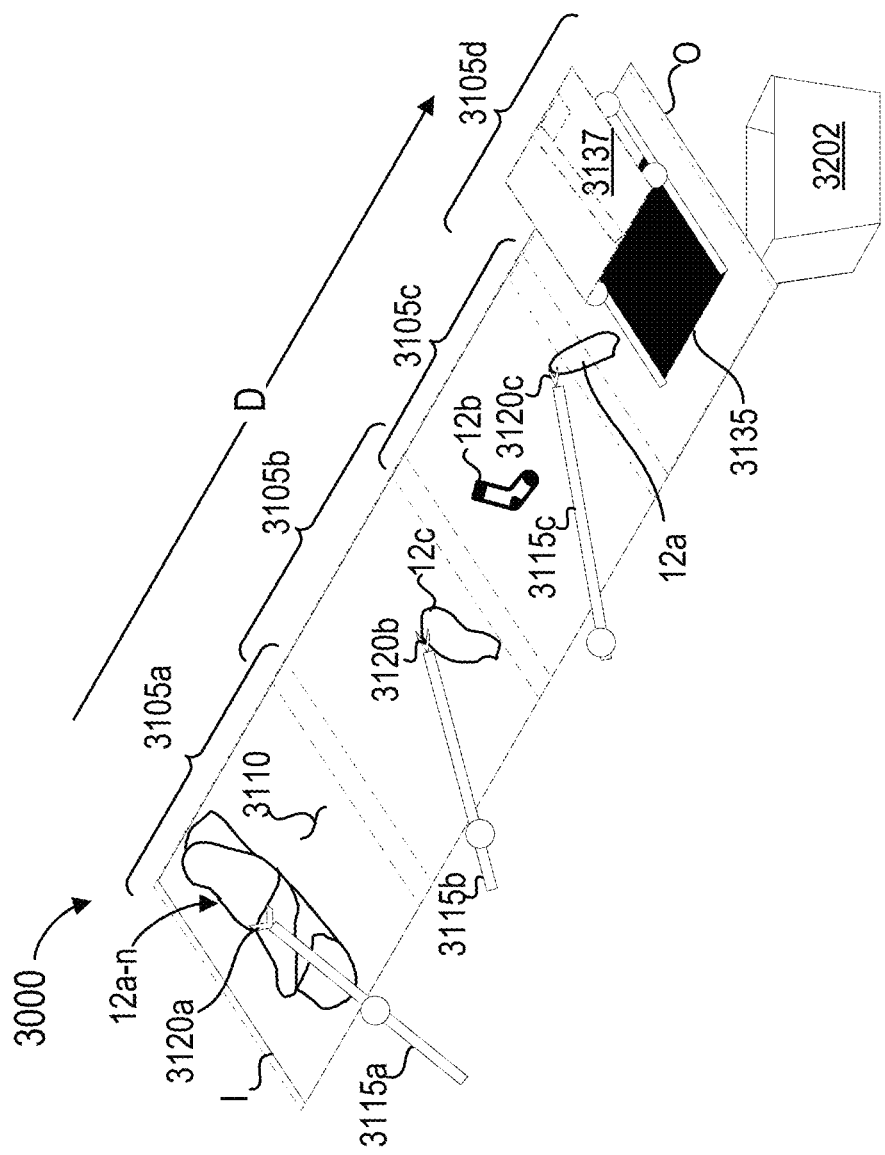
FIG. 18 depicts a schematic perspective view of a portion of the autonomous laundry separating and sorting system during the sorting process.

In implementations, as shown in FIG. 18, the controller 3005 is further configured to determine whether a work volume is clear of any articles before an arm drops another article into that work volume. For example, an article 12b can remain in the third work volume 3105c while a second arm 3115b waits for the third arm 5115c to finish cleaning the third work volume 5105c before releasing another article 12c into the third work volume 3105c. This prevents piling up more than one article in the third work volume 3105c and further ensures that only a single, separated article will be released through the outlet orifice 3135. Table 1 describes an implementation of a decision matrix executed by the controller 3005 based on sensor input for determining whether a work volume 3105, 3105a-c is clear of any articles 12, 12a-n before dropping another article into that work volume:

TABLE 1

| Population count at and in contact with gripper above floor | Floor mask | Work volume floor available to receive new article? | Meaning |
| --- | --- | --- | --- |
| Article detected | Empty | Yes | Grab successful |
| Article detected | Article detected | No | Maybe multiple articles grabbed, maybe large article grabbed |
| Empty | Empty | Yes | Grab successful, small article |
| Empty | Article detected | No | Missed grab/dropped article, or successful small article grab but |

TABLE 1-continued

| Population count at and in contact with gripper above floor | Floor mask | Work volume floor available to receive new article? | Meaning |
|---|---|---|---|
| | | | multiple articles on floor 3110 |

In this implementation, after an arm performs an article 12 hoist, the controller 3005 will evaluate a population count of an output sensor signal (e.g., one or more sensors 3140a-c, 3145a-c, 3147a-c) to determine whether an article is detected in an area under the engaged arm 3115. In implementations, the population count comprises the number of points in a point cloud, and the points comprise at least one of points that have been voxelized and points that have not been voxelized. Alternatively, in implementations, determining a population count indicative of a successful hoist comprises the controller 3005 identifying correlated points between 3D points in a depth map with RGB pixels in an RGB image of the hoisted article based on the output signal of one or more sensors (e.g., one or more sensors 3140a-c, 3145a-c, 3147a-c). This implementation of determining population count can also be used by the controller 3005 for classifying an article at the last hoist above the outlet orifice 3135 before dropping the article into a bin based on at least one of a detected article size and color.

If the population count is detected as large (e.g., at or above a threshold value indicative of an article 12 being detected), the controller 3005 determines that the arm 3115 and gripper 3120 grabbed and hoisted at least one article 12. If the population count is below a threshold value, the controller 3005 determines that the grab missed grasping an article, in which case the article is still on the floor 3110, or the article wasn't missed but is smaller than a threshold population count, e.g., a sock. The controller 3005 determines whether an article is on the floor by evaluation the mask 3800. If the mask processing indicates an empty floor, the controller 3005 determines the grab was successful and the article 12 in the gripper 3120 is small, therefore the floor beneath that arm is available for receiving a new article. If the controller 3005 analyzes the mask and determines the floor is not empty (e.g., an article 12 is detected on the floor 3110), the controller 3005 determines the floor 3110 is not available for receiving another article. In this instance when an article is detected in the gripper and on the floor 3110, either more than one article 12a-n had been deposited on the floor 3110 in the work volume 3105 and one article was hoisted and another left behind on the floor 3110, or the article in the hoisted gripper is large and extends down onto the floor 3110.

If the population count is below a threshold value and the floor mask does not indicate an article being present on the floor 3110, the floor 3110 is available to receive an article. This condition can indicate that the grab was successful, and the item hoisted is small (e.g., below a population count threshold). If the population count is below a threshold value and the floor mask indicates an article being present on the floor 3110, the work volume is not available for receiving another article. This condition indicates either a missed or dropped article or that a small item was successfully grabbed but another article remains on the floor 3110.

Additionally or alternatively to the above described conditions, in implementations, the controller 3005 is configured to account for shadows. For example, if an article is supposedly detected on the floor 3110 of the work volume 3105a of a hoisted arm 3115a, but the arm 3115b corresponding to the next sequential work volume 3105b is stowed, the controller 3005 determines the detected article is a shadow of the hoisted article 12 the engaged arm 3115 is waiting to move to the adjacent work volume 3105b. The controller 3005 can assume this is a shadow and not an article because the arm 3115 for the adjacent work volume 3105b would have tried to pick up the article 12 and would be in a hoisted position.

In implementations, the controller 3005 is configured to stop iterating the sequential grasps, hoists, rotations, and drops when each one of the plurality of deformable articles 12a-n exits the enclosed channel 3100 through the outlet orifice 3135 as a solitary deformable article and no deformable articles remain in the enclosed channel 3100 as detected by the one or more sensors (e.g., at least one of one or more downward angled sensors 3140a-c, one or more transversely angled sensors 3145a-c, and one or more upwardly angled sensors 3147a-c). As will be subsequently described, the controller 3005 is configured to determine that the enclosed channel 3100 is clear of any deformable articles before accepting a new load of dirty laundry (e.g., a new pile of deformable articles 12a'-n') onto the stationary floor 3110 adjacent the intake end I.

Figure 19:
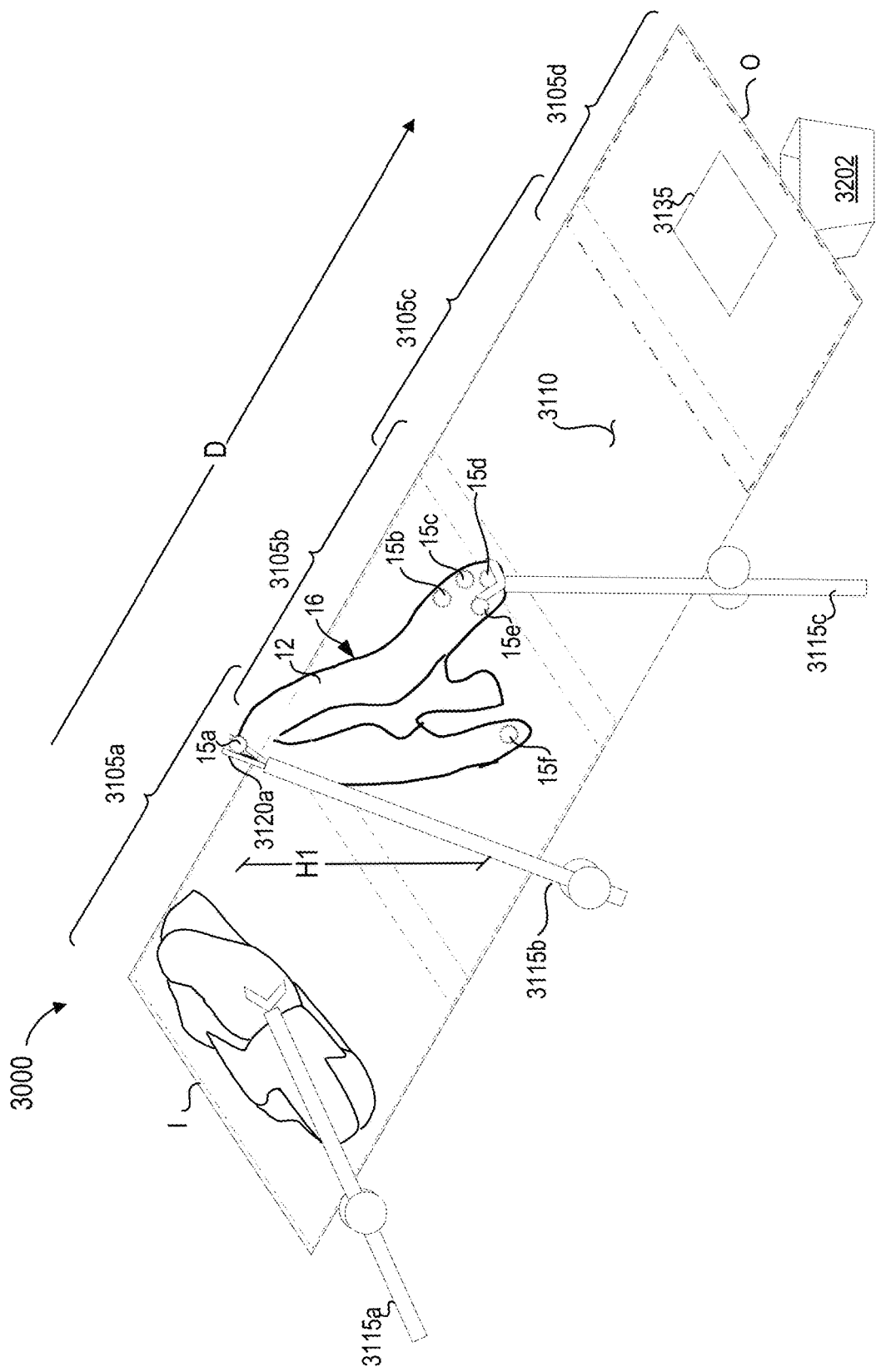
FIG. 19 depicts a schematic perspective view of a portion of an implementation of an autonomous laundry separating and sorting system beginning a two-arm hoist of a deformable article.
Figure 20:
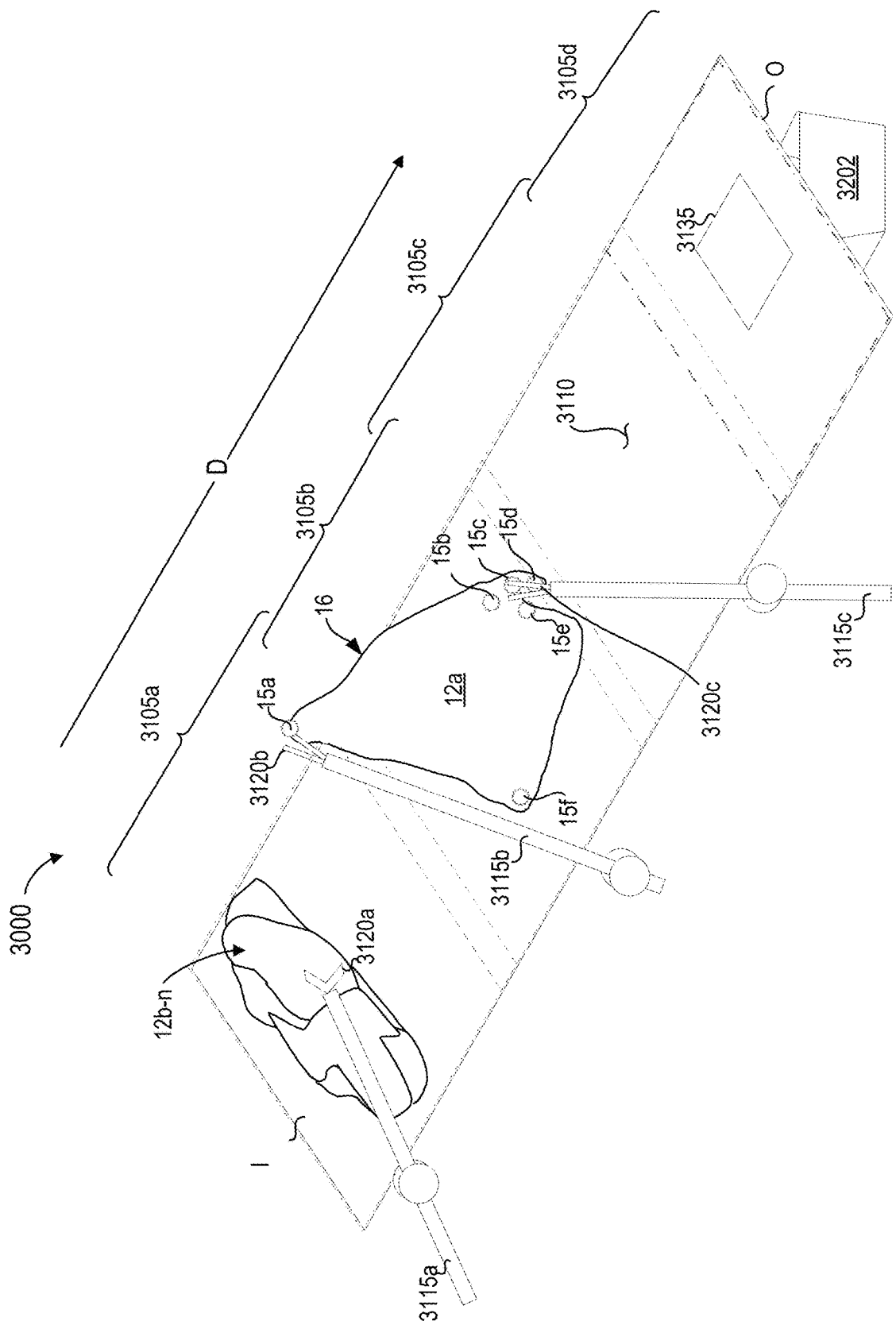
FIG. 20 depicts a schematic perspective view of a portion of the autonomous laundry separating and sorting system of FIG. 19 during a two-arm hoist of a deformable article.
Figure 21:
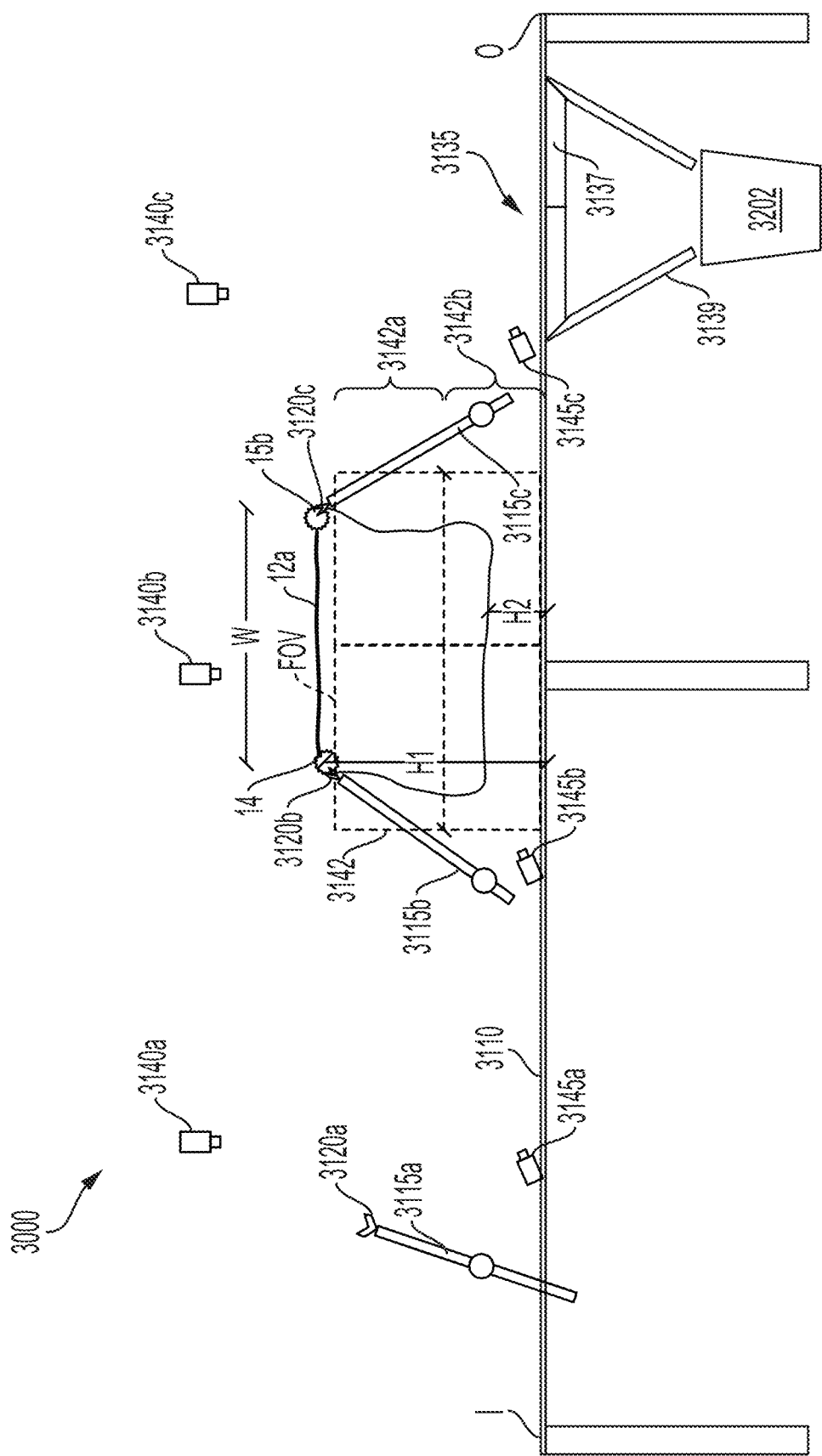
FIG. 21 depicts a schematic perspective view of a portion of the autonomous laundry separating and sorting system of FIG. 20 comprising a two-arm hoist of a deformable article.

Although the above implementations describe each of the plurality of arms 3115a-c rotating a grasped article 12 into an adjacent work volume and the associated terminal gripper 3120a-c releasing the article onto the floor 3110 in in the adjacent work volume, additionally or alternatively, in implementations, one or more of the terminal grippers 3120a-c of the plurality of arms 3115a-c can simultaneously grasp at least one article 12a of the plurality of deformable articles 12a-n at a hoist height H1 without releasing the article onto the floor 3110 so that the article 12a is spread out. For example, as shown in FIGS. 19-21, the controller 3005 can determine one or more grip points 15a-f on a deformable article 12a hoisted by a second arm 3115b. In implementations, the one or more grip points 15a are disposed on an edge 16 of the deformable article 12a. The controller 3005 can instruct a terminal gripper 3120c of a third arm 3115c in a work volume 3105c adjacent the second work volume 3105b to grip one of the one or more grip points 15a-f. For example, the terminal gripper 3120c of the third arm 3115c can grip the lowest grip point 15d on the article 12 as shown in FIG. 19. As shown in FIG. 20, the third arm 3115c can then raise the grasped grip point 15d of the article 12a to the hoist height H1 while the terminal gripper 3120b of the second arm 3115b is still engaged with the article 12a at the hoist height H1.

As shown in FIG. 21, one or more of the engaged second arm 3115b and engaged third arm 3115c can rotate away from the other to spread the article 12a to an uncrumpled state, stopping for example when a resistance sensor in communication with the controller 3005 detects resistance indicative of the article 12a being spread. The second terminal gripper 3120b can then release the article 12a leaving only the third gripper 3120c holding the article 12a at the hoist height H1. In this way, the plurality of grippers 3115a-c continually pass the article 12 between mid-air grasps and by the final grasp, the article is a single article ready for exiting and sorting into a collection bin 3202 for washing. Additionally, in implementations, the controller 3005 can determine whether an article is a large sized item while two or more arms of the plurality of arms 3115a-c simultaneously grasp the article and rotate apart to spread the article to at least a threshold length. The controller 3005 can be configured to estimate a size of the article 12a based on a distance W separating the engaged terminal grippers 3120a-c once tension is detected in the spread article 12a. Tension can be detected, for example, by one or more sensors in communication the controller 3005 for detecting resistance to movement or by monitoring a motor current of the at least one drive motor 3125a-c of each arm engaged with the article 12a. The controller 3005 can access a memory 3010, 210, 235, 240, 250 in wired or wireless communication with the controller 3005, for example via a communication network 230, and cross reference the determined distance W with a database of article size classifications. The determination of a size classification can inform which collection bin 3002 will receive the article 12a, as will be described subsequently with regard to implementations.

Figure 6:
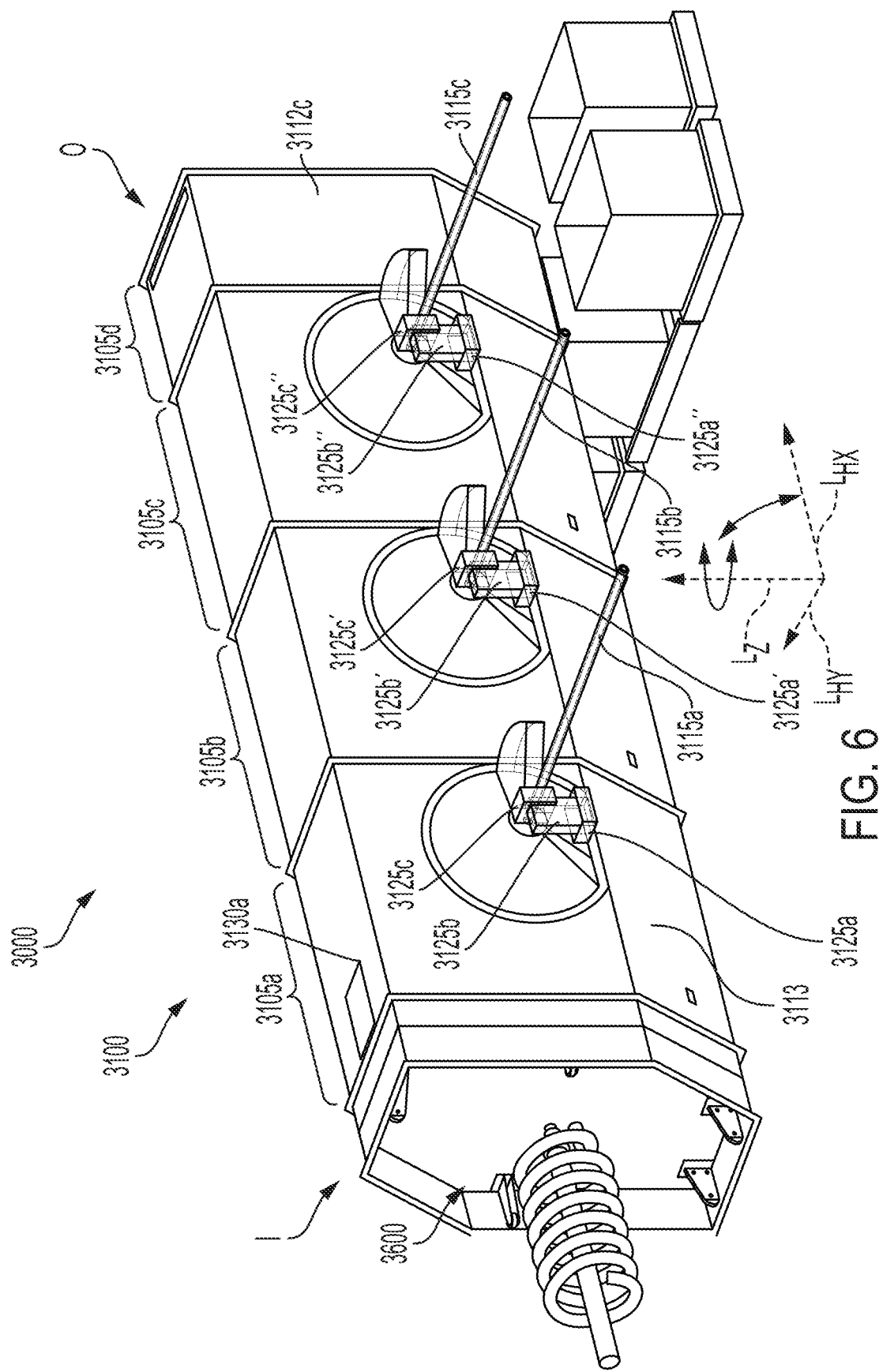
FIG. 6 depicts a perspective view of an arm side of an implementation of an autonomous laundry separating and sorting device.
Figure 7:
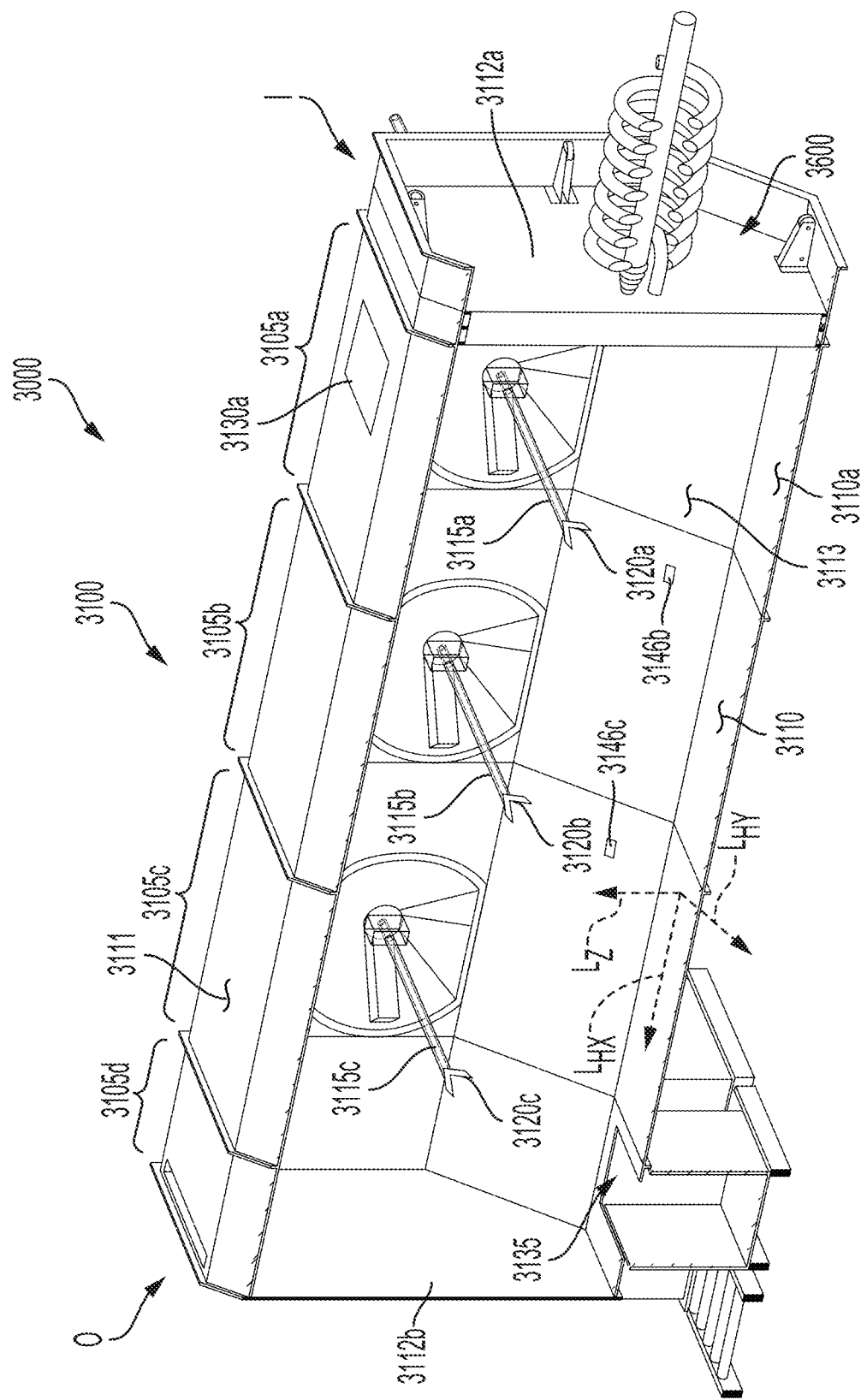
FIG. 7 depicts a cut away perspective view of an interior of the autonomous laundry separating and sorting device of FIG. 6.
Figure 8:
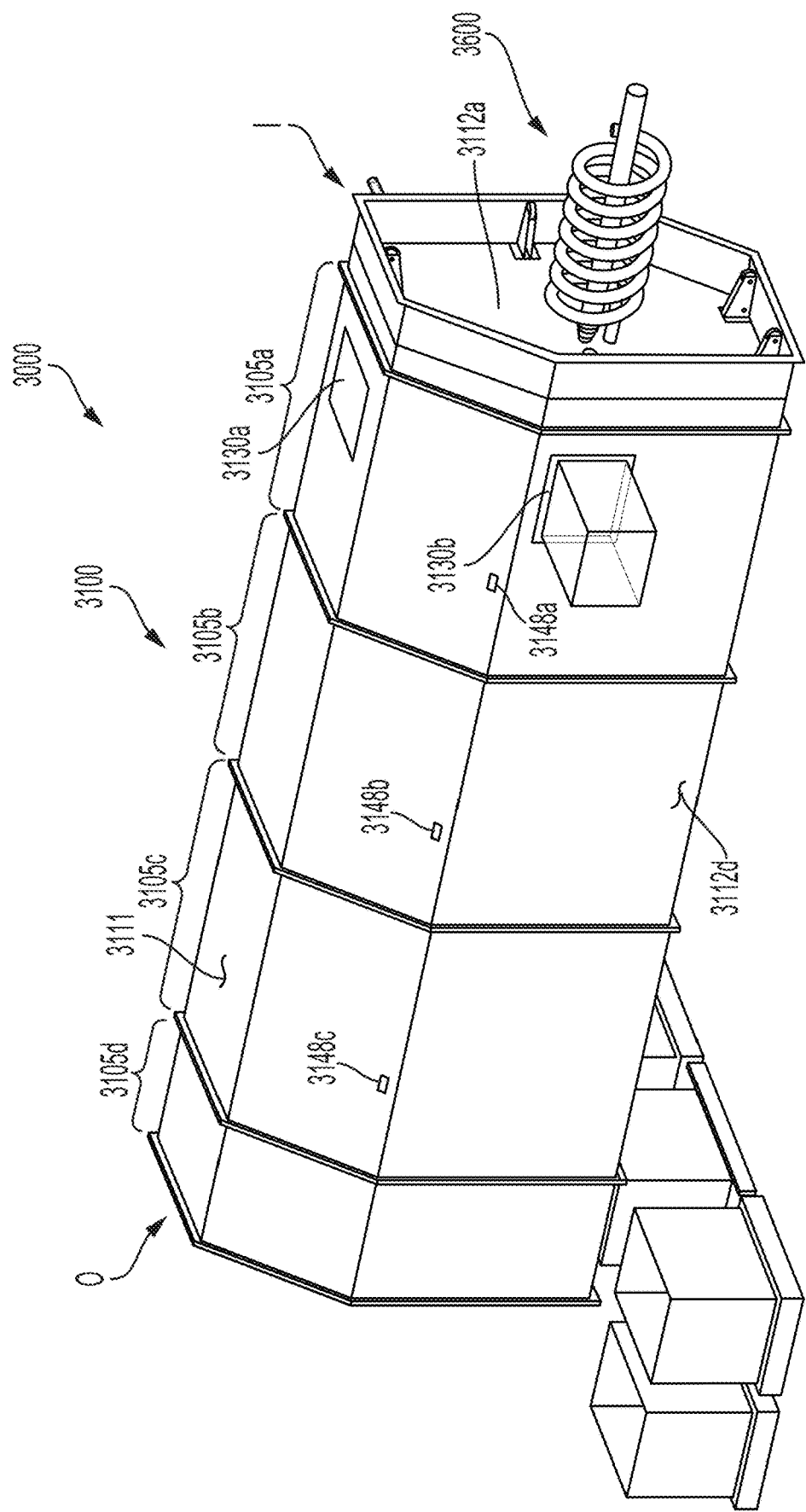
FIG. 8 depicts a perspective view of a back side of the autonomous laundry separating and sorting device of FIG. 6.
Figure 9:
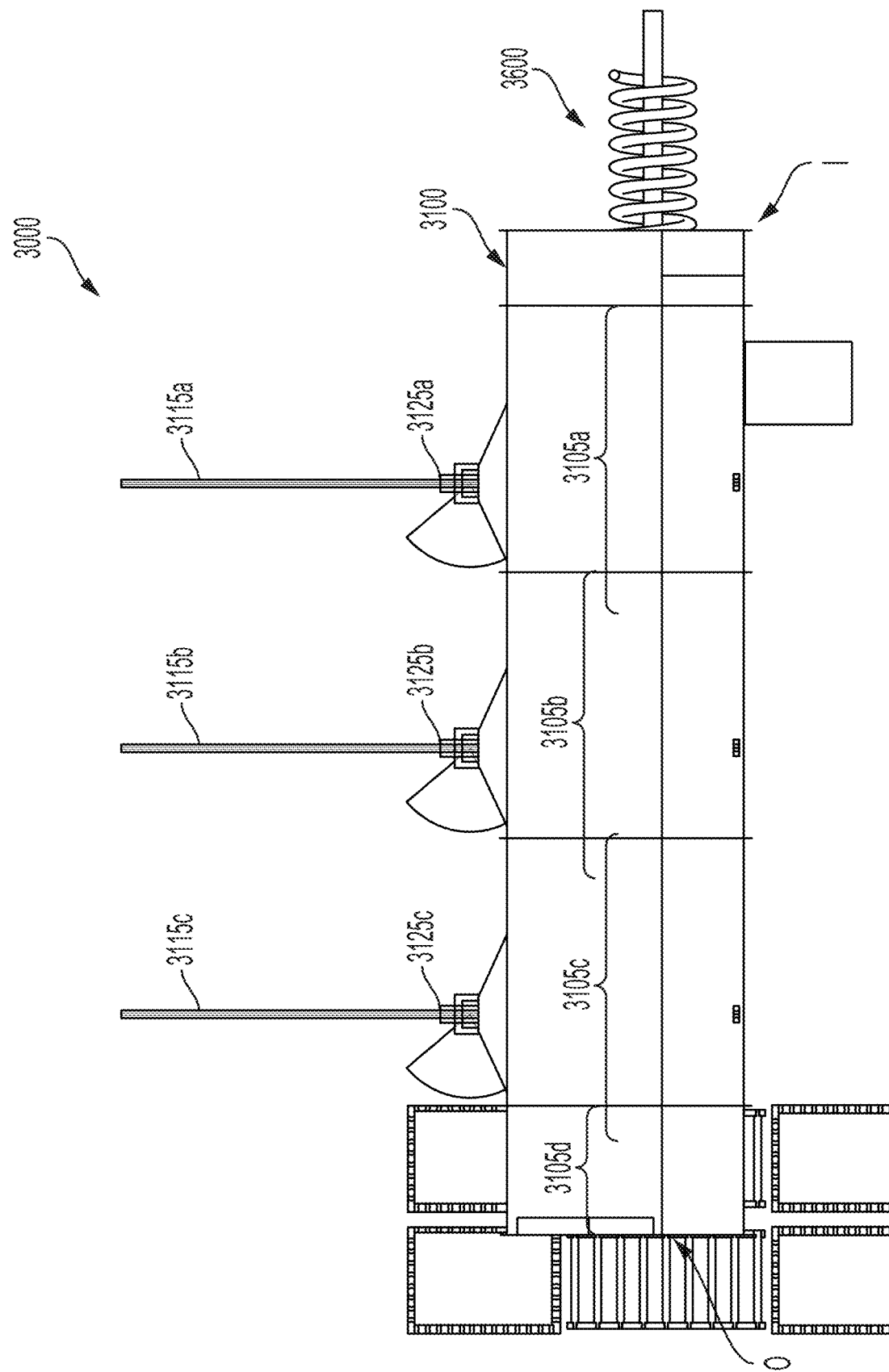
FIG. 9 depicts a schematic top down view of an implementation of an autonomous laundry separating and sorting device.

Although FIGS. 14-22 show the plurality of arms 3115a-c and floor 3110 of the channel 3100 absent the remaining enclosure walls 3112a-d for exemplary purposes, in implementations, the enclosed channel 3100 is fully enclosed on all sides including at the inlet end I and outlet end O. Additionally, in implementations, as shown in FIGS. 6-7, a lower portion 3113 of the channel side wall along the arms (e.g., arm wall 3112c of FIG. 6) can be angled inward toward the lower edge meeting the floor 3110 such that any of the plurality of deformable articles 12a-n falling too close to the arm wall 3112c during a drop will slide down under the force of gravity onto the floor 3110, within reach of one or more of the plurality of arms 3115a-c. Also as will be subsequently described in further detail with regard to implementations, the inlet orifice 3130a-b and outlet orifice 3135 each comprise an actuated covering for selectively exposing and scaling each of the orifices, the controller 3005 being in operative communication with the actuator of each covering for sealing and uncovering the openings of the enclosed channel 3100 only when required to receive a load of deformable articles 12a-n through the inlet orifice 3130a-b into the channel 3100 and to allow a separated one of the deformable articles 12 to exit the channel 3100 through the exit orifice 3135. By selectively sealing and uncovering the openings 3140a-b, 3135, the device 3000 contains the dirty load of deformable articles 12a-n and any loose items (e.g., buttons, hair ties, pocket change, pens) dirt, debris, and other biological matter that may be on the deformable articles 12a-n. This prevents the loss of personal items and the spread of dirt, debris, and potentially harmful matter from spreading throughout the process line 100, particularly to clean loads of deformable articles being processed by other robots of the process line 100. The channel 3100 can be autonomously sealed for autonomous cleaning and sanitization between loads of laundry and any lose articles can be autonomously collected for return to the customer in one or more customer containers or boxes.

Figure 23:
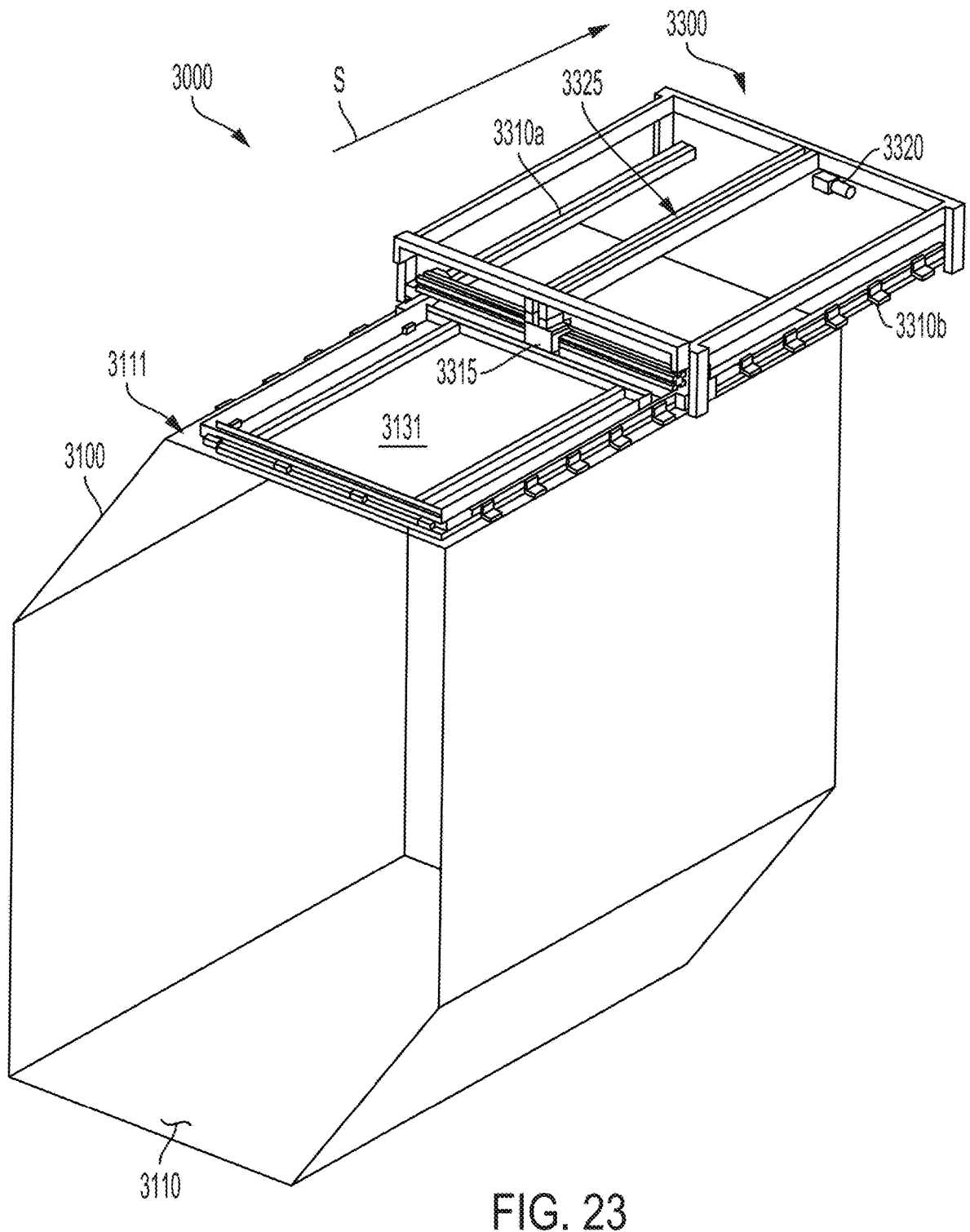
FIG. 23 depicts a perspective partial view of an implementation of the autonomous laundry separating and sorting device comprising an actuatable inlet orifice door.

Turning to FIGS. 23-24C, in implementations, the inlet orifice 3130a is disposed in a ceiling 3111 of the enclosed channel, adjacent the inlet end I such that a plurality of deformable articles 12a-n received therethrough lands upon the floor 3110 of the channel adjacent a first arm of a plurality of arms 3115a-c disposed sequentially along the length of the channel 3100. The inlet orifice 3130a is selectively sealed by a slidable door 3131 configured to be drawn away from the inlet orifice 3130a when a load of deformable articles is ready for placement into the enclosed channel 3100. In implementations, the door 3131 comprises one or more pair of rollers 3305a-b, 3307a-b, 3308a-b configured to slide along a pair of rails 3310a-b disposed therebetween such that the door 3131 moves up and back at a slight incline in the direction of arrow S. In implementations, the rollers 3305a-b, 3307a-b, 3308a-b are spring loaded bearing rollers, and the pair of rails 3310a-b are mounted astride the inlet orifice 3130a. For example, in implementations, the door 3131 can raise up in a range of about 10-15 mm. In implementations, the door 3131 is mounted on one end to a spring loaded hinge 3315 that pulls the door 3131 up an inclined pair of rails 3310a-b having a total rise of about 12 mm. Implementations of the door 3131 being a sliding door provides the benefits of a fast opening and closure to minimize the time the inlet orifice 3130a is exposed. This prevents exposing other robots in the process line 100, 100a-c to potential dirt, debris, biohazardous substances, and other contaminants and detritus that might escape from a sealed box of one or more dirty articles 12, 12a-n.

In implementations, the sliding trap door 3131 is actuated by a drive motor 3320 in operable communication with the controller 3005 for selectively scaling and exposing the inlet orifice 3130a on demand. The drive motor 3320 can be configured to rotate a movable track 3325 to which the spring loaded hinge 3315 is attached. In implementations, the drive motor 3320 can be a low profile linear drive that enables the trapdoor assembly 3300 to have a low profile atop the enclosed channel 3100. As will be subsequently described, the low profile enables a box tipping assembly 3400 to be mounted in close proximity with the inlet orifice 3130a thereby minimizing or eliminating exposure of the box contents (e.g., one or more dirty articles 12, 12a-n) to the exterior and surrounding environment external to the enclosed channel 3100. This prevents the load of one or more deformable articles 12, 12a-n therein and any dirt, detritus, debris, and/or biological matter from falling outside the enclosed channel 3100. As will be described subsequently with regard to implementations, the box tipping assembly is designed to avoid contamination of the process line 100 at large and the exterior of the enclosed channel 3100 in particular by dirty laundry (e.g., one or more dirty articles 12, 12a-n). Only the cleanable interior surfaces of the enclosed channel 3100 are touched by dirty laundry released from a customer box.

Figure 25:
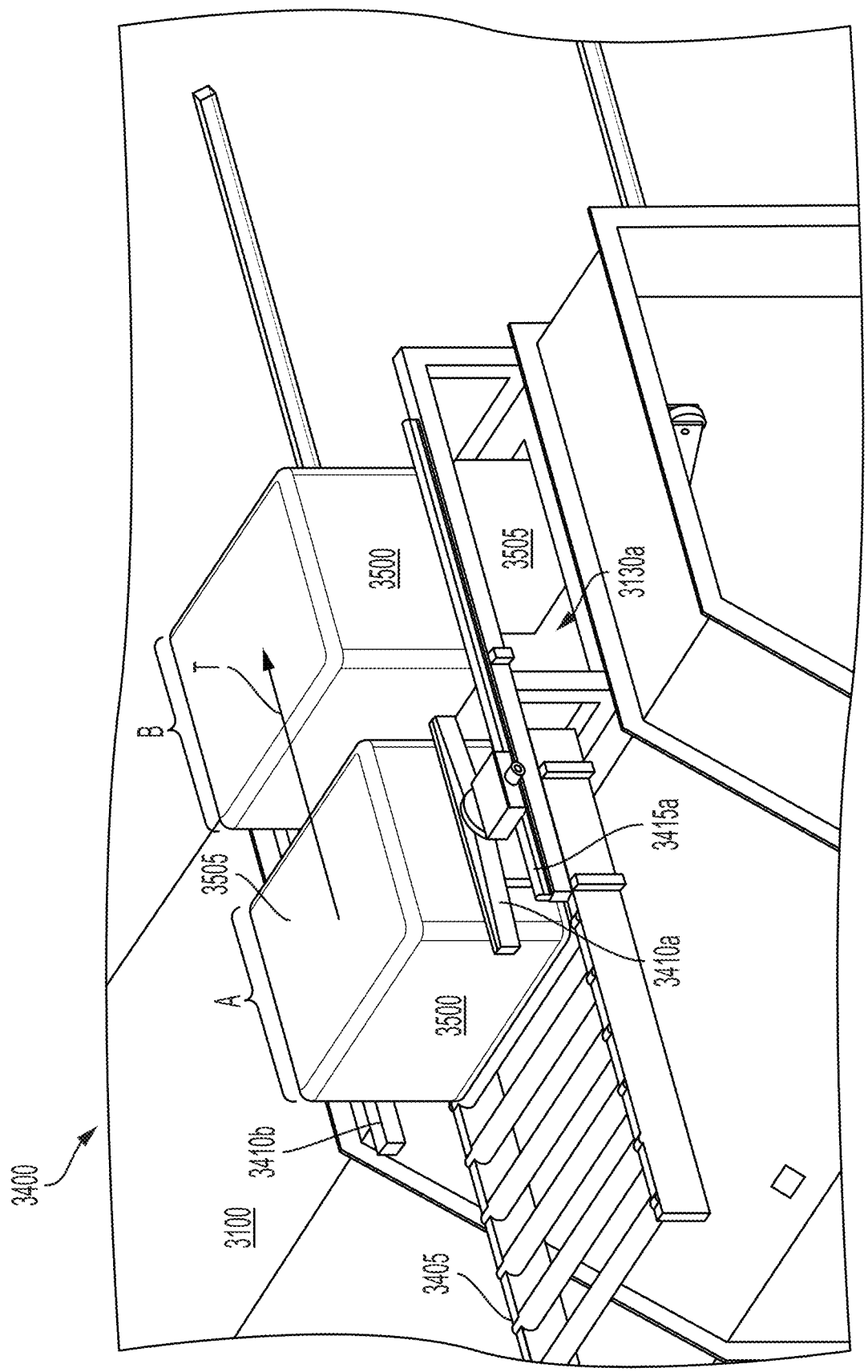
FIG. 25 depicts an implementation of a system for introducing deformable articles into the autonomous laundry separating and sorting device.
Figure 26:
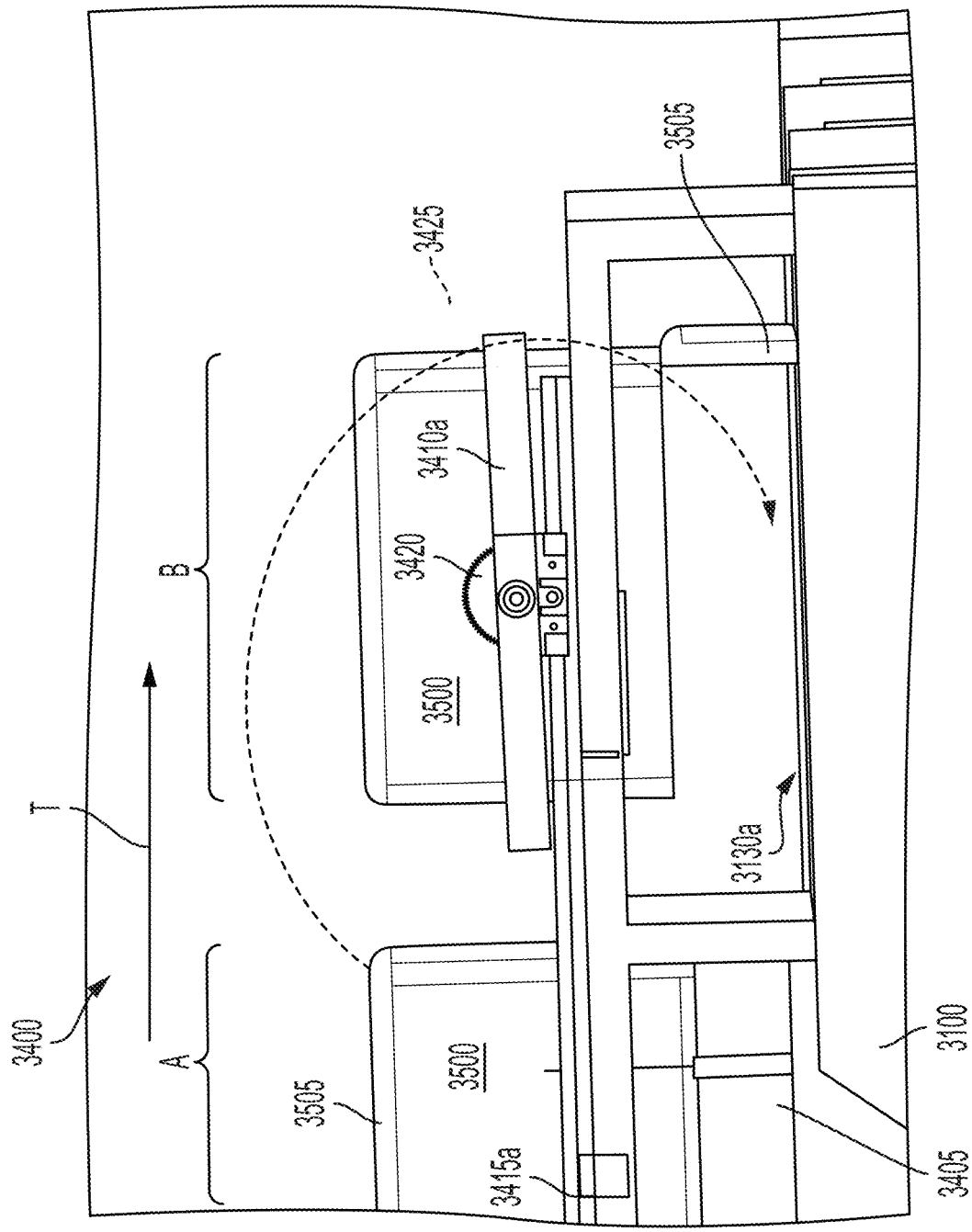
FIG. 26 depicts a side view of the system of FIG. 25.
Figure 27:
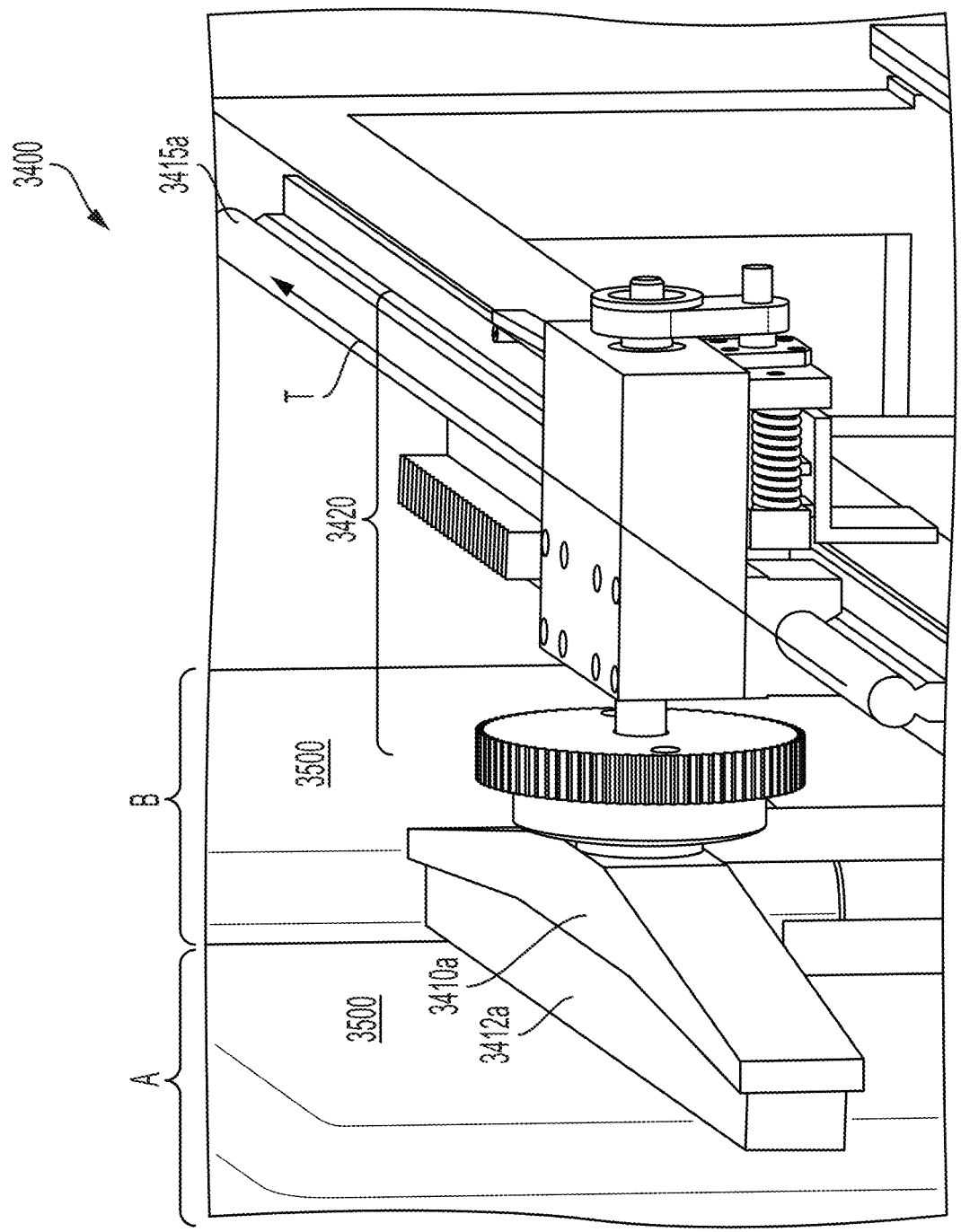
FIG. 27 depicts an enlarged view of a portion of a portion of the system of FIG. 25.

As shown in FIGS. 25-27, upon alignment of a sealed box 3500 containing the plurality deformable articles above the inlet orifice 3130a, the controller 3005 actuates the inlet door 3131 to reveal the inlet orifice 3130a before emptying the contents of the aligned box 3500 into the enclosed channel 3100. In implementations, a box 3500 containing a plurality of dirty deformable articles 12a-n from a single customer (e.g., household) is autonomously queued to a first position A adjacent the inlet orifice 3130a, for example on a conveyor and/or flow rack 3405. When the enclosed channel 3100 is ready to being a separation and sorting processing, the controller 3005 instructs a pair of rotatable clamps 3410a-b to engage the box 3500. The box 3500 then moves along a pair of rails 3415a-b in a direction from the first position A to the second position B (as indicated by arrow T) directly above the inlet orifice 3130. In implementations, the controller 3005 is configured to simultaneously instruct a drive to advance the box 3500 to the second position B while opening the door 3131 to expose the orifice 3130a. Alternatively, the controller 3005 instructs a conveyor drive 3445 (FIG. 5) to advance the box 3500 to the second position B and instructs the drive motor 3320 of the trap door 3131 to open the door 3131 once the box 3500 is positioned above the door 3131. In implementations, as shown in FIGS. 25-27, the box tipping assembly 3400 comprises a cam follower and bidirectional gear engagement assembly 3420 configured to rotate the box 3500 to an inverted position for dropping the plurality of deformable articles onto the stationary floor 3110 of the enclosed channel 3100. In implementations, the gear engages a rack for rotating the box 3500 such that a lid 3505 flips open into the orifice 3130a and contents fall into the enclosed channel 3100. In implementations, the lid 3505 is a hinged lid configured to open into the inlet orifice 3130a upon rotation of the box 3500 to an inverted position. In implementations, the box 3500 is rotated with the lid 3505 hinged at the leading edge of rotation such that the lid 3505 blocks any deformable articles from falling anywhere other than into the inlet orifice 3130a.

Turning to the system schematic of FIG. 5, the box tipping assembly 3400 comprises a processor 4705 in wired or wireless communication with the controller 4005 via a network interface 4735. The box tipping assembly 3400 comprises a driven conveyor 3405 driven by a conveyor drive 3345 in operable communication with a reversible conveyor motor (not shown). The driven conveyor 3405 is configured to receive a full box 3500 into the box tipping assembly 3400 and eject the righted box 3500 once emptied. In implementations, the driven conveyor 3405 further comprises an incremental shaft encoder 3455 on the conveyor motor configured to rotate the driven conveyor 3405 by a measurable amount to move a box 3500 into a clamping position, position B. Additionally or alternatively, the conveyor 3405 comprises at least one position sensor 3450 configured to detect a position of a box 3500 within the box tipping assembly 3400 and transmit a signal to the processor 3430 of the box tipping assembly 3400 to actuate the pair of rotatable clamps 3410a-b to retain the box 3500 for tipping. In implementations, the position sensor 3450 comprises at least one of one or more non-contacting electromagnetic switches (e.g., Hall effect sensors), one or more mechanical limit switches, one or more photoelectric proximity switches (e.g., break beams), one or more inductive sensors, and one or more time of flight distance sensors configured to detect the presence of the position of the clamped box 3500 along the pair of rails 3415a-b and output a signal to the conveyor drive 3445 to stop moving the conveyor 3405. The box tipping assembly 3400 further comprises a tipper drive 3440 in operable communication with a tipper motor configured to rotate at least one of the pair of rotatable clamps 3410a-b to invert a box 3500 clamped therein. In implementations an incremental shaft encoder is disposed on the drive motor shaft of the tipper motor for detecting a rotational position of the pair of rotatable clamps 3410a-b. Additionally, in implementations, the box tipping assembly 3400 comprises one or more limit switches configured to detect at least one of the pair of rotatable clamps 3410a-b being upturned and the pair of rotatable clamps 3410a-b being inverted.

Figure 28:
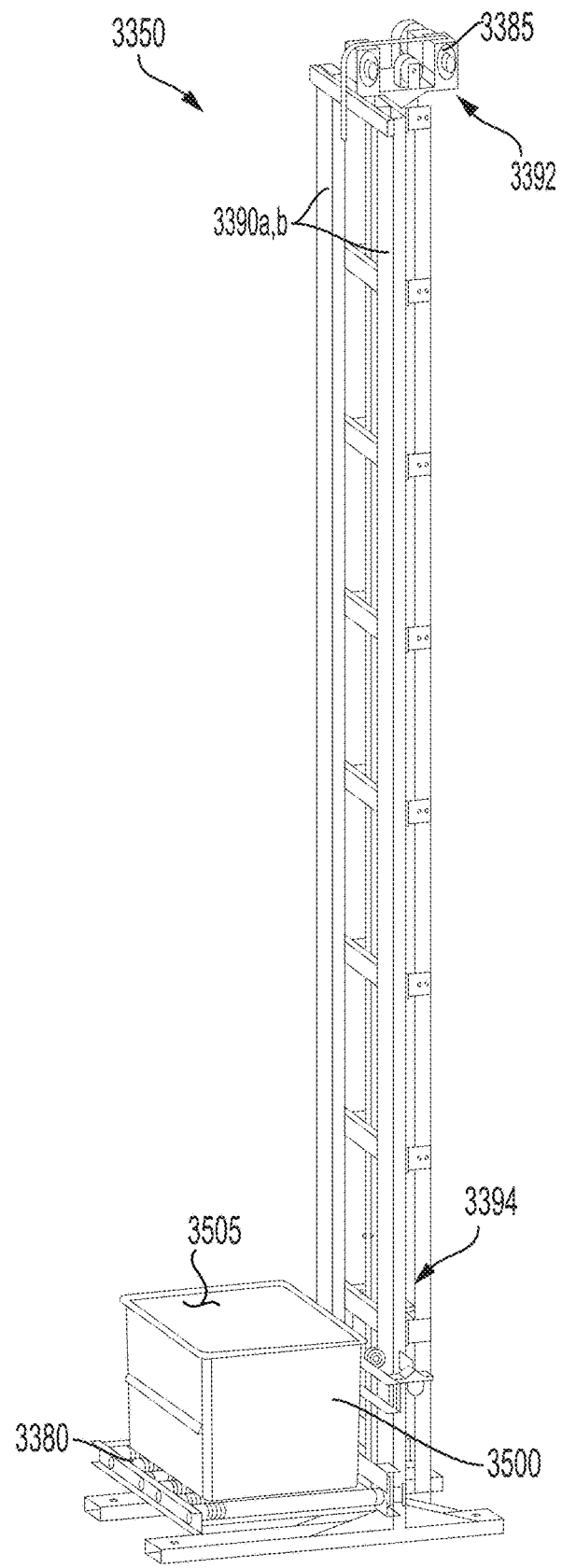
FIG. 28 depicts an elevator configured to raise a container (e.g., box) of dirty laundry articles for transfer to an autonomous dirty laundry box tipping assembly disposed above the separating and sorting robot.

Additionally, in implementations, as shown in FIG. 28 an elevator 3350 can raise a closed and/or sealed box 3500 to a conveyor and/or flow rack 3405 of the box tipping assembly 3400 and transfer the box 3500 to the box tipping assembly 3400 for emptying into the enclosed channel 3100. As shown in FIGS. 5 and 28, in implementations, the elevator 3350 is disposed adjacent the enclosed channel 3100 and comprises one or more load sensors 3359, such as one or more undermounted loadcells, for detecting a box 3500 received thereon for elevating to the inlet orifice 3130a. In implementations, the elevator 3350 comprises a driven roller conveyor 3380 for receiving the box 3500 thereon from the separating and sorting robot 3000. The roller conveyor 3380 is movably attached to one or more vertical risers 3390a-b and driven up and down the vertical risers by a drive motor 3385 and puller system 3392 that includes a counterweight 3394.

As shown in the system schematic of FIG. 5, in implementations, the elevator 3350 comprises a processor 3355 in wired or wireless communication with the controller 4005 via a network interface 3370. The elevator 3350 comprises an elevator drive 4415 in operable communication with a pulley system drive motor 4465 and a conveyor drive 3365 in operable communication with a reversible conveyor motor 3385 configured to receive a full box 3500 for elevating and an emptied box 3500 for lowering. In implementations, the elevator 3350 further comprises a load sensor 3359 for detecting the presence of a box 3500 on the conveyor 3380 and a position sensor configured to detect alignment of the conveyor 3380 with the conveyor and/or flow rack 3405 of the box tipping assembly 3400. Additionally or alternatively, the conveyor 3380 comprises at least one position sensor 3375 configured to detect a position of a box 3500 on the conveyor 3380 and transmit a signal to the processor 3355 of the elevator 3350 to actuate the drive motor 3385 to raise the box 3500 for transferring to the box tipping assembly 3400. In implementations, the position sensor 3375 comprises at least one of one or more non-contacting electromagnetic switches (e.g., Hall effect sensors), one or more mechanical limit switches, one or more photoelectric proximity switches (e.g., break beams), one or more inductive sensors, and one or more time of flight distance sensors configured to detect the presence of the position of the clamped box 3500 along the conveyor 3380 as the box 3500 is being received thereon and output a signal to the conveyor drive 3367 to stop moving the conveyor 3380.

Figure 29A:
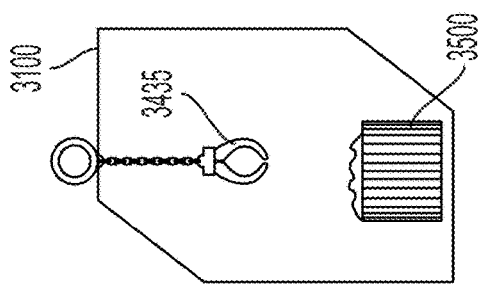
FIG. 29A depicts an alternate schematic implementation of systems for introducing deformable articles into the autonomous laundry separating and sorting device with a vacuum tube.
Figure 29B:
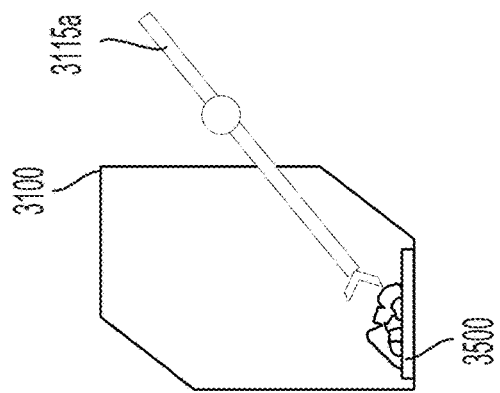
FIG. 29B depicts an alternate schematic implementation of systems for introducing deformable articles into the autonomous laundry separating and sorting device comprising a lay-flat box configured to open and lay flat to reveal contents within an enclosed channel.
Figure 29C:
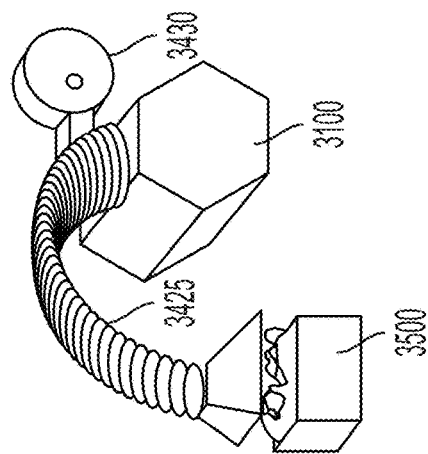
FIG. 29C depicts an alternate schematic implementation of systems for introducing deformable articles into the autonomous laundry separating and sorting device with a grabbing claw for removing articles from a container received within an enclosed channel.
Figure 29D:
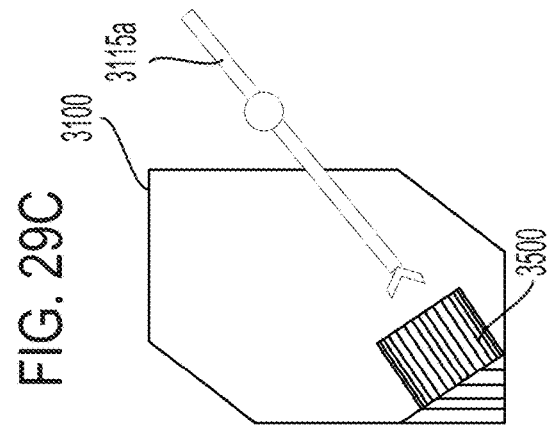
FIG. 29D depicts an alternate schematic implementation of systems for introducing deformable articles into the autonomous laundry separating and sorting device with a sliding shelf configured to pass a container through an orifice, into an enclosed channel and rotate to dump the contents of the container within the enclosed channel.
Figure 29E:
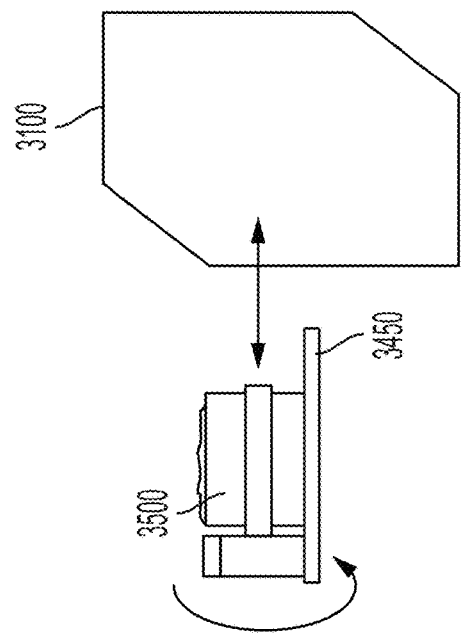
FIG. 29E depicts an alternate schematic implementation of systems for introducing deformable articles into the autonomous laundry separating and sorting device comprising an angled shelf for tilting a container introduced into an enclosed channel for emptying by an arm of the device.
Figure 30A:
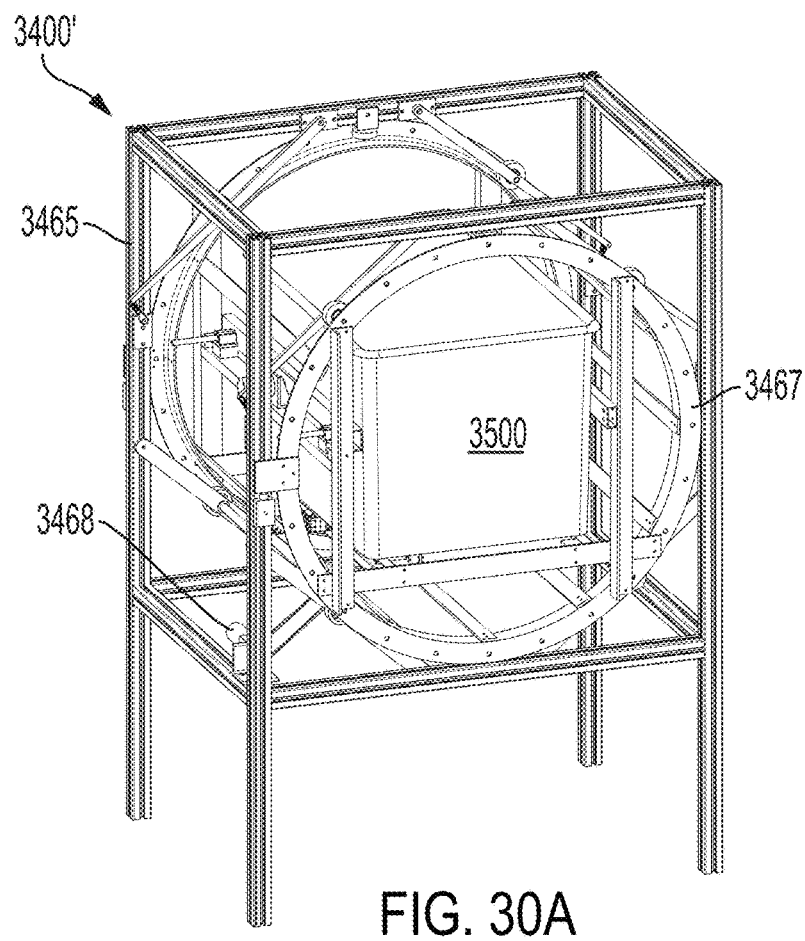
FIG. 30A depicts an autonomous dirty laundry box tipping assembly for loading dirty laundry into an autonomous washing and drying device from a bin held therein.
Figure 30B:
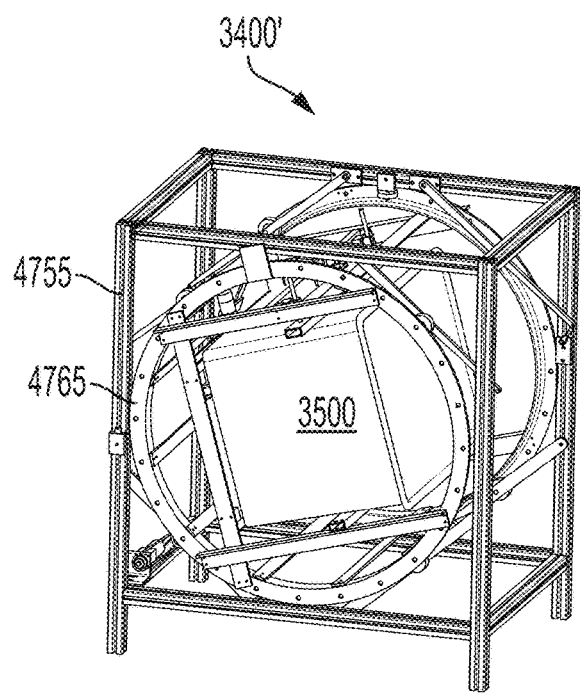
FIG. 30B depicts the autonomous dirty laundry box tipping assembly of FIG. 30A in a partially overturned rotational position.
Figure 30C:
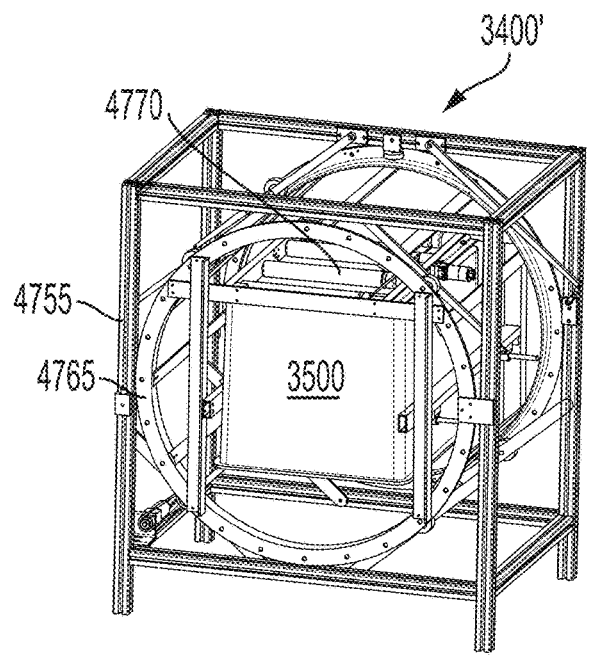
FIG. 30C depicts the autonomous dirty laundry box tipping assembly of FIG. 30A in a fully inverted rotational position.
Figure 31:
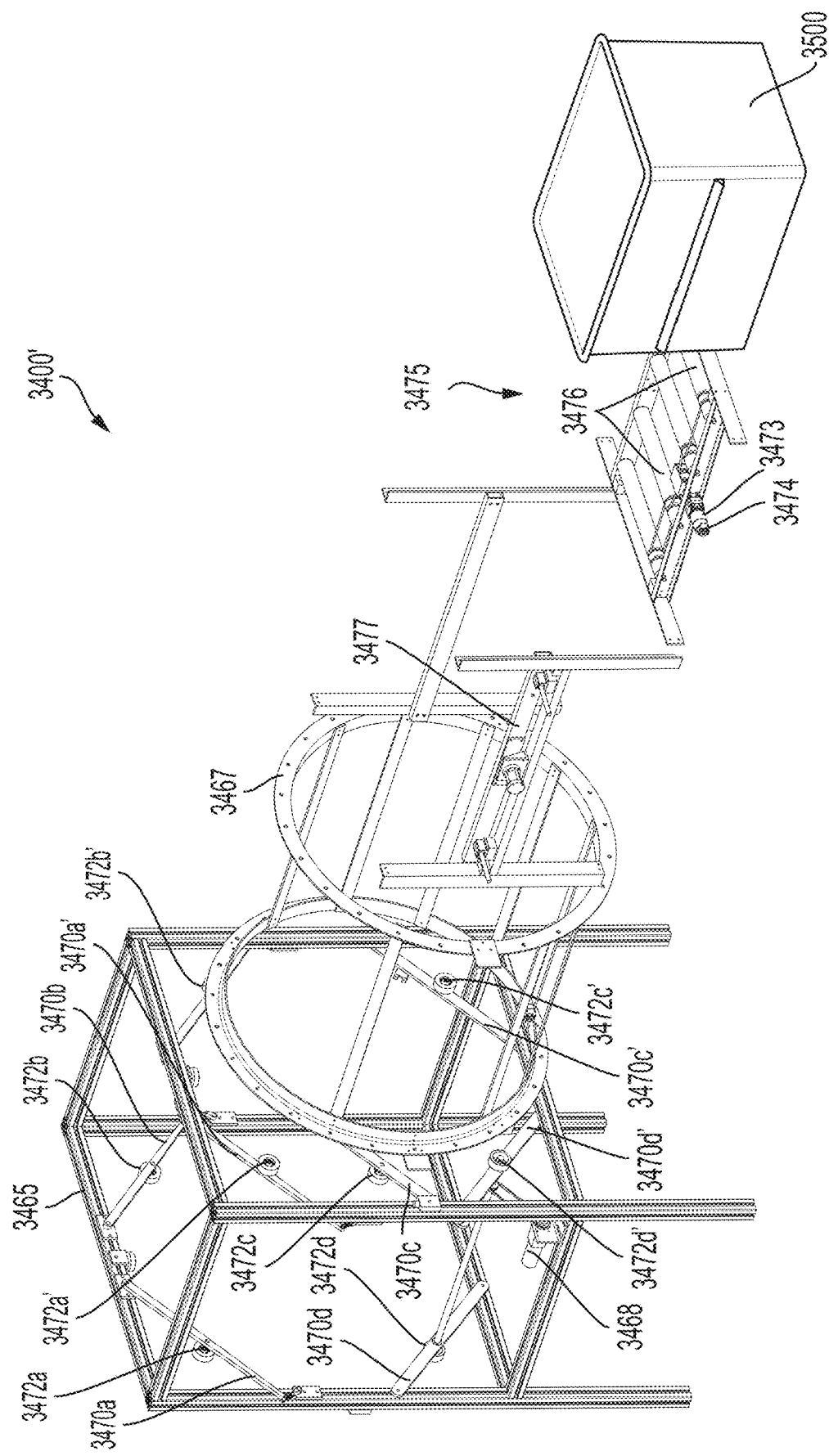
FIG. 31 depicts an exploded view of the autonomous dirty laundry box tipping assembly of FIG. 30A relative to a box.

Although the inlet orifice 3130a is describe as a selectively exposed orifice in the ceiling 3111 of the enclosed channel 3100 configured to receive a plurality of deformable articles from a box 3500 disposed above the orifice 3130a, other intake assemblies and methods are contemplated. As shown in FIGS. 29A-E, alternate methods of introducing a plurality of deformable articles 12a-n into the enclosed channel 31 comprises sucking the close in through a flexible tube 3425 in communication with a vacuum 3430 (FIG. 29A), and inserting the box 3500 into the enclosed channel 3100 through a side opening 3130b (see FIG. 7) and pulling the deformable articles from the box 3500. For example, FIG. 29B shows a box 3500 inserted into the enclosed channel 3100 and opened to a lay-flat stay, exposing the one or more deformable articles 12a-n within the channel 3100 only once the inlet orifice is sealed, thereby containing all dirt and other potential contaminants within the washable channel 3100. In implementations, as shown in FIG. 29C, instead of having side walls the unfold to lay flat, a box 3500 comprises a removable or hinged lid and a gripper 3435 of an extendable arm is lowered into the box to remove one or more deformable articles therein once the box is received within the enclosed channel 3100. In implementations, as depicted in FIG. 29D, a sliding drawer or extendable conveyor tongue can deliver a box 3500 through a side orifice 3130a into the channel 3100. In implementations, as shown in FIG. 29E, a wall in which the orifice 3130a is disposed comprises an angled base for slidably receiving a box 3500 thereon in a tipped orientation for easy accessibility by an arm 3115a in the first work volume of the enclosed channel 3100.

In implementations as shown in FIGS. 30A-C and 31, the box tipping assembly 3400' comprises a framed tumbler 3467 positioned above an inlet orifice 3130b in the ceiling of the channel 3100. After clamping the box 3500 within the tumbler, a drive motor 3468 of the tumbler 3467 can rotate the clamped box 3500 on command from the controller 3005 to invert the box 3500 and dump the one or more deformable articles 12a-n through the frame 3465 and into the inlet orifice 3130a of the channel 3100. As described previously with regard to implementations, the box 3500 can be sealed with a selectively removable lid, such as a hinged lid (not shown) that opens under gravitational force as the box 3500 is inverted. In implementations, the box tipping assembly 3400' comprises a frame 3465 and suspension elements 3470a-d, 3470a'-d' disposed thereon configured to rotatably engage a tumbler 3467 configured to receive a box 3500 containing one or more deformable articles 12a-n. In implementations, the device 3000 comprises an autonomous conveyor (not shown) configured to transit the box 3500 from a rack or storage area to at least one of the box tipping assembly 3400' and, as shown in FIG. 28, an elevator 3350 configured to receive the box 3500 and raise the box 3500 to a height of the box tipping assembly 3400' for conveyance into the tumbler 3467.

Figure 32:
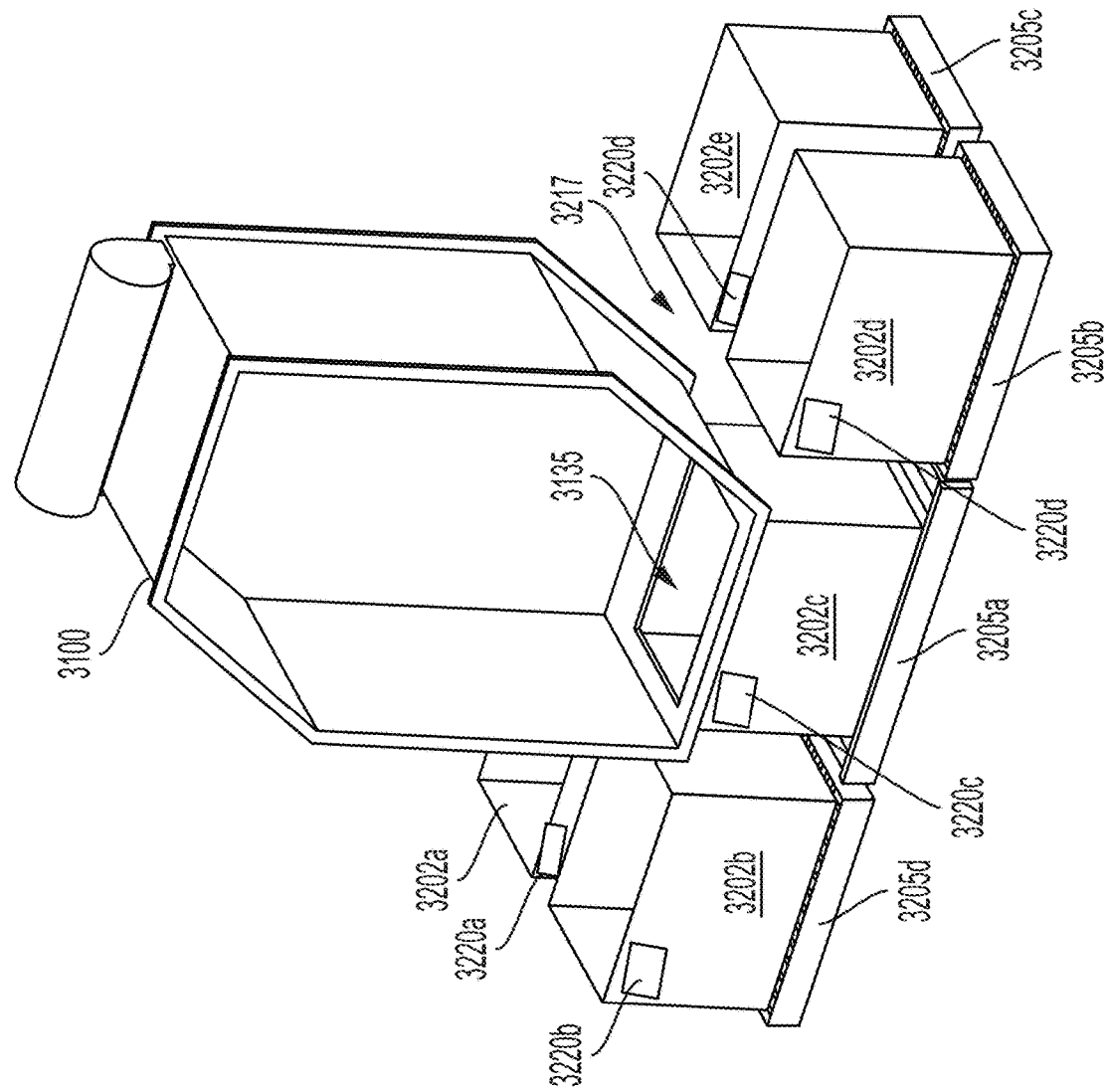
FIG. 32 depicts a partial cut away view of an end portion of an enclosed channel and a load sorting and batching system of an implementation of the autonomous laundry separating and sorting device.

As shown in the exploded view of FIG. 32, in implementations, the tumbler 3467 further comprises a conveyor 3475 on which the box 3500 slides into the tumbler 3467 to be held by one or more selectively actuated clamps 3477. In implementations the one or more selectively actuated clamps 3477 comprise a pneumatically operated clamp in operable communication with the controller 3005. In implementations, the conveyor 3475 comprises a plurality of driven rollers 3476. As shown in sequential depiction in FIGS. 30A-C, with the box 3500 clamped into the tumbler 3467, the controller 3005 rotates the tumbler 3467 seated on a plurality of guide wheels 3472a-d, 3472a'-d' affixed to the suspension elements 3470a-d, 3470a'-d' thereby flipping the box 3500 upside down with its opening facing the inlet orifice 3130a' therebeneath. Once the controller 3005 receives a signal that a selectively removable cover of the inlet orifice 3130a is removed thereby exposing the orifice 3130a, the controller 3005 signals the box tipping assembly 3400' to rotate and drop the one or more deformable articles 12a-n from the box 3500 through the orifice 3130. The tumbler 3467, frame 3465, and suspension elements 3470a-d, 3470a'-d' are designed so that deformable articles 12 being tipped from the box do not touch any of the tumbler 3467, frame 3465, and suspension elements 3470a-d, 3470a'-d' thereby avoiding being caught in theses structural and moving components and avoiding potential contamination and subsequent cleaning requirements.

As described previously with regard to implementations, as shown in the system schematic of FIG. 5 and FIGS. 30A-31, the box tipping assembly 3400' comprises a processor 3430 in wired or wireless communication with the controller 3005 via a network interface 3437. The box tipping assembly 3400' comprises a conveyor drive 3445 in operable communication with a reversible conveyor motor 3468 configured to receive a full box 3500 into the tumbler 3467 and eject the box 3500 once emptied. In implementations, the conveyor 3475 further comprises an incremental shaft encoder 3474 on the conveyor motor 3473 configured to rotate the conveyor rollers 3476 by a measurable amount to move a box 3500 into a clamping positioning within the tumbler 3467. Additionally or alternatively, the conveyor 3475 comprises at least one position sensor 3450 configured to detect a position of a box 3500 within the tumbler 3467 and transmit a signal to the processor 3430 of the box tipping assembly 3400' to actuate the clamp 3477 to retain the box 3500 for tipping. In implementations, the position sensor 3450 comprises at least one of one or more non-contacting electromagnetic switches (e.g., Hall effect sensors), one or more mechanical limit switches, one or more photoelectric proximity switches (e.g., break beams), and one or more inductive sensors, and output a signal to the drive motor 3437 to stop moving the rollers 3476. The box tipping assembly 3400' further comprises a tipper drive 3440 in operable communication with a tumbler motor 3468 configured to rotate the tumbler 3467 to invert a box 3500 clamped therein. In implementations an incremental shaft encoder 3455 is disposed on the drive motor shaft of the tumbler motor 3468 for detecting a rotational position of the tumbler 3467. Additionally, in implementations, the box tipping assembly 3400' comprises one or more limit switches configured to detect at least one of the tumbler 3467 being upturned and the tumbler 3467 being inverted.

Turning now to the outlet end O of the enclosed channel, the outlet orifice 3135 is configured to receive individually sorted articles therethrough for batching into sorted loads of laundry for washing. In implementations, such as that of FIG. 17B, the device 3000 comprises an actuated outlet door 3137 in operable communication with the controller 3005. In implementations, the outlet door 3137 can be similar in design and function to the inlet orifice door 3131. In implementations, the outlet door can be a hinged door. In implementations, the outlet door comprises a two-piece trap door. The controller 3005 can be configured to receive a signal from the at least one sensor 3140a-c indicative of the presence of a deformable article 12 positioned over the outlet orifice 3135 and actuate the outlet door 3137 to expose the outlet orifice 3135 on demand. By actuating the door 3137 on a just-in-time basis, the controller 3005 maintains the containment of any dirt, debris, and biological matter within the enclosed channel 3100 by minimizing the amount of time the orifice 3135 is exposed, thereby exposing the external environment to the contents of the channel 3100.

In implementations, as shown in FIG. 18, the controller 3005 is further configured to determine whether a work volume 3105a-d is clear of any articles 12 before an arm 3115 drops another article 12 into that work volume. For example, an article 12b can remain in the third work volume 3105c while a second arm 3115b waits for the third arm 3115c to finish cleaning the third work volume 3105c before releasing another article 12c into the third work volume 3105c. The article 12b remaining in the third work volume 3105 is detected by the one or more sensors, e.g., at least one of a downward angled sensor 3140a-c, a transversely angled sensor 3145a-c, and an upwardly angled sensor 3147a-c as previously described with regard to implementations.

As previously described, in implementations, such as shown in FIGS. 10-11, the enclosed channel 3100 is raised above a floor 10 or platform. For example, the enclosed channel 3100 can be supported by a plurality of legs 17a-f disposed on and, in some implementations, anchored to the floor 10 or platform. In implementations, one or more sorting bins 3202a-e (also referred to herein as "bin" or "bins") are configured to be disposed beneath the stationary floor 3110 of the channel 3100 to receive the separated and sorted each one of the plurality of deformable articles 12a-n associated with a single household's load of dirty laundry. The one or more sorting bins 3202a-e are disposed beneath the exit orifice for receiving each one of the plurality of deformable articles exiting the enclosed channel 3100 individually and, in implementations, collecting a sorted and batched load of deformable articles for washing and drying collectively. In implementations, the one or more sorting bins 3202a-e are disposed on a carousel 3200, or load constructor, for rotating an appropriate one of the one or more sorting bins 3202a-e beneath the outlet orifice 3135. Each of the one or more bins 3202a-e is configured to receive one or more of the plurality of deformable articles 12*a-n* having one or more characteristics associated with at least one of the one or more bins 3202*a-e* so that items having compatible and/or matching characteristics are aggregated into one or more associated bins. In implementations, the one or more characteristics comprise at least one of color, size, and fabric heat tolerance.

The autonomous separating and sorting robot 3000 is configured to provide the at least one deformable article 12 to one or more washing and drying devices 4000, and in implementations the autonomous separating and sorting robot 3000 comprises sensors configured to determine one or more characteristics of the at least one deformable article 12. The one or more characteristics can be, for example, material composition, fabric finish, load weight, color, size, volume, article type, and degree of dirtiness. In implementations, the autonomous separating and sorting robot 3000 communicates these characteristics to the controller 4005 of the one or more washing and drying devices 400 for determining parameters for a washing and drying cycle, parameters such as wash cycle temperature, cleaning and rinse agent amounts and concentrations, wash cycle duration (e.g., one or more soak and agitation cycles), number and duration of rinse cycles, soak cycle duration, washing cycle agitation speed (e.g., for delicate, normal, and heavy loads), maximum spin speed during fluid (e.g., water and/or chemicals) extraction, wash detergent selection and concentration, number of rinse cycles, drying air temperature, drying airflow rate, and a minimum size device 4000 in a cluster 4002 for receiving each load of at least one deformable article 12. Additionally or alternatively, in implementations, the autonomous separating and sorting robot 3000 is configured to estimate cycle duration and wash water requirements (e.g., for plant load balancing purposes across one or more clusters 4002).

In implementations, the wash parameters associated with the identified one or more characteristics are stored in a memory in communication with the controller 3005. The memory can be a memory 3010 of the separating and sorting device 3000 and additionally or alternatively can be a memory storage or database 235, 250, 240 in remote communication with the controller 3005 via the communication network 230. Because each load of household laundry contains articles of various types, sizes, materials, stains, and related wash requirements, each load may comprise more than one associated wash parameter. The wash parameters can be stored in a look up table cross referenced with one or more characteristics along with a default hierarchy for selecting washing and drying parameters based on two or more characteristics. For example, water temperature and agitation cycle duration associated with material type can trump parameters associated with load volume or weight. For example, a large load of laundry comprising several heavy cotton towels can be washed on warm water with vigorous agitation while a large load of thing cotton undergarments can be washed at more slow, gentle agitation speeds. The controller 3005 thus can be configured to determine wash parameters for each individual load of laundry based on the characteristics of the one or more deformable articles 12 in each individual load and communicate at least one of the one or more characteristics and washing and drying parameters associated with a bin 3202 to the one or more washing and drying devices 4000 receiving the bin 3202. Additionally or alternatively to the autonomous separating and sorting robot 3000 determining one or more characteristics of the at least one deformable article 12 for cross referencing with associated wash parameters, the wash parameters can be communicated to and received by a remote terminal 205 in communication with the communication network 230. A user of the remote terminal, e.g., the customer owning the one or more deformable articles, can provide predetermined wash parameters associated with a tagged (e.g., RFID label, bar code, QR code, etc.) container of dirty laundry articles 12*a-n* on an input screen of the remote terminal 205 or handheld device 245, and the provided predetermined parameters can be communicated to and stored in the memory 4010, 235, 240, 255 in communication with the controller 3005.

Because the one or more characteristics can include at least one of load size, fabric type, fabric finishes, wash cycle temperature, and article type (e.g., thick, water retaining items such as towels and jeans and thinner fabric items such as t-shirts and underwear), in implementations, at least one of the controller 4005 of the washing and drying device 4000 and remote terminal 205 determines optimum conditions for airflow, air temperature. and drying duration based on the load characteristics detected by the separating and sorting robot 3000. For example, the load characteristics can comprise two or more of the following load characteristics: the size of the load of laundry articles 12*a-n* relative to a size of a drum of a washing and drying robot 4000*a-n*, the fiber composition and fabric type (e.g., weave/knit type and looseness, length of fibers (staple) from which the fiber/yarn is spun, spin quality of the fiber/yarn, fuzziness, etc.) of one or more articles 12 in the load, fabric finishes of one or more articles 12 in the load, wash cycle temperature, and article type and thickness. The two or more load characteristics can be determined by the dirty laundry separating and sorting robot 3000 and communicated to the controller 4005 of the washing and drying robot 4000 and/or the remote terminal 205 by a controller 3305 of the dirty laundry separating and sorting robot 3000 via a wired or wireless network 230.

Turning to the system schematic of FIG. 5, as previously described, the controller 3005 is configured to determine based on receiving a signal from the at least one sensor 3140, 3145, 3147 disposed within each of the plurality of sequential work volumes 3105*a-d* that none of the plurality of deformable articles 12, 12*a-n* remain on the stationary floor 3110 in any of the plurality of sequential work volumes in the enclosed channel 3100. Upon determining that none of the plurality of deformable articles 12, 12*a-n* remain on the stationary floor 3110 in any of the plurality of sequential work volumes 3105*a-d*, at least one of the controller 3005 and a load constructor processor 3221 is further configured to instruct a conveyor drive 3222 of the load constructor 3200 to transit the one or more bins 3202*a-e* of the sorted plurality of deformable articles 12, 12*a-n* to one or more autonomous combination washing and drying machines 4000.

The one or more deformable articles 12, 12*a-n* in a common bin 3202*a-e* are routed to a single washing and drying device 4000. In implementations, more than one bin 3202*a-e* can be routed to a single washing and drying device 4000 if the characteristics of the deformable articles therein are matching and/or compatible for washing together and without exceeding a load capacity of a washing and drying device 4000, as will be described subsequently with regard to implementations of load construction parameters. In implementations, the device 3000 comprises at least one fill sensor in communication with the controller 3005, and the at least one fill sensor is configured to detect an occupied volume of the one or more bins. In implementations, the fill sensor is an optical sensor focused on a minimum threshold fill line and a maximum threshold fill line disposed on an interior surface of one of the one or more bins 3202*a-e* positioned beneath the exit orifice. The optical fill sensor can be configured to detect whether the of one or more of the plurality of deformable articles received in the one of the one or more bins reaches or surpasses the minimum threshold fill line. In implementations, the maximum threshold fill line comprises a top edge of the one of the one or more bins 3202*a-c*. Additionally or alternatively, the fill sensor is configured to output a signal indicative of the occupied volume of the one of the one or more bins being with a threshold range between the minimum threshold fill line and maximum threshold fill line. Upon determining an occupied volume of the one of the one or more bins is within a threshold range indicative of being filled, the controller 3005 is further configured to instruct the load constructor 3200 to unload the filled one of the one or more bins 3202*a-e* containing the sorted plurality of deformable articles 12*a-n* to the autonomous combination washing and drying device 4000. In implementations, a filled volume of all deformable articles in a single bin 3202 should be less than a washing and drying device capacity. For example, the washing and drying device capacity can be in a range of between about 0.10 m^3 to 0.20 m^3. In implementations, the washing and drying device capacity can be at or about 0.17 m^3. In implementations, the controller 3005 is configured to determine whether additional items can be added to a collection bin 3202. The controller 3005 can determine whether a deformable article 12 fits into the available bin based on a size estimate and previous bin fill level. For example, the controller 3005 can be configured to stop loading a bin 3202 that is in a range of between about one half to three quarters full.

Additionally or alternatively, as shown in FIGS. 10-11 and FIGS. 51A-B, the fill sensor is a weight sensor (e.g. a scale or loadcell 3215) disposed beneath the one of the one or more bins 3202*a-c* positioned beneath the exit orifice 3135. The scale 3215 is configured to detect whether the weight of the one of the one or more bins 3202*a-e* reaches or surpasses the minimum threshold weight indicative of a bin full condition. Because the weight of all articles 12*a-n* in a single bin 3202 must weigh less than a washing and drying device 4000 capacity, the controller 3005 is configured to determine whether additional items can be added to a collection bin 3202 based on at least one of weight and volume. The controller 3005 can determine whether a deformable article 12 fits into the available bin based on a weight estimate of the article and the bin weight. For example, in an implementation, the washing and drying device capacity can be about 16 kg, and the controller 3005 can be configured to stop loading a bin 3202 having a current net bin mass of greater than or equal to 14 kg. In implementations, the washing and drying device capacity can be about 16 kg, and the controller 3005 can be configured to not add a heavy item to a bin 3202 having a current net bin mass of greater than or equal to 10 kg. In implementations, a heavy item weighs between about 5-10 kg. In implementations, the controller 3005 is configured to obtain a mass measurement of a deformable article 12 by reading the tilt arm current of a tilt motor 3125*b-b"* of the at least one drive motor 3125*a-c* required to raise the deformable article 12 to the hoist height H1.

In implementations, the fill sensor is configured to output a signal indicative of the bin full condition. Upon receiving the bin full condition output signal, the controller 3005 is further configured to instruct the load constructor 3200 to unload the filled one of the one or more bins 3202*a-e* containing the sorted plurality of deformable articles 12*a-n* to one or more autonomous combination washing and drying machines 3000. In implementations, each of the one or more bins 3202*a-e* comprises an identification marker 3220*a-e* for associating with at least one of an identity of the bin and one or more characteristics of the one or more deformable articles sorted into the each of the one or more bins 3202*a-c*.

In implementations, as shown in FIG. 32, the identification marker 3220*a-e* of each bin 3202 of the plurality of bins 3202*a-e* comprises a customer ID and at least one of a net weight, a final fill level (e.g., Full, ¾, ½, ¼, and E, where E indicates the contents being below the ¼ fill level), color (e.g., light or dark) and item size (e.g., large or typical). A controller 4005 in operable communication with the autonomous washing and drying machine 4000 or machines receiving the one or more bins 3202*a-e* will use the information associated with the identification marker or markers 3220*a-e* to determine how and whether to combine one or more of the bins 3202*a-e* in a single washing and drying device 4000. Additionally or alternatively, the controller 3005 of the device 3000 and/or the controller 4005 of the washing and drying device 4000 can be configured to determine how and whether to combine one or more of the plurality of bins 3202*a-e* based on one or more characteristics of the one or more deformable articles 12*a-n* disposed in each bin 3202*a-e* and associated with the bin marker 3220. In implementations, the bin marker 3220, 3220*a-e* comprises a visible marker such as a digital display, an RFID tag, a bar code, or a QR code. Additionally or alternatively, the bin marker 3220 is determined by the controller 3005 and assigned to a bin 3202 based on the bin position on the load constructor 3200. The bin marker 3220 is a unique pointer passed to a structure in software.

The parameters for determining combining bins can be stored on a local and/or remote memory in wired or wireless communication with a least one controller 3005, 4005. To prevent overfilling a washing and drying device 4000, the parameters can include one or more of the following limitations: '¾' full bins shall not be combined with any other bins, a '½' full bin may only be combined with a single '¼' full bin, a '¼' full bin may be combined with another '¼' full bin or an 'E' bin, three "E" bins may be combined and a combined weight of all bins must be less than a threshold weight. For example, the threshold weight can be in a range of between about 10-20 kg. In implementations, the threshold weight is at or about 16 kg.

As previously described, in implementations the device 3000 comprises an actuatable load constructor 3200 in operable communication with the controller 3005. As shown in FIGS. 10-11 and 32, in implementations, the load constructor 3200 is configured to receive thereon the one or more bins 3202*a-e* and rotate the one or more bins 3202*a-e* beneath the enclosed channel 3100 to match a characteristic of one of the one or more bins positioned beneath the outlet orifice 3135 with the one or more characteristics of each one of the plurality of deformable articles 12, 12*a-n* exiting the enclosed channel 3100. In implementations, the load constructor 3200 comprises one or more conveyors 3205, 3205*a-d* for positioning one of the one or more bins 3202*a-e* disposed thereon beneath the exit orifice 3135. In implementations, a central conveyor 3205*a* is configured to receive thereon a bin 3202*c* for placement beneath the orifice 3135. In implementations, the conveyors 3205*a-d* are configured to move the bins both back and forth in the direction of the channel inlet end I to outlet end O and side to side. In implementations, the conveyor is configured to hold one fewer bin than the number of available conveyor spaces such that a gap 3217 enables free flowing movement of the bins 3202*a-e* on the load constructor.

Figure 50:
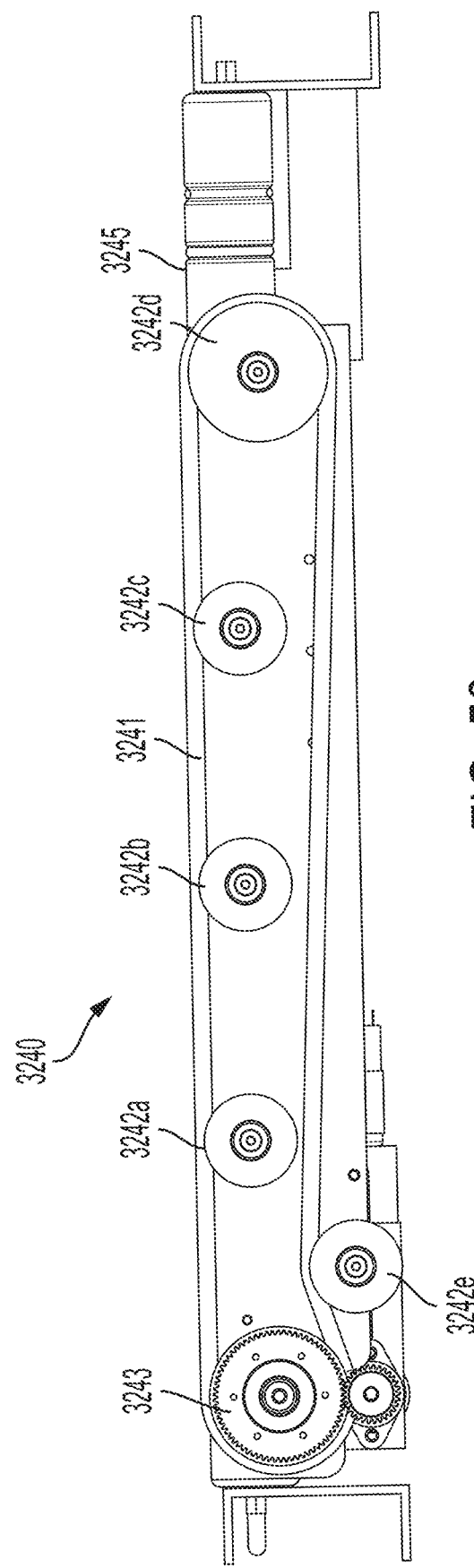
FIG. 50 depicts a side view of an implementation of a single pop up transfer roller assembly of FIG. 49.
Figure 51A:
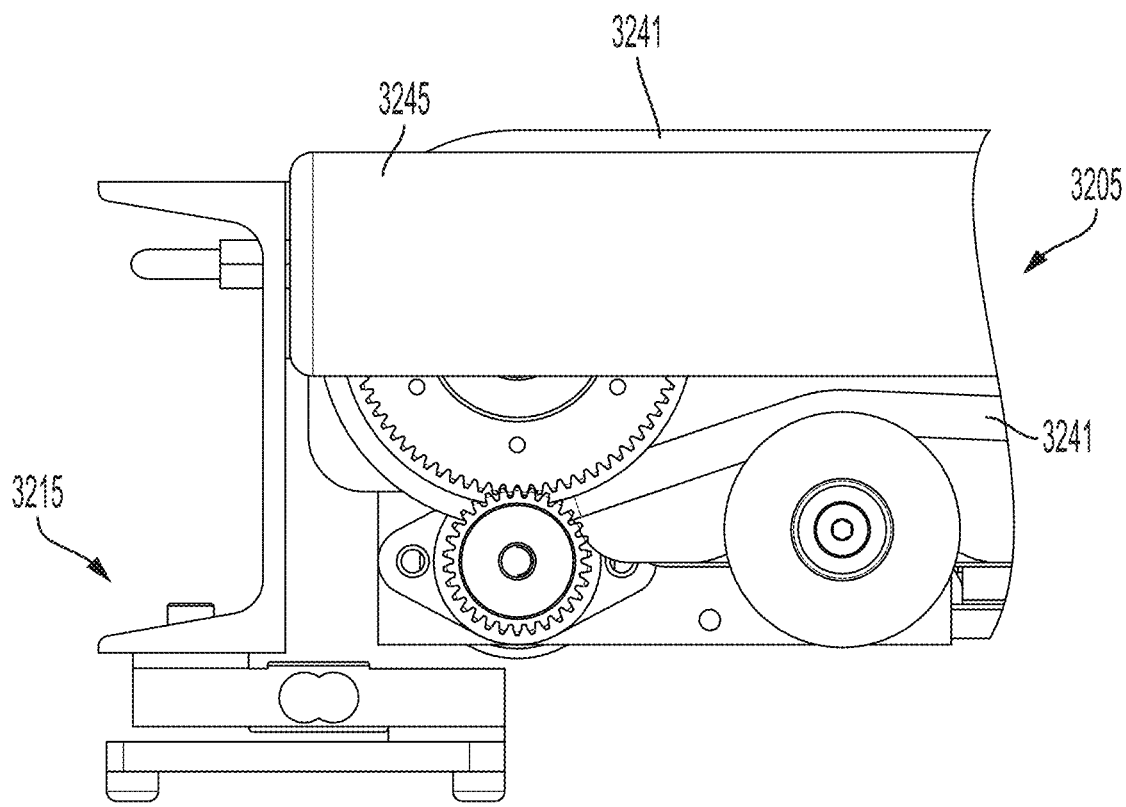
FIG. 51A depicts an example weight sensor disposed beneath a load constructor.
Figure 51B:
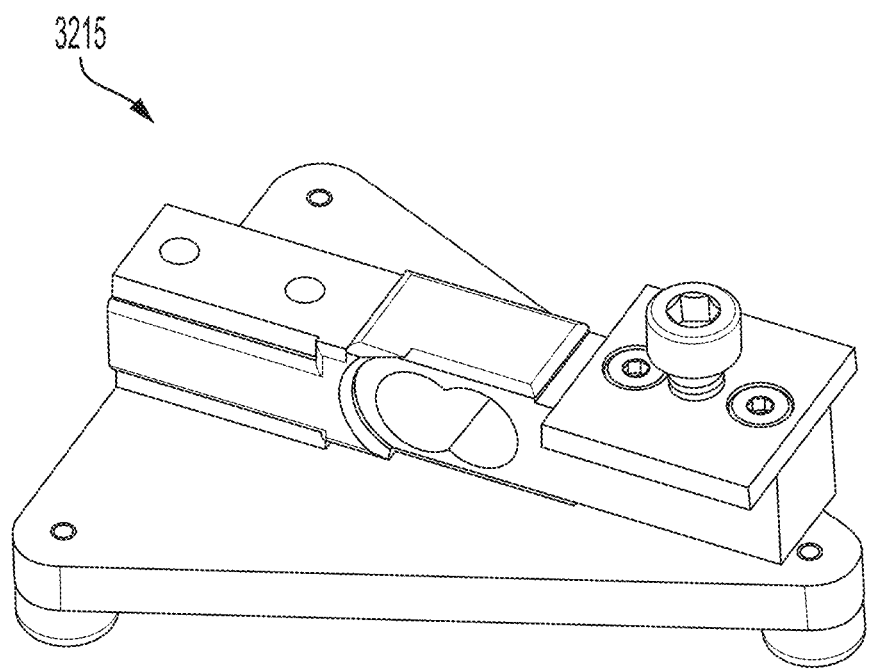
FIG. 51B depicts the weight sensor of FIG. 51A.
Figure 52A:
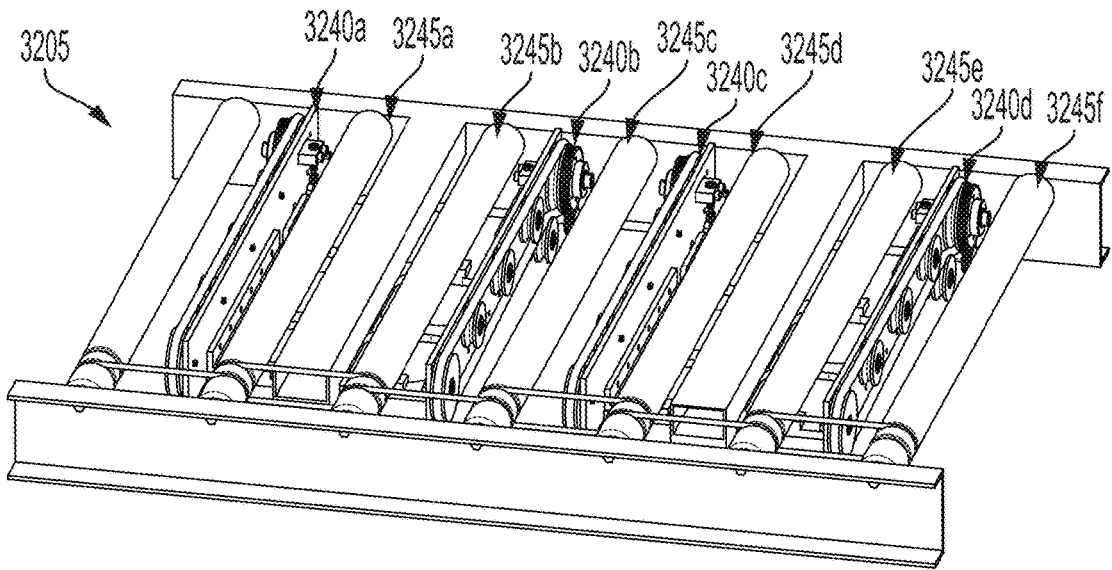
FIG. 52A depicts a single conveyor of the load constructor of FIG. 48.
Figure 52B:
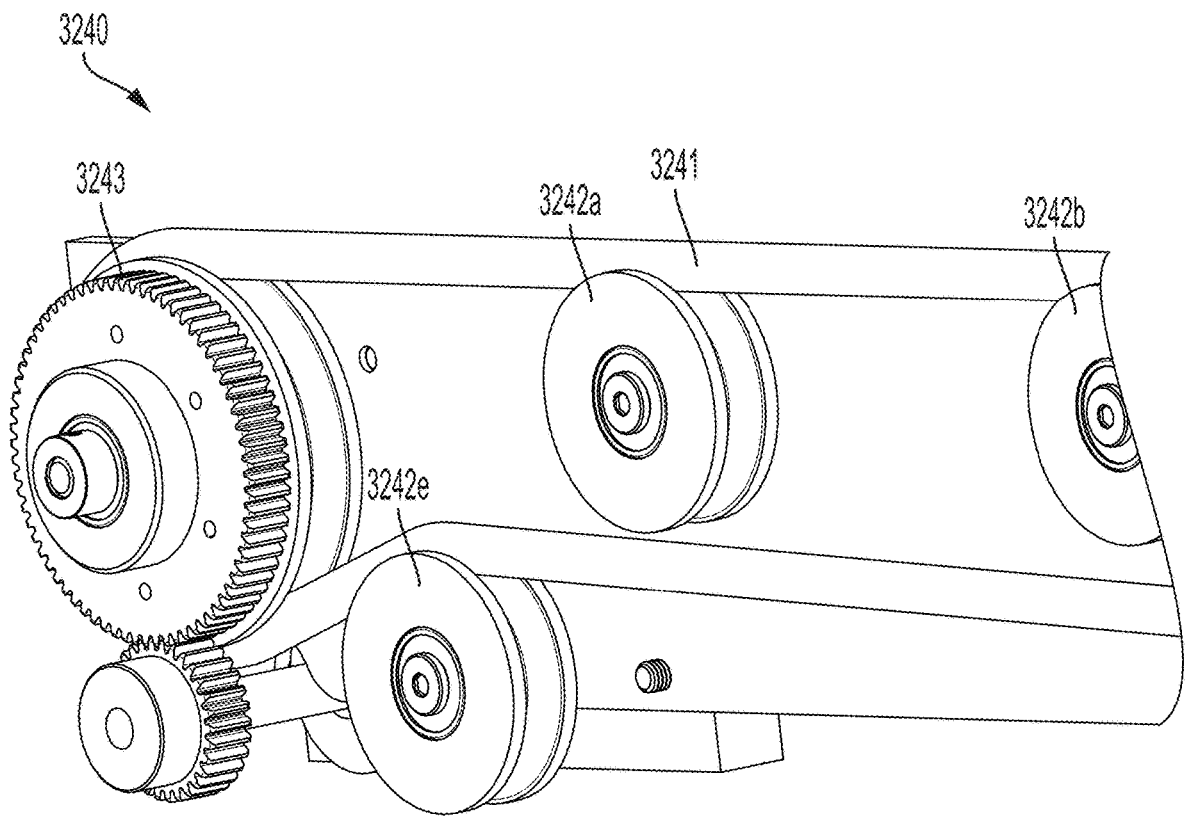
FIG. 52B depicts a partial perspective view of a pop up transfer roller assembly of FIG. 52A.
Figure 53:
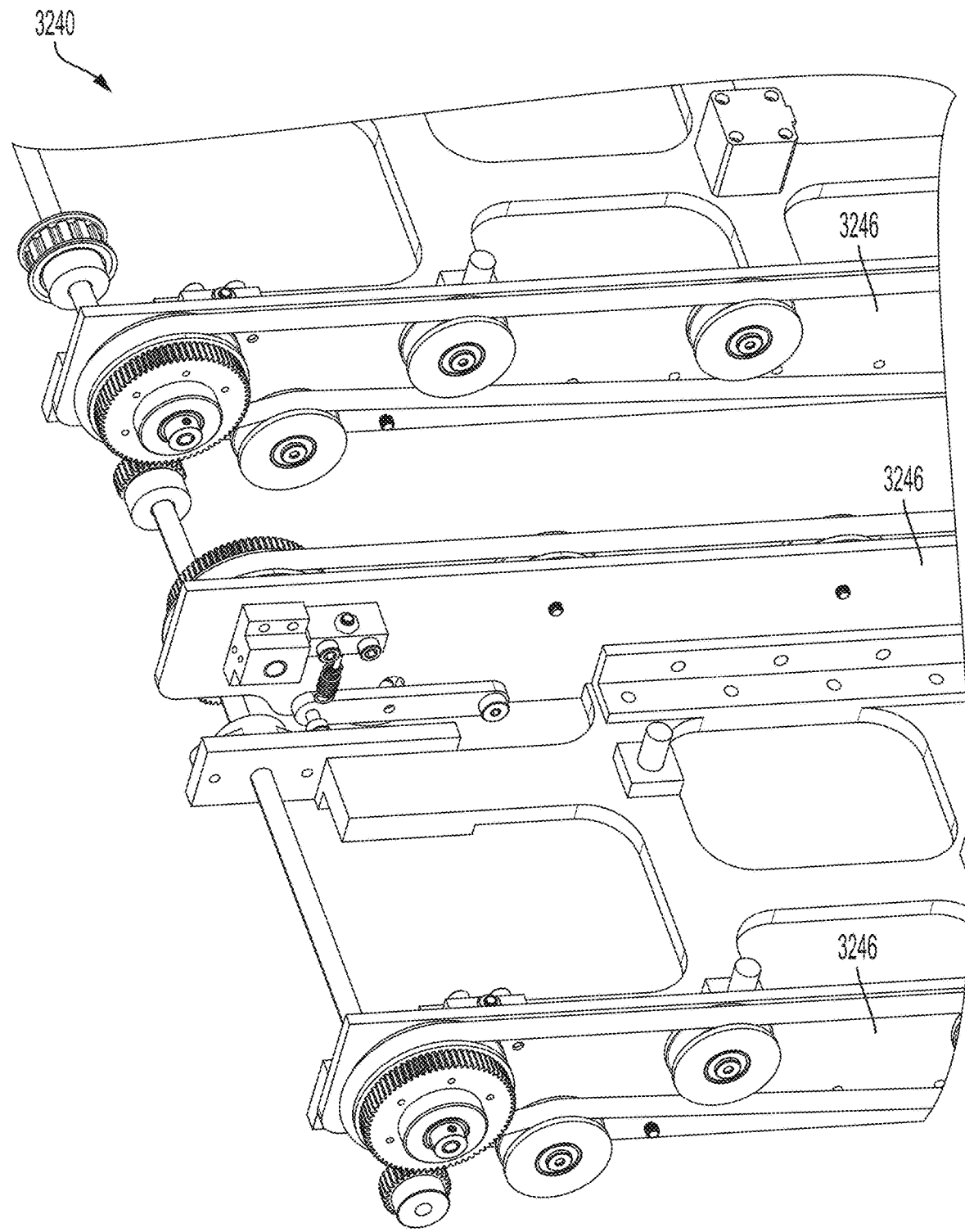
FIG. 53 depicts a side perspective view of a plurality of interoperative pop up transfer roller assemblies geared to rotate together on a single conveyor of the load constructor of FIG. 48.

Turning now to FIGS. 48-57, in implementations the load constructor 3200 comprises 6 conveyors for receiving a maximum of 5 bins 3202*a-e* thereon for moving back and forth and side to side to position a particular bin beneath the exit orifice 3135. The total number of conveyors can scale to any number as long as one conveyor 3205 is left unoccupied for shuffling two or more bins 3202*a-e* about the load constructor 3200. As shown for example in FIG. 52, in implementation, each conveyor 3205 comprise a plurality of driven rollers 3245*a-f* configured to position a bin 3202 thereon in a first direction and a plurality of pop up transfer roller assemblies 3240*a-d* configured to raise a rotating belt 3241 up above a top plane of the driven rollers 3245 to engage a bottom surface of the bin 3202 and transfer the bin 3202 thereon in a direction perpendicular to the first direction. As shown in FIGS. 50 and 52B, in implementations each rotating belt 3241 is driven by a drive gear 3243 and supported by one or more rollers 3245*a-e* for tensioning and retaining the belt 3241 thereon. As shown in FIGS. 49-50 and 52-54, each of the transfer roller assemblies 3240 is spring loaded to raise the rotating belts 3241 of each pop up transfer roller assembly 3240, 3240*a-d* up higher than the adjacent rollers 3245, 3245*a-f*. As shown in FIGS. 53-54 the pop up transfer roller assemblies 3240*a-d* of each conveyor 3205 are mounted on a shared moveable frame 3246 and, in implementations, are geared together for simultaneous rotation of each belt 3241 of the plurality of transfer roller assemblies 3240*a-d*.

In implementations, each of the maximum number of bins 3202 can be positioned on the load constructor 3200 at the start of a separating and sorting process for a load of deformable laundry articles 12*a-n*. Alternatively, the load constructor processor 3221 can call for the autonomous loading of a bin 3202 onto the load constructor 3200 upon receipt of a signal communicating of a detected condition comprising at least one of a start of a separating and sorting process, the identification of a new article characteristic associated with newly identified washing and drying parameters (e.g., color, fabric type, material thickness, stain identification, etc.) within a load of dirty laundry articles 12*a-n*, and detection of a bin full condition of a bin 3202 disposed on the load constructor 3200 prior to completing separating and sorting of a load of deformable laundry articles 12*a-n*.

Figure 55A:
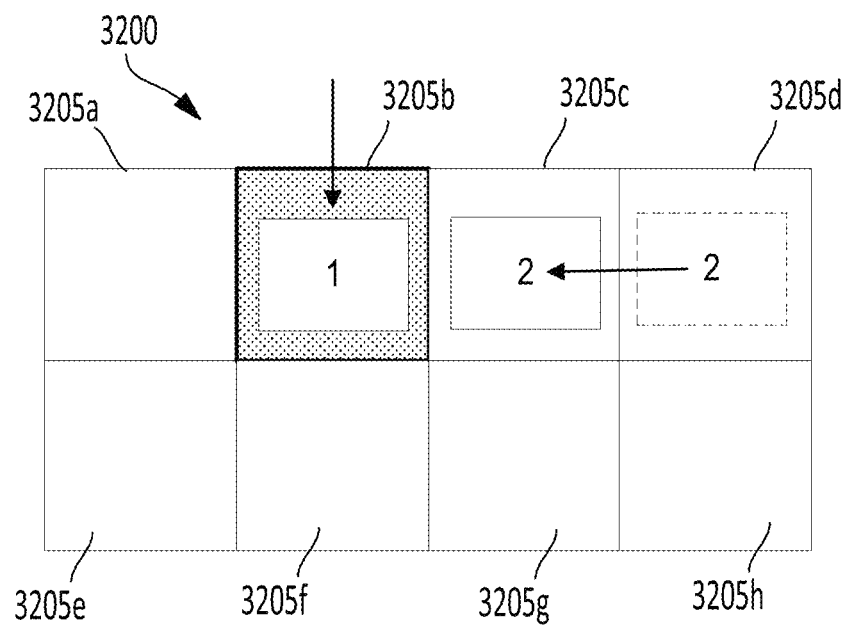
FIG. 55A schematic view of a first introduction of a bin into a load constructor loading position.
Figure 55B:
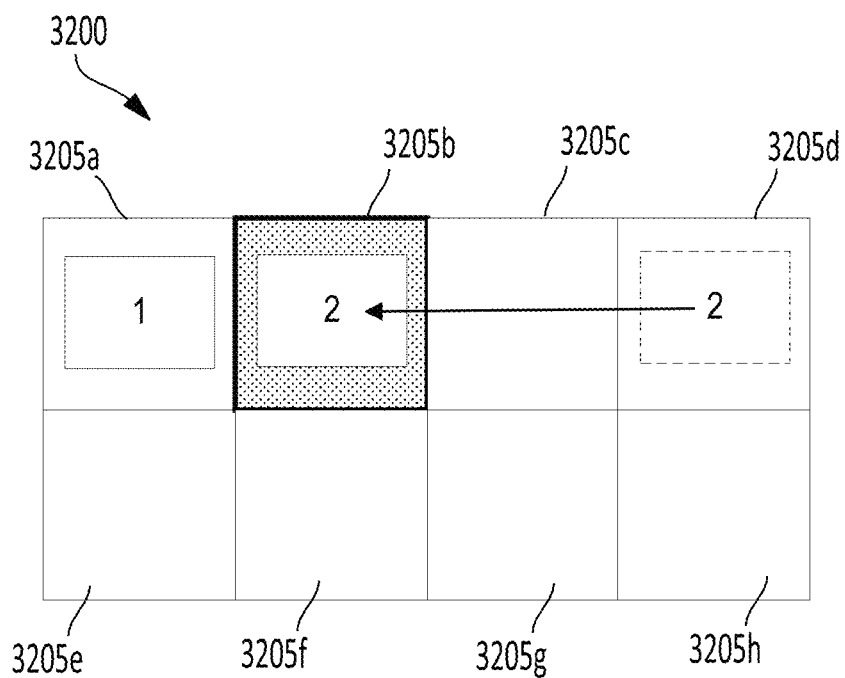
FIG. 55B depicts a schematic view of an introduction of a second bin into the load constructor loading position of FIG. 55A.
Figure 56A:
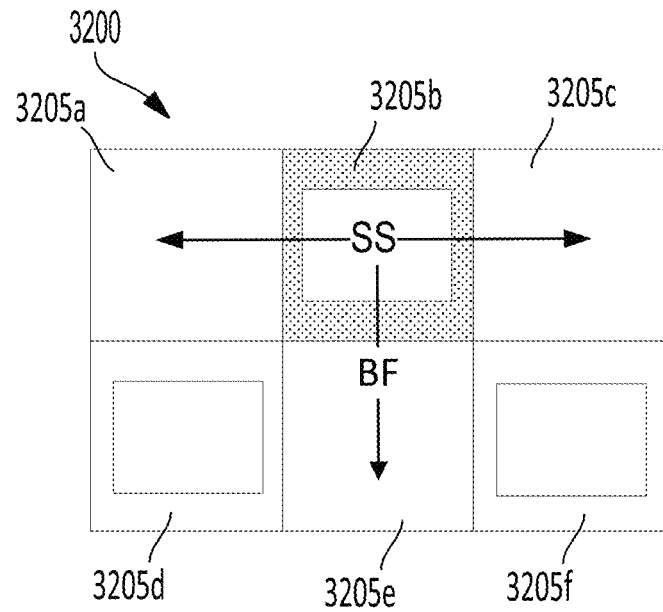
FIG. 56A depicts a schematic view of potential movements of a bin disposed on a load constructor.
Figure 56B:
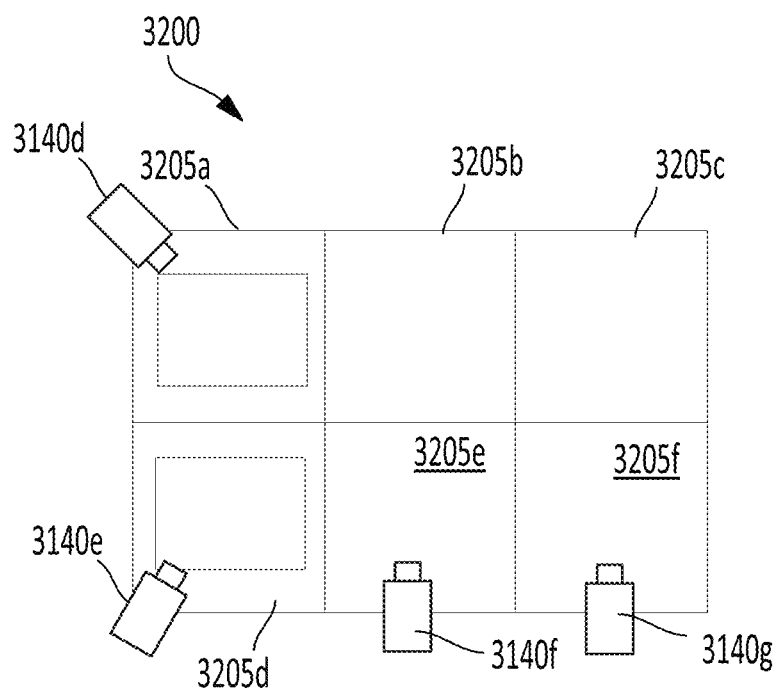
FIG. 56B depicts a schematic view of a plurality of cameras disposed about a load constructor.

For example, as shown in FIGS. 55A, first bin 3202 labeled with the numeral 1 enters a load position beneath the orifice 3135. The load position in this example is conveyor 3205*b* and the total number of conveyors 3205*a-d* is eight. The first article 12*a* that enters the first bin 3202 (e.g., numeral 1) sets the bin type. For example, if the first article 12*a* is a large, white, thick, terrycloth article such as a towel, the bin characteristic is at least one of large, white, thick, and terrycloth such that any other large, which, thick, terrycloth items subsequently identified by the one or more sensors 3140*a-d*, 3145*a-d*, 3147*a-d* of the enclosed channel 3100 will be deposited also in this bin 3202 until a bin full condition is reached. As shown in FIG. 55B, when the separating and sorting device 3000 identifies an article of a second type, the first bin (numeral 1) moves to a new conveyor position (e.g., corner conveyor 3205) and a second bin labeled with numeral 2 is transferred across one or more conveyors 3205*c-d* to the load position conveyor 3205 beneath the orifice for receiving the article of a second type. In this way, each bin 3202 of the plurality of bins 3202*a-e* contains one or more deformable articles 12*a-n* comprising one or more shared characteristics for effective aggregate washing and drying. As shown in FIG. 56A, in implementations, a bin disposed on the load position conveyor 3205*b* can move side to side (arrow S) on one of the driven rollers 3240*a-f* and the pop up transfer roller assemblies 3245*a-d* and back and forth (arrow BF) on the other of at least one of the driven rollers 3240*a-f* and transfer roller assemblies 3245*a-d*. As shown in FIG. 56B, one or more sensors 3140*d-g* are positioned about the load constructor 3200 for detecting the at least a level and/or volume of one or more deformable articles 12*a-n* contained in each of the one or more bins 3202, 3202*a-n* thereon. In implementations, the one or more sensors 3140*d-g* comprise one or more cameras positioned about the load constructor 3200.

FIGS. 57A-D depict a sequence of moves of 5 bins 3202 (labeled 1-5) moving about a load constructor 3200. Each bin moves one conveyor location at a time, either front to back or side to side. In FIG. 57A, bin number 2 moves to an open location. In FIG. 57B, bin number 1 transfers to bin number 2's starting location and bin number 4 transfers to bin number 1's starting location. In FIG. 57C, bin number 2 moves to bin number 4's starting location and bin number 1 moves to bin number 2's second location, as shown in FIG. 57D. In implementations, the controller 3005 and/or load constructor processor 3221 is configured to move the bins in a most efficient sequence when a particular bin type is called to the loading position. For example, at least one of the controller and load constructor processor 3221 employs optimized path planning (e.g., DIJKSTRA'S path planning algorithm) for efficient, autonomous reordering of bins 3202*a-n* on the load constructor 3200. Additionally, in implementations, each conveyor 3205 of the plurality of conveyors 3205*a-n* comprises one or more position sensors 3228 for detecting a position of a bin 3202 thereon as successfully loaded and approximately centered. For example, in implementations, each conveyor 3205 of the plurality of conveyors 3205*a-n* comprises four limit switches, one disposed at each corner of the conveyor 3205, for detecting the passage of a bin thereacross such that the controller 3005 and/or processor 3221 receiving signals from one or more of the four limit switches can determine a position of the bin 3202 based on which switches of which conveyor(s) detected passage of a transferring bin 3202 thereacross.

As previously described, each of the one or more bins 3202*a-e* comprises an identification marker representative of the contents of the bin and linkable with a customer ID. In implementations, the identification marker comprises at least one of a machine-readable serial number, a bar code, a machine-readable QR code, an RFID code, NFC tag, a WIFI enabled tag, a ZIGBEE enabled tag, and an active radio telemetry system. In implementations, the controller 3005 can create a virtual tag in memory associated with a known location of one or more bins based on an initial location and subsequent locations as the one or more bins move through the process line 100, 100*a-c*. In implementations, the controller 3005 is in communication with a memory configured to store at least one relation comprising one of the one or more characteristics associated with the bin, the bin identification marker for each of the one or more bins, and a customer identity shared by the plurality of deformable articles received into the enclosed channel. In implementations, the controller 3005 is in communication with a communication network 230, and a remote terminal 205 in communication with the communication network is configured to receive a customer input comprising the one or more characteristics associated with the plurality of deformable articles.

Additionally or alternatively, in implementations, at least one sensor (e.g., one or more sensors 3140a-c, 3145a-c, 3147a-c) is configured to detect the one or more characteristics of each one of the plurality of deformable articles 12a-n and output a signal to the controller 3005 comprising the detected one or more characteristics. In implementations, the at least one sensor comprises at least one of a 3D camera, an IR sensor, a 2-D camera, LIDAR, LADAR, a sonar proximity sensor, an ultrasonic ranging sensor, a radar sensor, a pair of stereo depth cameras, a colorimeter for determining color of an article 12, and a spectrometer for determining fiber type of a deformable article 12. In implementations, the at least one sensor comprises at least one of a colorimeter and spectrometer disposed on or in the fingertips of the gripper fingers 3107a-b because these points come into close contact with the material of the article 12 for successful evaluation. Additionally or alternatively, the at least one sensor comprises at least one of a colorimeter and spectrometer disposed at least one of in a wall 3112a-d of the channel 3100 and along the floor 3110 such that an arm 3115 can hold a hoisted article against or immediately proximate the sensor. The one at least one sensor can further detect one or more stains disposed on a deformable article and flag the article in software for delivering to a bin 3202 marked for stain treatment in the washing and drying device 4000. In implementations, the at least one sensor comprises a camera (e.g., one or more sensors 3140a-c, 3145a-c, 3147a-c) associated with one or more of the plurality of work volumes outputs at least one of depth map, RGB images, and IR images. In implementations, the at least one sensor comprises a camera (e.g., one or more sensors 3140a-c, 3145a-c, 3147a-c) associated with one or more of the plurality of work volumes, the camera being configured to output 3-D image data to the controller 3005. Additionally or alternatively, the at least one sensor comprises a camera (e.g., one or more sensors 3140a-c, 3145a-c, 3147a-c) associated with one or more of the plurality of work volumes and the camera is configured to output one or more 2-D images to the controller 3005. As previously described, in implementations, the at least one sensor is a camera, and the camera is calibrated to at least one of the floor of the enclosed channel 3100 and one or more of the plurality of arms 3115a-c.

In implementations, the controller is configured to determine, based on a comparison of a received output signal of the at least one sensor to data stored in a memory in communication with the controller, at least one of an article type, an article color, an article size, and an article fabric. In implementations, at least one sensor is a 2-D camera, and the data associated with the deformable laundry article is size invariant image data comparable with database images of tagged articles and/or classes of articles.

Figure 33:
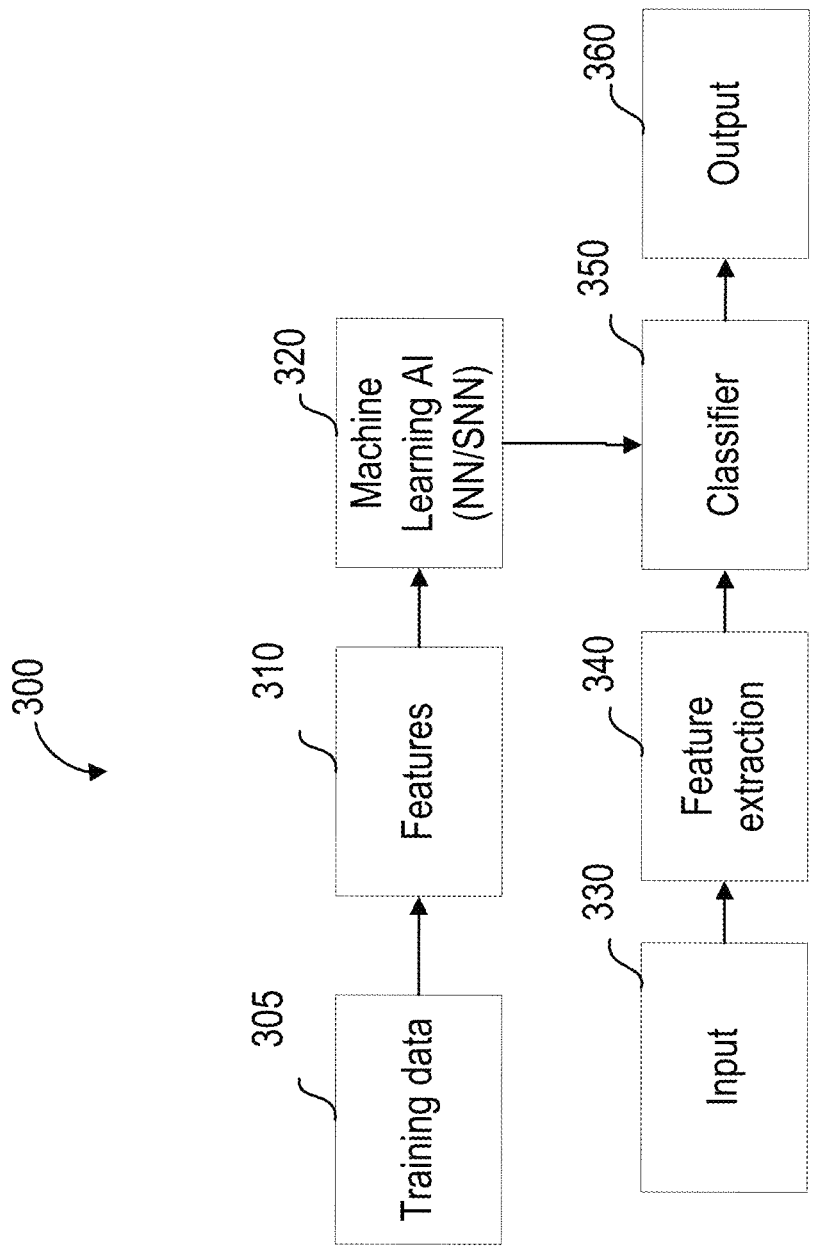
FIG. 33 depicts a schematic implementation of a neural network for classifying and sorting articles.

In implementations, the memory comprises a neural network 300, and determining the one or more characteristics of each one of the plurality of deformable articles comprises processing the received output signal of the at least one sensor with a neural network classifier. In implementations, as shown in FIG. 33, the neural network 300 comprises a trained neural network, for example a convolutional neural network that operates quickly on 3D and/or 2D data and is configured to classify images from the 3D and/or 2D camera. In an implementation, the classification comprises generating a descriptor based on the output signal of the at least one sensor 3140a-c, 3145a-c, 3147a-c associated with each one of the plurality of work volumes, and classifying, using the neural network, the output signal based on the descriptor. The neural network is configured to output a probability that the output signal corresponds to a class of the stored data indicative of one or more deformable article types, for example. The classes of trained data in the neural network include data associated with many types of deformable articles. For example, as shown in FIG. 33, a neural network 300 can be trained with a set of training data 305. After training, the neural network 300 comprises a set of weights that can be used for neural network inference to determine whether an input 330 (e.g., output signal from the one of the at least one sensors 3140a-c, 3145a-c, 3147a-c in each one of the plurality of sequential work volumes 3105a-d of the device 3000) is within one of the trained classes. The classes of trained data in the neural network include data associated with many types of deformable laundry articles that comprise particular washing characteristics (e.g., size, color, temperature requirements, degree of dirtiness, etc.)

For example, size is a particularly important characteristic of a deformable article because a large item (e.g., a bed sheet, comforter, tablecloth, large bathrobe, etc.) can envelop smaller items, preventing them from being washed or dried effectively. Therefore the controller 3005 will prevent mixing these items in a common (e.g., shared) bin 3202 for washing. The neural network 300, therefore can be used to determine whether a deformable article in the enclosed channel 3100 is of a large garment class. For example, in implementations such as that of FIG. 21, the controller 3005 is configured to receive an output signal comprising an image 3142 of a deformable article 12a engaged with at least one gripper (e.g., two or more grippers 3120b, 3120c) at a hoist height H1. The controller is configured to determine, based on the output signal, a number of pixels in each of an upper half 3142a and a lower half 3142b of the image, and based on the number of pixels in the lower half of the image exceeding a preset threshold that the at least one deformable article 12 a comprises a large sized article. Additionally or alternatively, the controller 3005 can be configured to determine an overall pixel count occupied by the deformable article. Additionally or alternatively, the controller 3005 can be configured to determine a gap height H2 as previously described with regard to implementations, and, based on the gap height being equal to or less than a threshold distance, determine the deformable article 12a is of a large size class.

Figure 22:
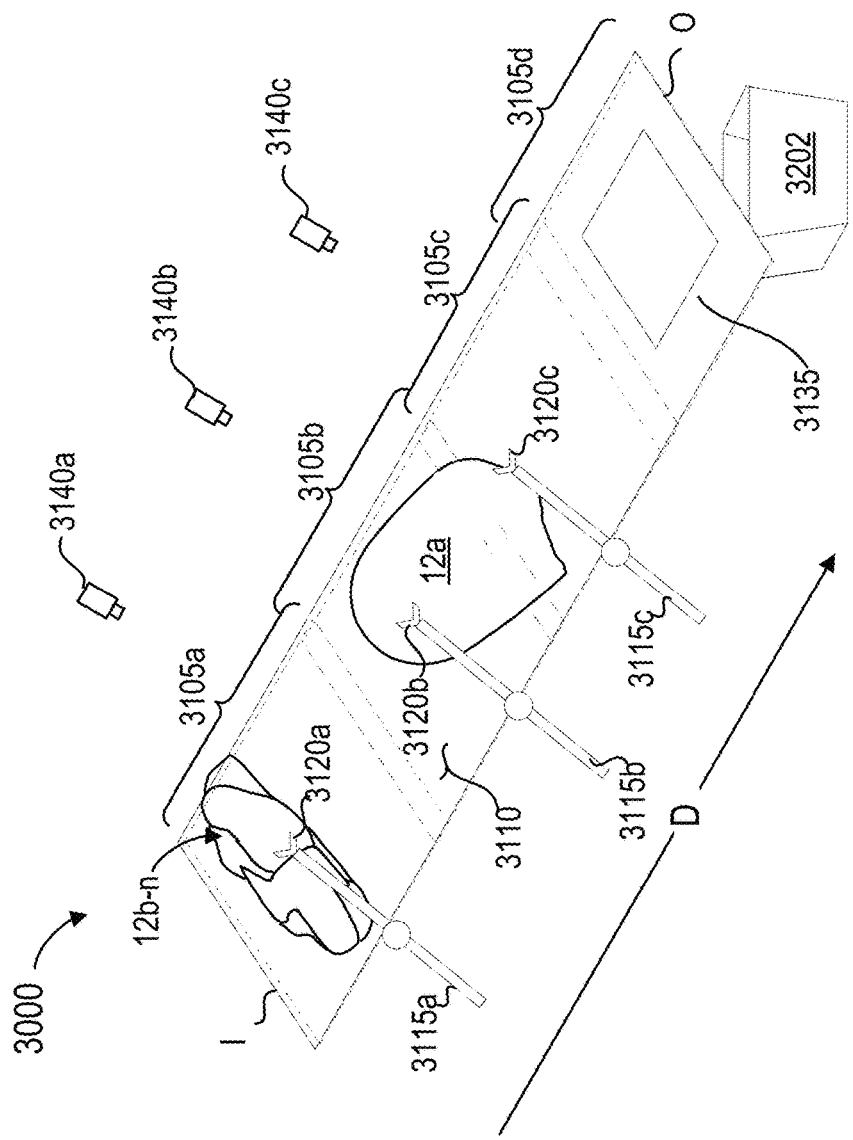
FIG. 22 depicts a schematic perspective view of a portion of the autonomous laundry separating and sorting system having a large deformable article therein.

In other implementations, such as that of FIG. 22, the controller 3005 can determine whether a deformable article is a large item by stitching images together from multiple cameras (e.g., sensors 3140a-c, 3145a-c, 3147a-c), and identifying article size and position relative to the coordinates of the enclosed channel 3100. The controller 3005 is configured to cream a single-image view of the entire floor 3110 of the channel and identify the deformable article 12 against the backdrop of the entire length of the floor 3110. Because the one or more sensors (e.g., cameras) 3140a-c, 3145a-c, 3147a-c are calibrated into the physical space of the enclosed channel 3100, the controller 3005 can determine where in physical dimensions of the channel the article begins and ends. For example, as shown in FIG. 22, the article 12 is a large size article spanning between the second and third work volumes 3105b-c.

As previously described with regard to implementations, the at least one of the controller 3005 and load constructor processor 3221 can determine a bin full condition based on at least one of a weight and a volume of each of the plurality of loaded bins 3202 on the load constructor 3200. As previously described with regard to implementations shown in FIGS. 51A-B, one or more corners of a load position conveyor beneath the outlet orifice 3135 each comprises a loadcell 3215 there beneath. In implementations, each of the loadcells 3215*a-d* are in operative communication with at least one of the controller and the load constructor processor 3221 for outputting a signal indicative of a weight of a bin 3202 positioned on the load position conveyor. In implementations, each loadcell 3215 is configured to senses a weight in a range of between about 10 kg to 30 kg. Additionally or alternatively, a bin full condition is detected by one or more sensors configured to detect the height of the contents of a bin. For example, as shown in FIG. 56B, one or more cameras 4140*d-g* disposed about the load constructor detect the height of contents within a bin and whether the contents have exceeded a threshold bin volume height. In implementations, each camera 4104*d-g* can detect a volume of one or more deformable articles in a bin 3202 by breaking the (length×width) of a bin into discrete "columns". Because the camera is positioned a set height relative to the load constructor 3200, a static distance to the bottom of a bin 3202 is known. For each column in a bin, the camera 3140*d-g* measures the heights and calculates the volume of each column. At least one of the controller 3005 and load constructor processor 3221 sums the volumes of every column and calculates an approximate filled volume within the bin. Because the bin has a known maximum volume and/or maximum threshold fill volume, the controller 3005 and/or load constructor processor 3221 compares the filled total volume against the maximum volume and/or maximum threshold fill volume and then determine whether the remaining unoccupied volume in a bin can receive an additional one or more articles 12. As described with regard to implementations, the one or more sensors 3140*a-c*, 3145*a-c*, 3147*a-c* of the enclosed channel and/or one or more sensors of the arm 3115, gripper 3120 and drive motors 3125*a-c* can determine or approximate based on weight the size of a separated article positioned above the outlet orifice 3135.

Additionally or alternatively, in implementations, the controller 3005 executes a crumple predictor routine for determining a volume of a separated article 12. The crumple predictor is trained by taking a picture of a suspended article, dropping the articles on the floor 3110 of the channel 3100 and taking a picture of the article on the floor 3110. The controller 3005 then computes a volume of the article on the floor 3110 from point cloud voxels of the detected article 12. The crumple predictor can be trained on a plurality of articles comprising a plurality of shapes, sizes, and volumes, and the controller 3005 can store that information in memory 3010 or database for estimating volumes of subsequently separated articles 12 suspended in the channel 3100.

Because articles 12*a-n* can pile in a pyramid during loading, the driven rollers 2145*a-d* of the plurality of conveyors 3105*a-n* are configured to rotate rapidly in opposite directions to "shake" the bin 3202 thereon and settle the contents therein from a pyramid to a more uniform height across the length and width of the bin 3202. Additionally or alternatively, the device 3000 comprises one or more plungers for pushing a just loaded article 12 into a bin 3202 and compressing the peak of any pyramid shaped deposited article.

As previously described with regard to implementations, at least one of the controller 3005 and load constructor processor 3221 can intelligently shift bins 3202*a-n* on the load constructor 3200 such that the plurality of deformable articles 12*a-n* are sorted into one or more bins based on what percent of the load of deformable articles 12*a-n* has been separated and sorted and what percent remains. Additionally or alternatively, the load constructor 3200 can fill each bin 3202*a-n* to a "bin full" state before starting to fill a second bin of the same type. Alternatively, the load constructor can fill two or more bins of the same article type (e.g., two light article bins), alternating between the two or more bins with each addition of an article of that type. When the separation and sorting process completes, the at least one of the controller 3005 and load constructor processor 3221 determines if the two or more bins of the same article type can be combined into a single washing and drying device 4000 without exceeding a threshold capacity.

As described previously, once the controller 3005 determines that all deformable articles of a plurality of deformable articles 12*a-n* received into the enclosed channel 3100 from a customer box 3500 are sorted into the one or more bins 3202*a-e*, the controller 3005 instructs the load constructor 3200 to convey the remaining bins thereon to one or more washing and drying devices 4000*a-n*. The controller 3005 then prepares the enclosed channel 3100 for receiving a next load of one or more deformable articles 12*a-n*. In implementations, as shown in FIGS. 6-9 and 34-35, the device 3000 comprises a retractable cleaner 3600 configured to advance through the enclosed channel 3100 from the inlet end I to the outlet end O while cleaning one or more interior surfaces. In implementations, the retractable cleaner 3600 is configured to form the inlet wall 3112*a* of the enclosed channel 3100 in a fully retracted position. In implementations, the retractable cleaner comprises a planar profile contoured and fitted to a cross sectional profile of the enclosed channel 3100. In implementations, the cross-sectional profile of the enclosed channel is a symmetrical polygon, symmetric about a center line. In implementations, the cross sectional profile of the enclosed channel 3100 is not symmetrical.

Figure 35:
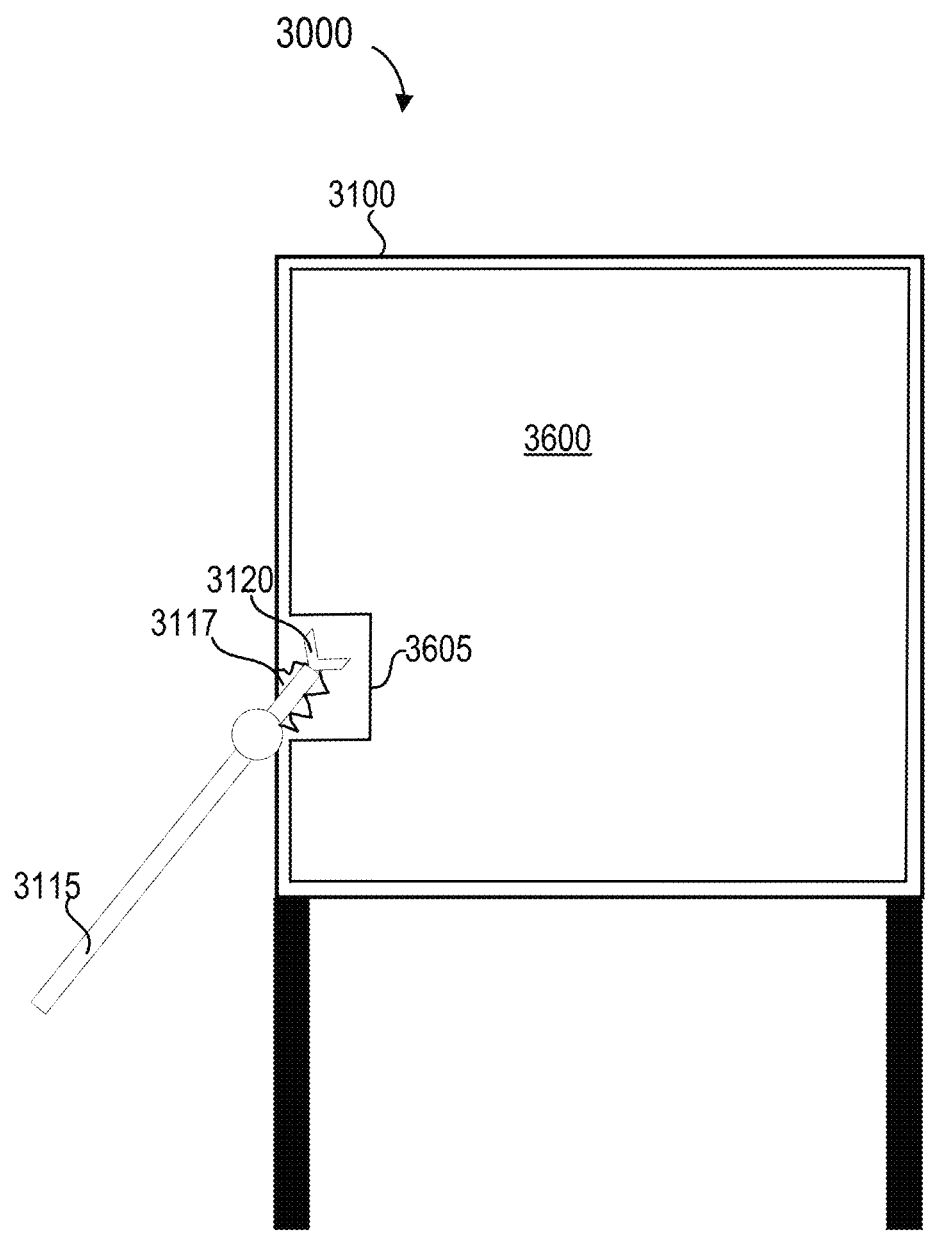
FIG. 35 depicts a cross section schematic end view of a cleaning system of the autonomous laundry separating and sorting device.

In implementations, the retractable cleaner 3600 comprises an actuatable cleaning drive motor in operable communication with the controller 3005. Upon determining that none of the plurality of deformable articles 12*a-n* remain on the stationary floor 3110 in any of the sequential work volumes 3005*a-d*, the controller 3005 is configured to instruct the retractable cleaner 3600 to advance from the inlet end I to the outlet end O of the enclosed channel 3100. In implementations, the drive motor extends a telescoping plunger 3612 or pusher arm disposed on an external face 3616 of the retractable cleaner 3600. As shown in FIG. 35, in implementations, the controller 3005 is configured to instruct the plurality of arms 3115*a-c* to retract from their associated work volumes prior to the retractable cleaner 3600 advancing through the plurality of work volumes 3105*a-d* such that only the terminal gripper 3120*a-c* of each of the plurality of arms 3115*a-c* remains within an associated work volume of the enclosed channel 3100. The retractable cleaner 3600 can comprise a slot 3605 configured to pass over and clean the terminal gripper 3120. Additionally, in implementations, the device 3000 includes a waterproof covering 3117 or seal about the arm 3115. The waterproof covering 3117 can comprise at least one of a flexible cone and an accordion pleated boot covering the arm and surrounding opening in a sidewall of the channel 3100 through which the arm 3115 extends. By sealing the opening, the waterproof covering 3117 prevents moisture from escaping the channel 3100 during cleaning and contains dirt, debris, biological matter, and any other biohazards and loose items within the enclosed channel 3100 during the separating process and sorting. Because the covering 3117 is flexible, arm movement is unconstrained and because the covering is waterproof, it can withstand the pressure, temperatures, and chemical compositions and cleaning solutions emanating from the retractable cleaner 3600.

Additionally, in implementations, the device 3000 further comprises one or more UV lights in operable communication with the controller 3005 for cleaning the enclosed channel 3100. The one or more UV lights are configured to illuminate the one or more sequential work volumes 3105a-d of the enclosed channel 3100 after the retractable cleaner 3600 advances to the outlet end O and then retracts to the inlet end I. In implementations, the one or more UV lights are disposed on one or more interior surfaces of the enclosed channel 3100, and the controller 3005 is further configured to instruct the plurality of arms fully extend into the enclosed channel before the one or more UV lights are illuminated, thereby also cleaning the fully extended arms 3115a-c. This sanitizes the enclosed channel surfaces and the arms 3115a-c and associated grippers 3120a-d between separating and sorting successive loads of one or more dirty deformable articles 12a-n, thereby preventing the potential introduction of contaminants, pathogens, and other debris and dirt between loads of articles.

Turning back to FIG. 34, in implementations, the retractable cleaner 3600 further comprises one or more wheels or pairs of wheels 3610a-e extending from an outer face 3616 (e.g., end wall 3112a) of the retractable cleaner 3600. The one or more wheels or pairs of wheels 3610a-e are configured to guide the motion of the retractable cleaner 3600 along one or more interior surfaces of the enclosed channel 3100 as the plunger arm 3612 advances the retractable cleaner 3600 down the length of the enclosed channel 3100 from in the inlet end I to the outlet end O. In implementations, the retractable cleaner 3600 comprises a plurality of spray ports 3615a-n disposed along a continuous outer surface 3620 of the retractable cleaner 3600 facing the one or more interior surfaces of the enclosed channel 3100. A service line 3625 is in fluid communication with the plurality of spray ports 3615a-n. The service line 3625 is configured to provide a cleaning fluid for application to the one or more interior surfaces via the plurality of spray ports 3615a-n. In implementations, the cleaning fluid comprises at least one of steam, water, a detergent, a germicide, and a pesticide.

In implementations, the service line 3625 further comprises at least one of a vacuum line and a power conduit. Additionally, in implementations, the retractable cleaner 3600 further comprises a plurality of evacuation ports 3630a-n disposed along the continuous outer surface 3620 of the retractable cleaner facing the one or more interior surfaces of the enclosed channel. The plurality of evacuation ports 3630a-n is in operative communication with the vacuum line for suctioning remaining moisture from the one or more interior surfaces of the enclosed channel 3100 upon advancement of the retractable cleaner 3600 through the enclosed channel 3100. Additionally, in implementations, the retractable cleaner 3600 comprises a squeegee 3635 on a trailing edge of the continuous outer surface 3620 of the retractable cleaner 3600 facing the one or more interior surfaces of the enclosed channel.

As described with regard to implementations, the device 3000 comprises a plurality of arms 3115a-c for separating a plurality of deformable articles and intelligently sorting the articles one at a time into one or more batches for washing. As previously described, each of the plurality of arms 3115a-c is configured to pan, tilt, extend, and retract within an associated work volume 3105a-c of the enclosed channel 3100.

Figure 36:
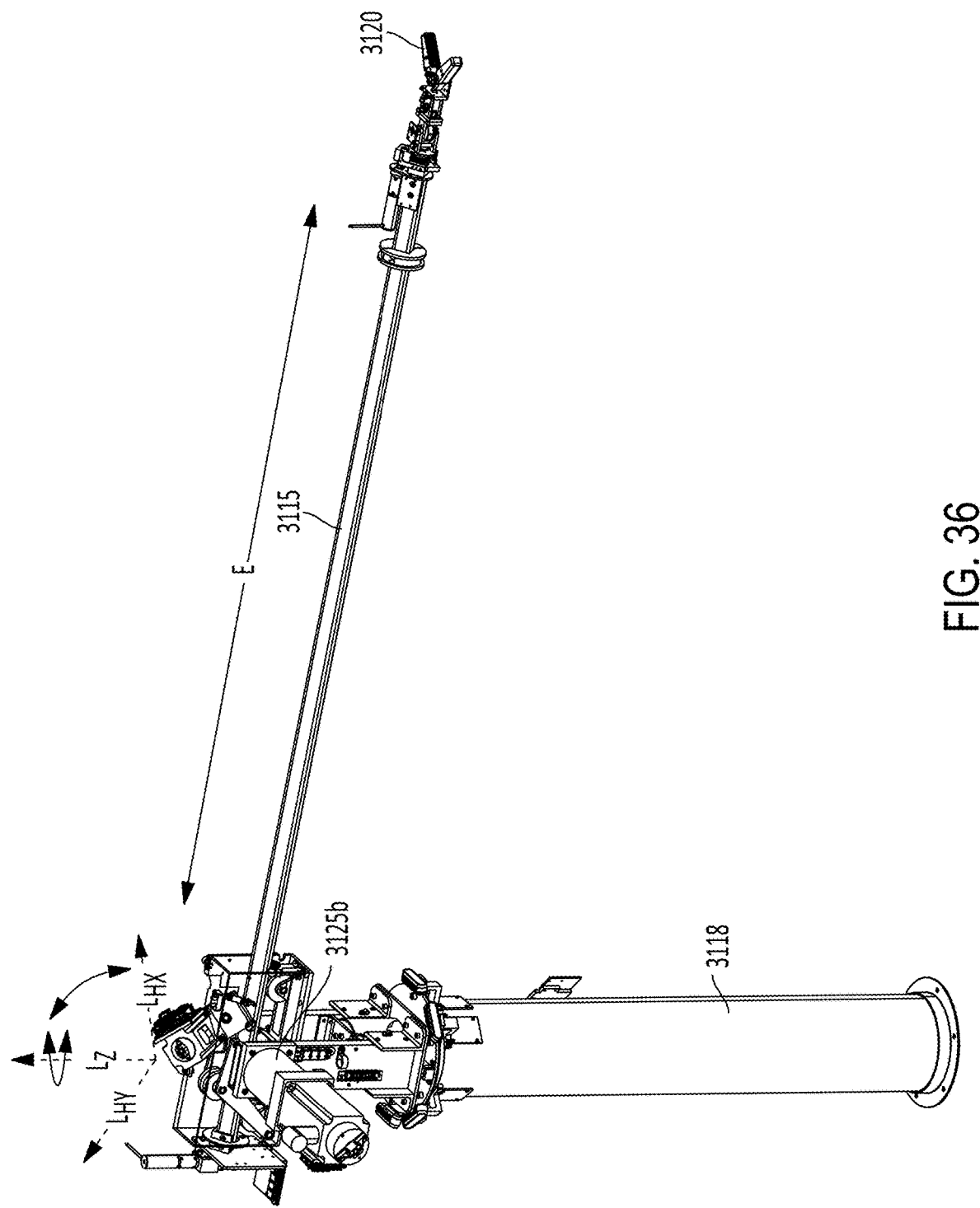
FIG. 36 depicts an example of an arm of the autonomous separating and sorting robot.
Figure 37:
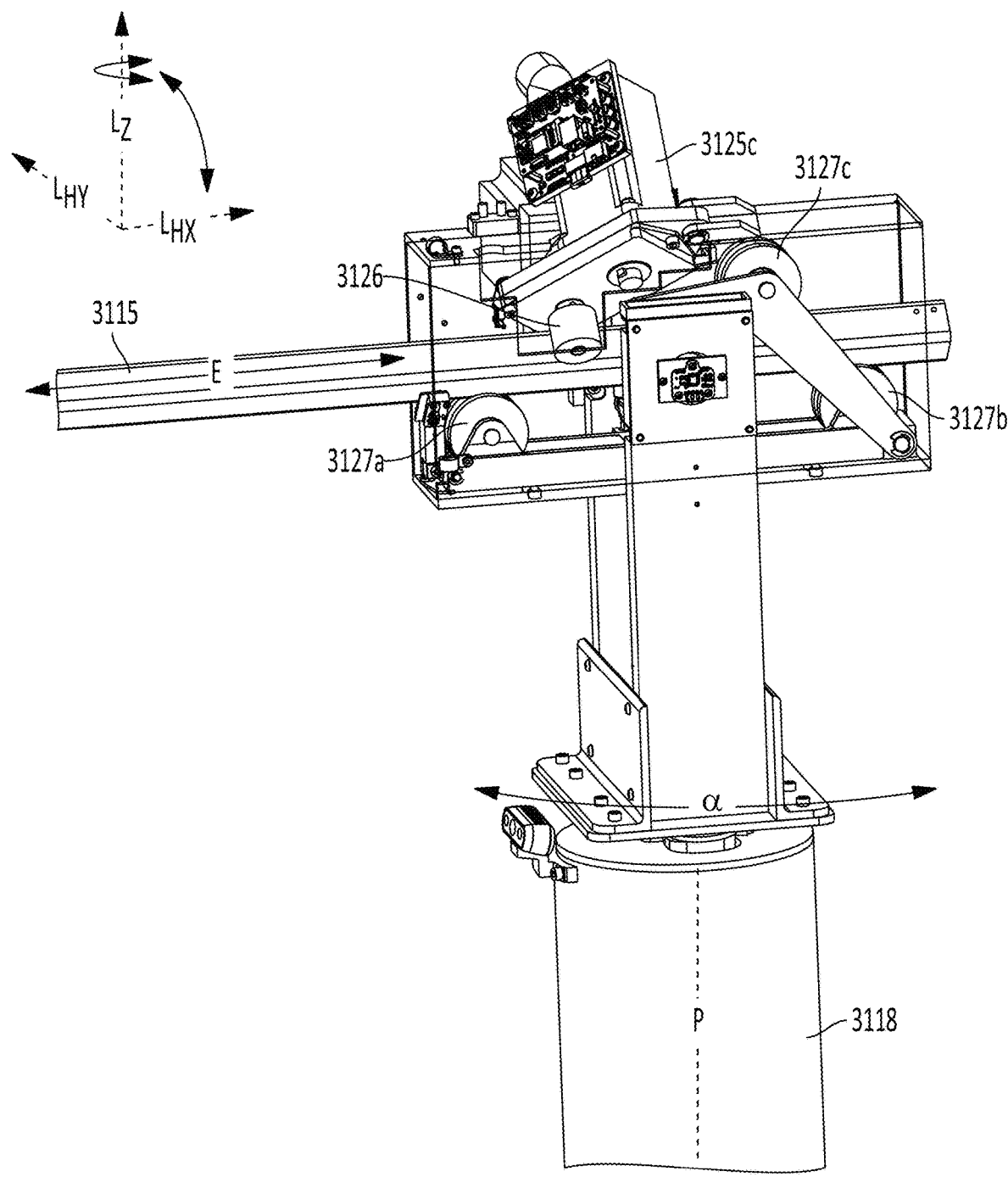
FIG. 37 depicts a portion of the arm of FIG. 36 with partial transparency to reveal inner working elements of a drive system.
Figure 38:
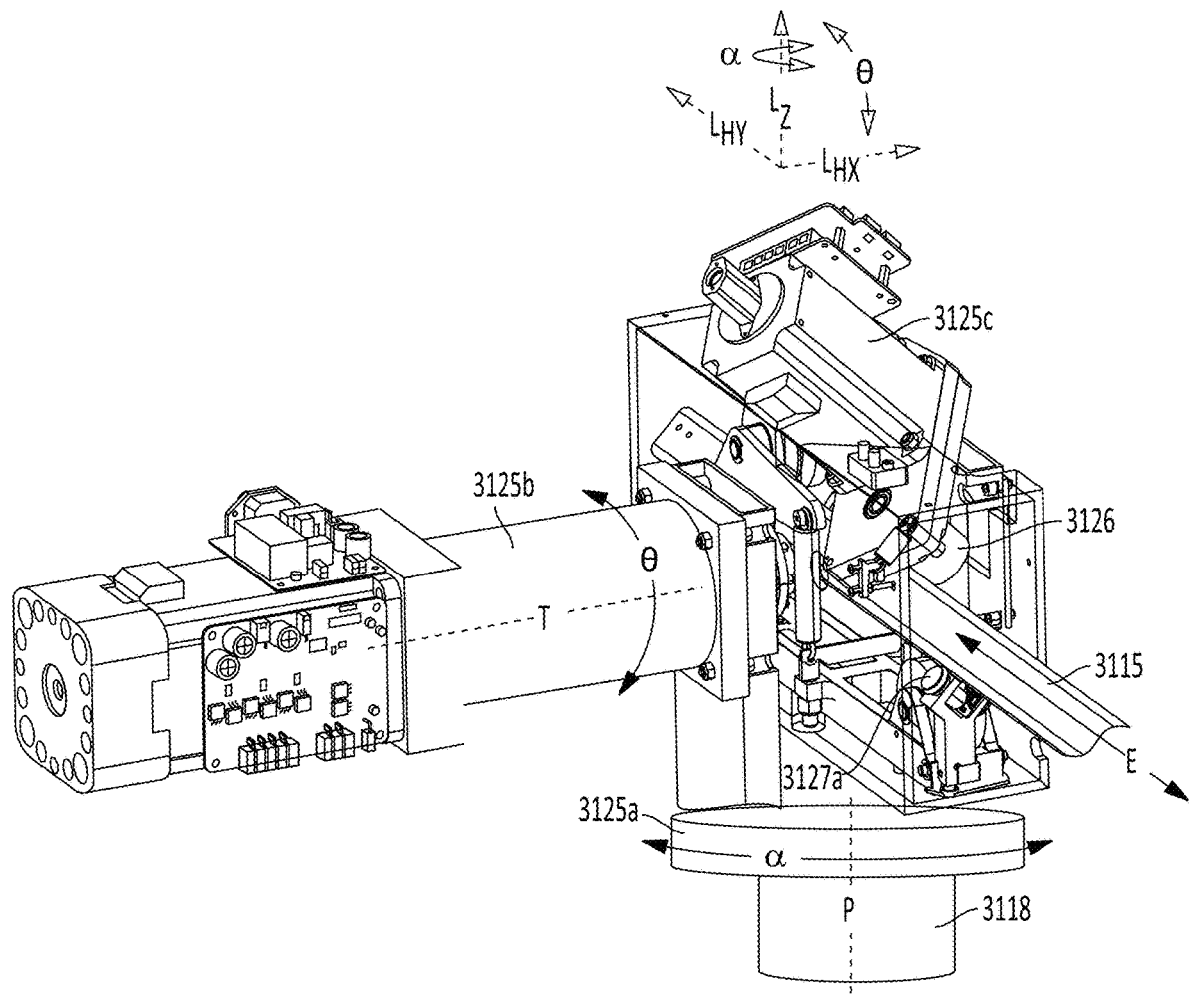
FIG. 38 depicts a rotated view of the portion of the arm of FIG. 37 showing an implementation of a drive system of the arm of the autonomous laundry separating and sorting device.

As shown in FIGS. 36-38, the plurality of arms 3115a-c each extend from a corresponding anchor 3118a-c at corresponding individually anchored positions as shown, for example, in the implementations of FIGS. 10-11. In implementations, the anchor 3118a-c comprises a columnar pedestal or base affixed to the floor 10 beneath the device 3000 and adjacent the enclosed channel 3100. In implementations, each arm 3115a-c comprises a fully extended length of between about 0.25 m and 4 m. The plurality of arms 3115a-c are each configured to tilt and extend to a hoist height H1. In implementations, the hoist height comprises a predetermined height Additionally or alternatively, the hoist height can vary depending on the size of a raised article 12. The controller 3005 can dynamically determine a final hoist height, based on, for example, a received sensor signal, that the article 12 is suspended above the floor 3110 of the channel 3100. In implementations, the hoist height comprises a range of between about 0.5 to 4 m above the stationary floor 3110.

Turning to FIGS. 36-38, the arm 3115a-c comprises at least one drive motor 3125a-c disposed on an anchor 3118a-c, and, in implementations, the at least one drive motor comprises a pan drive motor 3125a, a tilt drive motor 3125b, and an extend drive motor 3125c as will be described in detail subsequently. In implementations, the plurality of anchors 3118a-c are each associated with one of the plurality of arms 3115a-c and disposed on at least one of a wall 3112a-d, the stationary floor 3110, and the ceiling 3111 of the enclosed channel 3100. In implementations, each anchor is disposed outside the enclosed channel 3100 and the associated one of the plurality of arms 3115a-c moveably engaged therewith extends through a side wall 3112c-d of the enclosed channel 3100.

In implementations, the enclosed channel 3100 comprises a plurality of openings in a sidewall, each opening being configured to receive one of the plurality of arms 3115a-c therethrough. Implementations, as described with regard to FIG. 25, a seal or covering 3117 is disposed about each of the plurality of openings through which each one of the plurality of arms extends. In implementations, the seal comprises a flexible material configured to stretch as the rod extends, pans, tilts, and retracts. Additionally or alternatively, the seal is pleated and compressible. As described with regard to the implementation of FIG. 35, the seal is configured to enable the arm 3115a-c to retract so that only the terminal gripper 312a-c remains exposed within the enclosed channel 3100 for cleaning and sanitizing. In implementations, the flexible material comprises at least one of NEOPRENE, vinyl, rubber, plastic, leather, urethane, silicone, and elastane (SPANDEX).

In implementations, as shown in FIGS. 6-7 and 10-11, for example, the plurality of arms 3115a-c are disposed along a length of the enclosed channel 3100 at individually anchored positions spaced apart from each of the other anchored positions by between about 150 cm to 400 cm. In one implementation, the plurality of arms 3115a-c are spaced apart by a distance of between about 4 to 9 feet (e.g. (e.g., 4 ft, 4.25 ft, 4.5 ft, 4.75 ft, 5 ft, 5.25 ft, 5.5 ft, 5.75 ft, 6 ft, 6.25 ft, 6.5 ft, 6.75 ft, 7 ft, 7.25 ft, 7.5 ft, 7.75 ft, 8 ft, 8.25 ft, 8.5 ft, 8.75, 9 ft). In implementations the plurality of arms 3115a-c comprises at least two arms. In implementations, the plurality of arms 3115a-c comprises at least three arms. In implementations, each one of the plurality of arms 3115a-c comprises an arm with no joints. In some implementations, at least one arm of the plurality of arms 3115a-c comprises one or more joints. In implementations, one of the one or more joints is a spherical joint. In alternative implementations one or more of the plurality of arms 3115a-c comprises a stationary vertical riser along which a gripper translates up and down. In still yet other implementations, one or more of the anchors 3118a-c comprises a rotatable riser along which a gripper 3120 translates bidirectionally. In implementations, rather than rotating between work volumes as described previously, one or more of the plurality of arms 3115a-c can be movably mounted to slide or motor along one or more tracks disposed above and/or aside the floor 3110 of the channel 3100. The one or more movably mounted plurality of arms are configured to slide linearly between at least one of vertical and horizontal positions, the horizontal positions extending the length of each work volume 3105a-c. In implementations, the movably mounted arms are configured to at least one of extend and tilt. Additionally, in implementations, the plurality of arms movably mounted to rails comprise one or more joints.

In the implementation of FIG. 11, the device 3000 comprises three arms 3115a-c connected to bases 3118a-c each anchored aside the enclosed channel 3100. In implementations, one or more of the bases 3118a-c is anchored to a floor 10 beneath the enclosed channel 3100. In other implementations, one or more of the bases 3118a-c is anchored to a ceiling 3111 or support frame or beam 3119 located above the floor 3110 for providing access to an associated plurality of work volumes 3105a-d.

Figure 34:
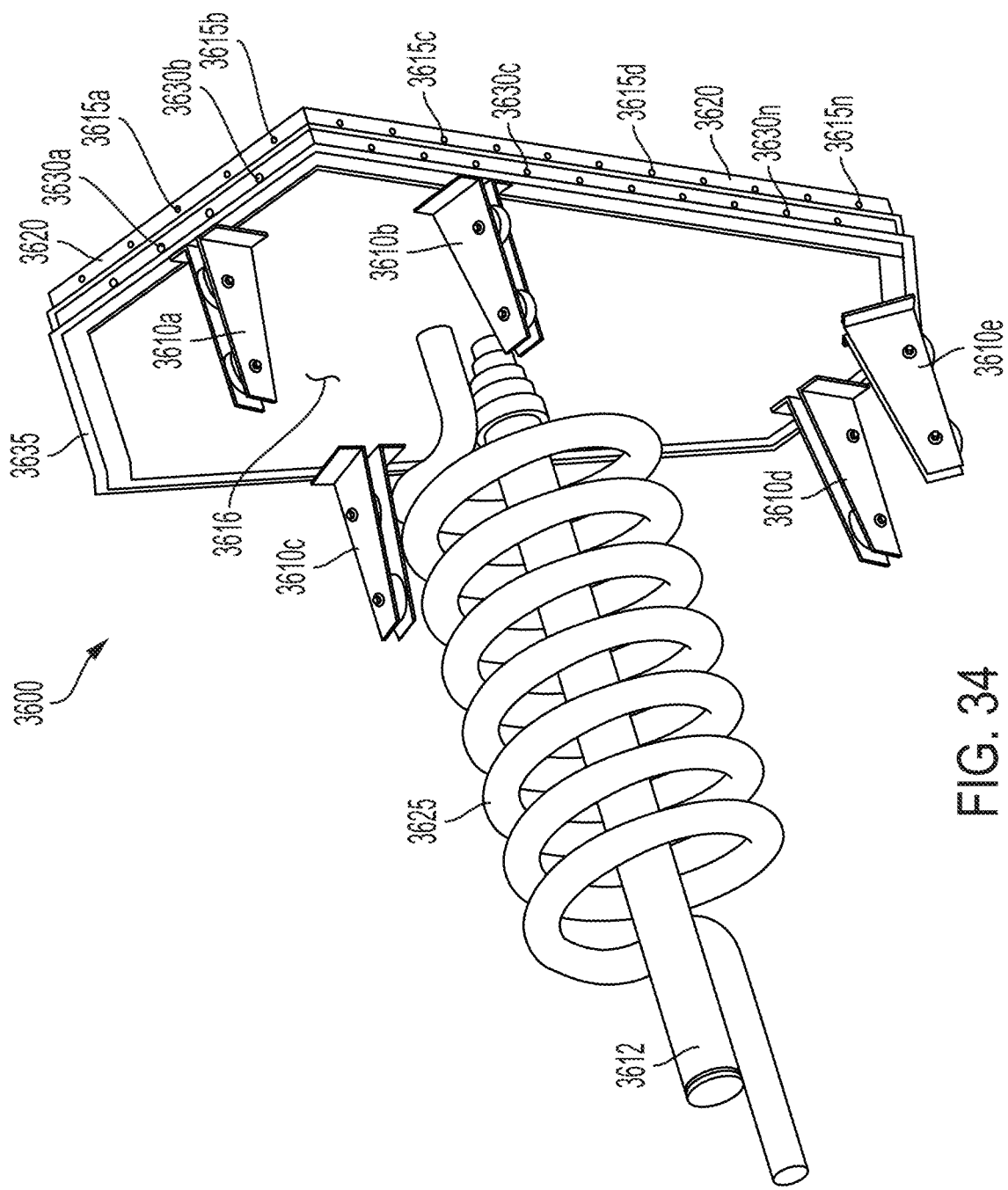
FIG. 34 depicts a perspective end view of an implementation of a cleaning system of the autonomous laundry separating and sorting device.

As previously described with regard to implementations, each of the plurality of arms 3115a-c comprises at least one drive motor 3125a-c, a'-c', a"-c'" schematically represented in FIG. 6 and shown in FIGS. 36-38. (Although FIGS. 34-36 show a single arm 3115, all elements described herein are considered applicable to each arm and where applicable elements are generically referenced.) Each arm 3115, 3115a-c (hereinafter referred to as an arm 3115) of the plurality of arms 3115a-c can comprise between one and three degrees of freedom. As shown in FIGS. 6 and 37-38, in implementations, each arm 3115 of the plurality of arms 3115a-c can include a pan motor 3125a, a', c' for rotating each associated arm 3115a-c about a vertical axis P through a rotational angular direction α and parallel to schematically represented vertical axis $L_Z$. In implementations, each arm 3115 is disposed at anchored positions spaced apart by at least about a distance of at least 5-20 inches (e.g., approximately 12-50 cm) from the channel 3100 exterior surfaces so as to not interfere with the enclosed channel 3100 while maintaining effective working volumes for successfully grasping, hoisting, and rotating one or more articles 12 down the channel 3100. As shown in FIG. 5, in implementations, the pan motor 3125a-a" comprises an encoder 3157a-a" for detecting a rotational position of the arm 3115a-c, a'-c', a"-c". In implementations, the pan motor 3125a-a" is a controllable servo motor and comprises a speed encoder in operable communication with at least one of the processor 3155, 3155a-c and the controller 3005.

In implementations, each arm 3115 of the plurality of arms 3115a-c can include a tilt motor 3125b, b', b" c for raising and lowering the arm 3115 and associated terminal gripper 3120 with respect to the floor 3110, wherein the floor 3110 is in a plane defined by axes $L_{HX}$ and $L_{HY}$ as shown in FIG. 7. The arm tilt motor 3125b, b', b" is positioned at least a distance of 300 mm over the floor 3110. In implementations, a tilt motor 3125b-b" comprises an encoder 3157b-b" for detecting a position of the arm 3115, 3115a-c. As shown in FIGS. 36-38, the tilt motor 6120 of a lifter 6100 is configured to tilt an arm 6110 in a rotational tilt direction θ about a tilt axis T approximately aligned with a longitudinal axis of the tilt motor 6210, thus moving a gripper 6105 upward along the vertical $L_Z$ (e.g., z-axis).

As shown in FIGS. 37-38, in implementations, each arm 3115 of the plurality of arms 3115a-c can include an extend motor 3125c-c'" for pushing and pulling an associated arm 3115, 3115a-c forward and back in a linear direction along an axis E of each arm 3115 and thereby drive each gripper 3120 toward and away from its associated base 3118 of the plurality of bases 3118a-c. For example, as shown in FIGS. 37-38, the extend motor 3125c drives a friction wheel 3126 configured to engage a surface of the arm 3115. The arm 3115 is seated in two or more rotatable support wheels 3127a-c configured to hold the arm in steady alignment as the friction wheel 3126 retracts and extends the arm 6110 therealong into and out of the work volume 3105, 3105a-d. In implementations, the rotatable support wheels 6127a-c comprise v-groove ball bearings and one or more corners of an arm 3155 are disposed on and movably supported by the v-groove of each bearing. Additionally or alternatively, in implementations, the rotatable support wheels 3127a-c comprise one or more crowned rollers having rounded edges to guarantee no wear on an engaged arm 3115, 3115a-c. In implementations, the rotatable support wheels 3127a-c are configured to withstand maximum radial and axial loads during high-acceleration motions of a heavy article (e.g., an article comprising a weight in a range of between about 3 kg to 5 kg) supported by each arm 3115a-c. Additionally or alternatively the arm 3115 further comprises a rack disposed thereon for engaging with a gear (not show) to prevent the arm 3115 from slipping during extend and retract motions in the direction of the bidirectional arrow representing axis E.

The one or more drive motors 3125a-c, a'-c', a"-c'" associated with each arm 3115a-c can operate simultaneously, in some sub-combination, or alternate operating to move the each gripper 3120a-c to a location within the enclosed channel 3100 for engaging a deformable laundry article 12 disposed therein. Each gripper 3120a-c is configured to releasably engage the deformable laundry article 12 and operate at least one of independently of and in tandem with another of the grippers 3120a-c to at least one of raise and suspend the deformable laundry article above the floor 3110 of the enclosed channel 3100.

In implementations, each arm 3115, 3115a-c can comprise a rod, such as an extruded beam, configured to extend from an associated base 3118, 3118a-c. In implementations, an arm 3115 can have no joints along its length, and a length from end to end that measures between about 0.25 m and 4 m (e.g. 0.25 m, 0.5 m, 1.0 m, 1.25 m, 1.5 m, 1.75 m, 2.0 m, 2.25 m, 2.5 m, 2.75 m, 3.0 m, 3.25 m, 3.5 m, 3.75 m, 4.0 m). In implementations, each arm 3115 of the plurality of arms 3115a-c is an extendable arm comprising a fully extended length of between about 0.25 m and 4 m (e.g. 0.25 m, 0.5 m, 1.0 m, 1.25 m, 1.5 m, 1.75 m, 2.0 m, 2.25 m, 2.5 m, 2.75 m, 3.0 m, 3.25 m, 3.5 m, 3.75 m, 4.0 m). In examples, the extendable arm can include at least one of one or more flexible and/or compliant joints and two or more telescoping sections. In implementations, the at least one compliant joint comprises a compliant wrist disposed between the extendable rod of the arm 3115 and the terminal gripper 3120. Additionally or alternatively, the wrist of an arm 3115 comprises one or more of a swivel joint and hinge joint for bending the wrist and aligning the terminal gripper to close on a grippable edge of a hoisted article 12 rather than trying to pinch a planar surface.

Joints and telescoping arms can be implemented to accommodate space constraints, but the additional moving sections can create pinch points for potential entangling the deformable laundry article 12. Therefore, in implementations, each arm of the plurality of arms 3115a-c comprises no joints. In implementations, the motions of each arm 3115, 3115a-c have a resolution of +/−5 mm in all three cardinal directions ($L_{HX}$, $L_{HY}$, $L_Z$). This precision enables alignment of an associated gripper 3120, 3120a-c before grabbing a grip point 15a-f on a deformable laundry article 12. In implementations, each arm 3115, 3115a-c moves the associated gripper 3120, 3120a-c within a spherical work volume having a radius defined by the arm 3115, 3115a-c. In implementations, the linear error introduced by degrees of pan and/or tilt at a full extension of the arm 3115, 3115a-c is +/−5 mm.

As previously described, in implementations, the two or more arms 3115, 3115a-c comprises three arms anchored along a length of the enclosed channel. In implementations, as shown in FIGS. 15A-17B, each arm 3115, 3115a-c has a range of motion that extends into an adjacent work volume 3105a-c. In implementations, adjacent work volumes 3105a-d overlap for at least 0.30 meter (e.g., about 1 ft) for the full vertical height of the work volume 3105a-d, from the floor 3110 to a maximum suspension height (e.g., maximum hoist height) within the work volumes 3105a-c. In implementations, each one of the plurality of arms 3115a-c is configured to extend to any point on the floor within an associated work volume 3105a-c and throughout the width, length, and height H of the work volume 3105a-c, which is the volume of space extending between the floor 3110 and the ceiling 3111 that is accessible by the arm 3115a-c at full extension, though a maximum pan range of movement and maximum tilt range of movement. In implementations, the pan motor 3125a-a" comprises a power output in a range of between about 30-1800 W. In implementations, the tilt motor 3125b-b" comprises a power output in a range of between about 120-3550 W motor. In implementations, the extend motor 3125c-c" comprises a power output in a range of between about 60-1690 W motor. The bottom end of the ranges comprise power ratings for pan, tilt, and extend motors controlling an arm 3115 repositioning an article 12 having a weight between about 0.1-1.25 kg or an article having a weight in the range of about 3-5 kg traversing a work volume slowly (2-5 seconds). The top end of the ranges comprise requirements for moving an engaged article 12 having a weight of between about 3-5 kg traversing the work volume quickly (1-2 seconds), wherein traversing the work volume comprises moving through a full range of motion of any individual motor 3125a-c, a'-c', a"-c" (e.g., pan, tilt, extend). These ranges and values are intended to address the ranges and values of the plurality of varied laundry article types typically generated by a household. In any of the above implementations, traversing a work volume 3105a-c is defined as any traversal including at least one of a full range of pan, full range of tilt, and full range of extend motions of the arm 3115a-c and associated gripper 3120a-c.

In addition to pan, tilt, and extend motions, in implementations, additionally or alternatively, the controller 3005 is further configured to drive the at least one drive of an arm 3115 of the plurality of arms 3115a-c in at least one of alternating side-to-side and alternating up and down motions to shake one or more grasped deformable article 12 of the plurality of deformable articles at the hoist height. By shaking the terminal gripper 3120 at the hoist height, the arm 3115, 3115a-c can free any articles 12a-n that may be stuck together, e.g., statically attracted, or entangled. This is possible because the terminal grippers 3120 are designed to securely grasp an article 12.

As shown in the system schematic of FIG. 5, the device 3000 comprises three or more arms 3115a-c in operable communication with at least one of their respective processors 3155a-c and the at least one controller 3005. In implementations, each one of the three or more arms 3115a-c comprises a pan drive 3160, tilt drive 3162, and extend drive 3164 configured to drive motors 3125a-c, a'-c', a"-c" configured to pan, tilt, and extend an arm 3115, 3115a-c as described with regard to implementations. In implementations, the pan motors 3125a-a", tilt motors 3125b-b", and extend motors 3125c-c" comprise controllable motors (e.g., a brushless DC motor (BLDC)), Each arm 3115, 3115a-c comprises a network interface 3166, 3166a-c configured to communicate data and sensor signals to at least one of the respective processors 3155, 3155a-c and the at least one controller 3005 of the system 400 (via a wireless or wired communication network 230) for processing. The sensor signals can be output from one or more optical sensors 3140, 3145, 3147, one or more encoders 3157a-c, a'-c', a"-c", and one or more position sensors 3168, 3168a-c and routed via a sensor interface 3170, 3170a-c.

Additionally, each arm 3115, 3115a-c comprises a gripper drive 3172a-c and a gripper actuator 3174, 3174a-c in communication with at least one of the respective processors 3155, 3155a-c and the at least one controller 3005 of the system 400 (via a wireless or wired communication network 230). Additionally, in implementations, each arm 3115, 3115a-c comprises one or more gripper sensors 3176, 3176a-c (e.g., a Hall sensor for detecting an angular position of a gripper wrist that flexes relative to the longitudinal arm axis E) and fingertip pressure sensors disposed in the fingers of the gripper for detecting contact forces with an article of clothing and/or the workspace floor 3110.

As previously described, each arm 3115 of the plurality of arms 3115a-c terminates at an associated gripper 3120, 3120a-c. In implementations, each gripper 3120, including gripper fingers, can be manufactured from a lightweight, impact resistant material, such as aluminum or steel. In implementations, as shown in FIGS. 39A-41B, each gripper 3120 comprises at least two actuatable fingers 3707a-b. In implementations, the at least two actuatable fingers comprise an overmold 3708a-b comprising a durometer of between about 40 A to 80 A. For example, the overmold can comprise at least one of a polymer or copolymer including at least one of a rubber, a thermoplastic elastomer, (TPE), thermoplastic polyurethane (TPU), thermoplastic vulcanizates (TPV), and silicone. The overmold provides protection of the encapsulated fingers and any delicate fabrics of the deformable laundry article 12. Additionally, having a soft fingertip enables finer grasping or grabbing of deformable laundry articles 12 off of a surface, such as the floor 3110 of the enclosed channel 3100. In implementations, a gripping surface of each finger of a gripper 3120, 3120a-c comprises a textured surface, e.g., ribs, bumps, ridges, and/or other protuberance, for assisting with gripping the fabric of an article 12 with some degree of friction and/or perturbation. Additionally or alternatively, an outside surface (e.g., opposite the gripping surface) of each finger of a gripper 6105a-d comprises a smooth surface for preventing the fabric of an article 12 from sticking to an outside surface of the gripper 3120, 3120a-c. In implementations, the gripper 3120, 3120a-c is washable and capable of withstanding heavy liquid spray and/or immersion and can have an IP rating of at least one of IP65, IP66, and IP56. In implementations, each gripper 3120 is about 300 mm long, about 100 mm high, and weighs about 500 grams.

Figure 42A:
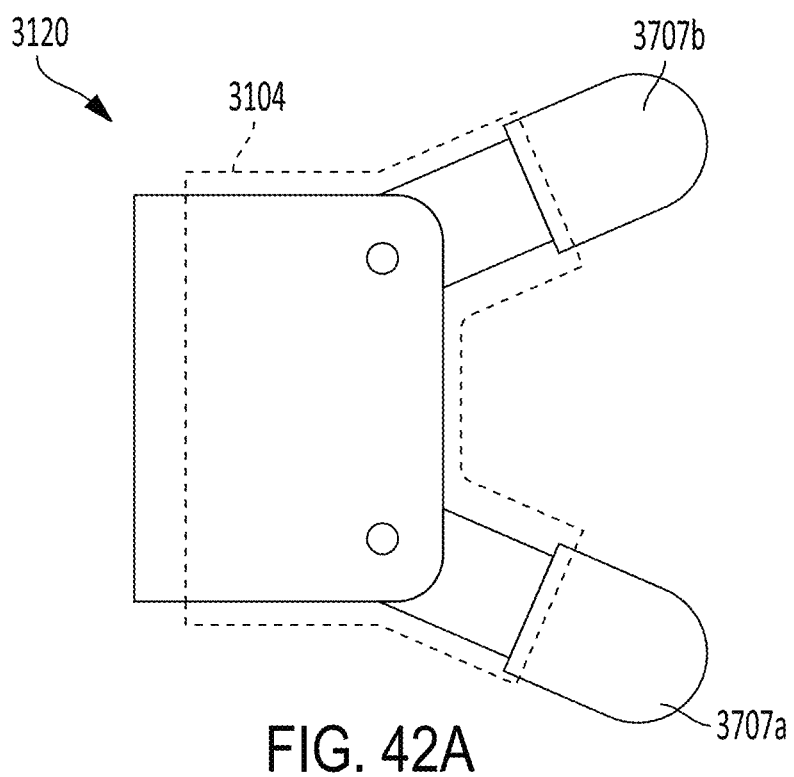
FIG. 42A depicts an example gloved gripper in an open position.
Figure 42B:
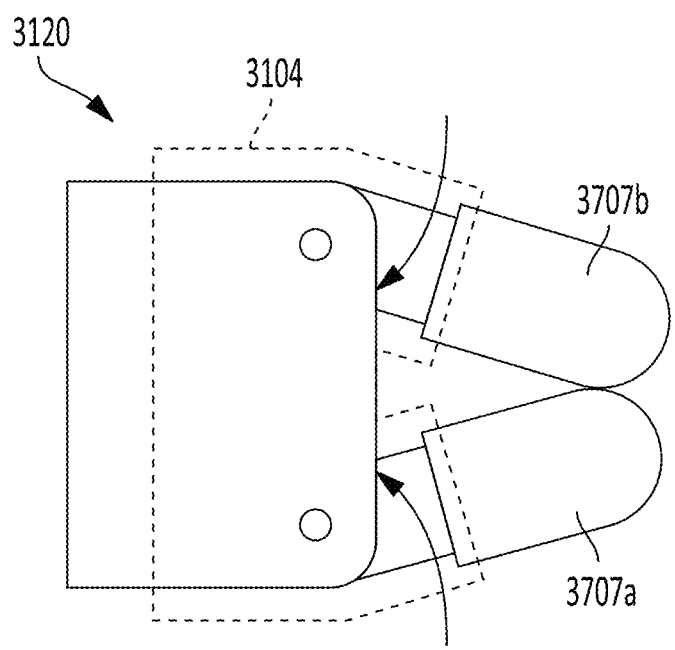
FIG. 42B depicts an example gloved gripper in a closed position.

In implementations, as shown in FIGS. 42A-B, the gripper 3120, 3120a-c comprises a glove 3104 or covering to prevent a deformable article from getting caught on at least one of a topography or interface of movable components of the gripper 3120, 3120a-c during the separating and sorting process. In implementations, the covering 3104 comprises a flexible, dirt repellant fabric. Additionally or alternatively, in implementations, the covering 3104 comprises a liquid-impermeable material configured for enabling washing of the covered gripper. In implementations, the covering 3104 can be at least one of polyester, rayon, thermoplastic polyurethane, nitrile, closed-cell foams, rubbers, silicone, and NEOPRENE. The glove, or covering 3104, is flexible and/or stretchable such that the fingers 3707a-b can move apart and together (FIG. 42B) without any disruptive resistive forces.

Figure 41A:
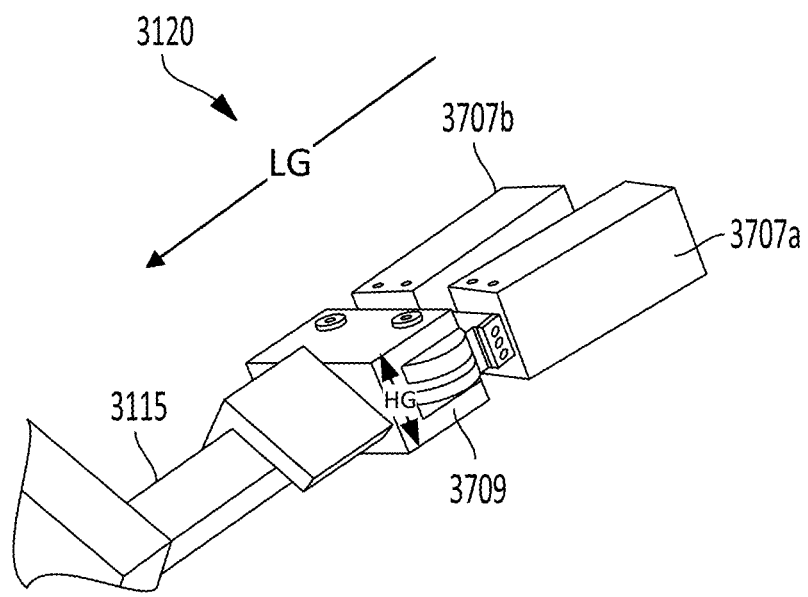
FIGS. 41A-B depict example grippers of the autonomous laundry separating and sorting device.
Figure 41B:
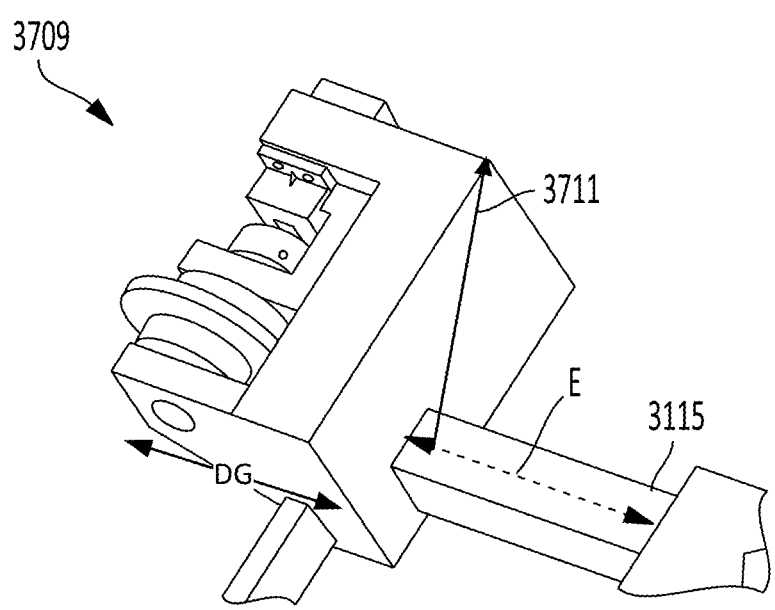

The at least two actuatable fingers 3707a-b can rotate about parallel pivot points 3706a-b. In implementations, the at least two actuatable fingers 3707a-b are configured to be actuated by a drive assembly 3709 (e.g., FIGS. 41A-B) to rotate simultaneously while gripping a deformable laundry article 12. The drive assembly 3709 can be in operable communication with the controller 3005. In implementations, the drive assembly 3709 can be cable driven or pneumatically driven. The drive 3709, as shown in FIGS. 41A-B, can be mounted to the arm 3115 and can be 100 mm long and weigh 500 grams. In implementations, the drive assembly 3709 comprises a cross section radius 3711 of less than 100 mm from the axis E of the arm 3115 in any direction.

In implementations, a gripper 3120 can comprise the following design factors shown in table 2:

TABLE 2

| | |
|---|---|
| Grip strength | 50N |
| Finger strength-to-force ratio | 2.0 |
| Grip force | 25N |
| Contact distance | 80 mm |
| Grip torque | 2 N-m |
| Gripper transmission factor | 22 mm |
| Cable tension | 90N (20 lbs) |
| Cable | 2045 SN [220 lb breaking strength, 7 × 19 construction, 1.12 mm diameter] |
| Motor pulley radius | 14 mm |
| Motor torque | 1.26 N-m |

In implementations, the following definitions apply to the design factors of table 2. Grip strength is the maximum force that can be applied to moving the deformable article 12. It can also be thought of as the force required to pull a deformable laundry article 12 out of a gripper 3120. The at least two actuatable fingers 3107a-b make contact with the deformable laundry article 12 and directly impart the force that moves the deformable laundry article 12 (grip strength). This force is due to a combination of friction (when the force is generally parallel to the gripping surface) and normal tension (for instance, when the deformable laundry article 12 is wrapped over one of the two or more fingers 3707a-b). In implementations, such as that depicted in FIGS. 40A-B, the gripper 3120 comprises a sweet spot SS which comprises the volume between the two fingers 3107a-b in which an article must be (e.g., the contact area CA) when the gripper actuates in order for the grasp to be successful.

Grip force is the force the two or more fingers 3707a-b push against each other (when empty) or the deformable laundry article 12 (when engaged). The grip force is determined by the grip torque and the contact distance (distance between finger pivot 3706 and contact point with the deformable laundry article 12). If the deformable laundry article 12 is engaged at a single point, the grip force equals the grip torque divided by the contact distance. In embodiments, calculations are based on the center of the contact area defining the contact point. Strength-to-force ratio is the ratio between grip strength and grip force. In implementations, grip strength and grip force are directly proportional so that the ratio is fixed for a given combination of finger 3707, deformable laundry article 12 type and shape. In other implementations, grip strength and grip force have a sigmoidal relationship. For example, this applies to grippers 3120 that create a normal force or otherwise 'lock' the deformable laundry article 12 into place between the fingers 3707a-b. Grip torque is the torque on the joints of the fingers 3707a-b. This is dependent on the cable tension and gripper geometry and can be increased by increasing the lever arm in the gripper 3120, but this increases the gripper size. Cable tension is dependent on the motor torque and lever arm at the motor. This sets the minimum diameter of the cable. Cable tension can be increased by decreasing the motor lever arm, but in implementations using a pulley wheel, a minimum diameter is required to ensure the cable does not break. Motor torque is minimized to reduce cost and weight of the motor.

Figure 39A:
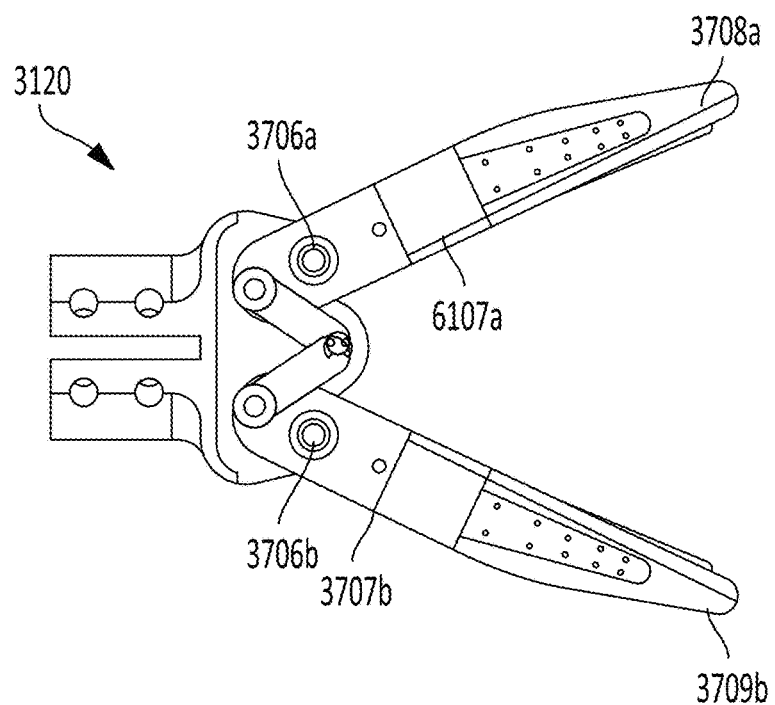
FIG. 39A depicts an example hinged gripper of the autonomous laundry separating and sorting device.
Figure 39B:
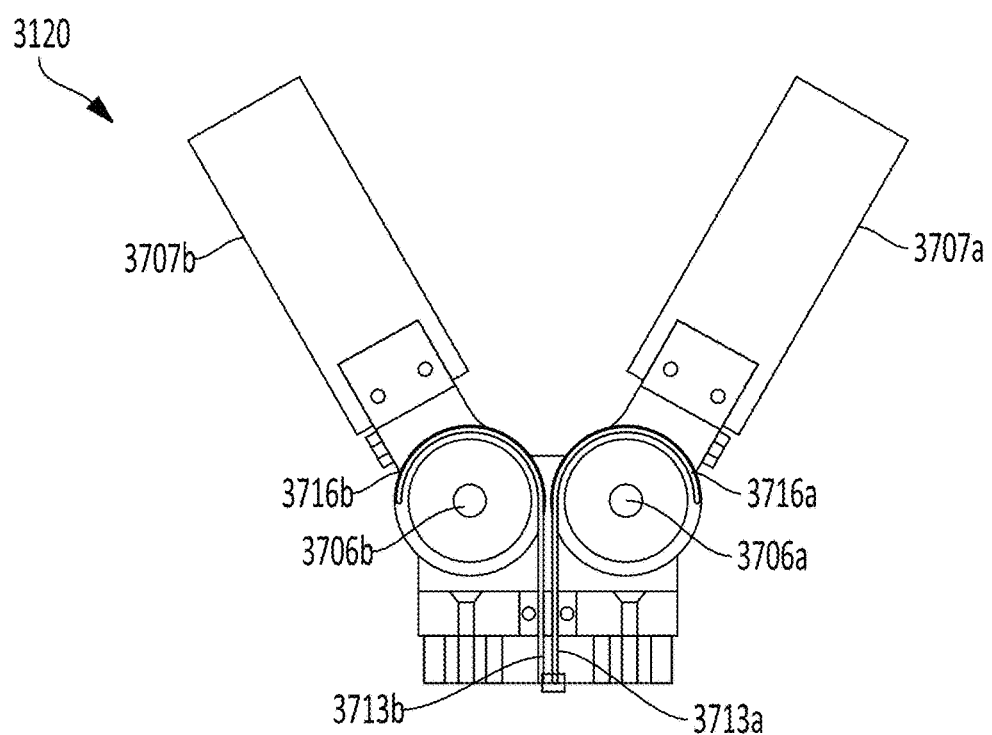
FIG. 39B depicts an example pulley driven gripper of the autonomous laundry separating and sorting device.
Figure 40A:
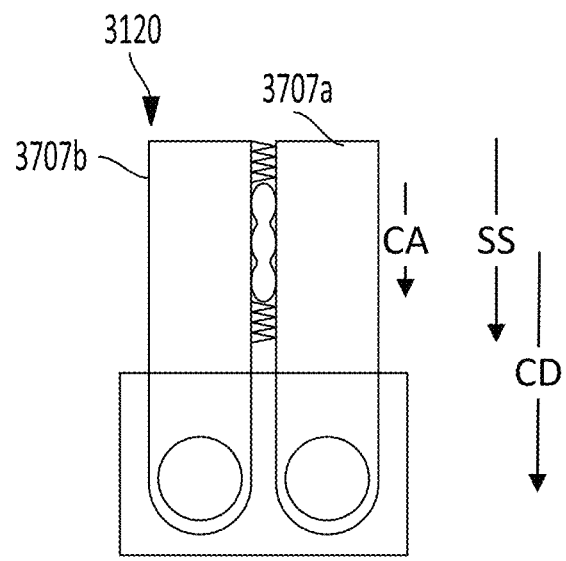
FIGS. 40A-B depict example grippers of the autonomous laundry separating and sorting device.
Figure 40B:
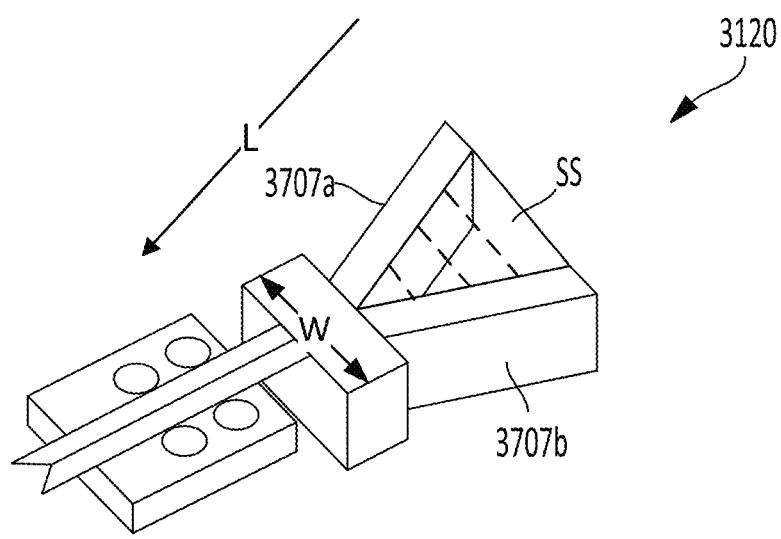

FIGS. 39A-B show exemplary grippers comprising linkages and pulleys for moving the fingers 3707a-b by turning translational cable displacement into angular motion. In one implementation employing a pulley (FIG. 39B), two cables 3713 are threaded through the finger joints 3716. In another implementation employing linkages (FIG. 39A), a single cable is looped around a pin. The linkage system is configured to amplify torque as the fingers 3707a-b close.

In other implementations, the grippers 3120, 3120a-b can comprise pneumatic actuators. A cable, or pneumatic tube, is snaked through the arm 3115. The gripper mechanism is driven by a linear motion, which is translated into finger rotation by linkages or pulleys. In implementations, the fingers 3107a-b are joined by linkages to one another and an actuatable cylinder. The pneumatic gripper 3120 is lightweight, quickly actuated, and built to withstand cycles on order of magnitude in the millions or higher. In implementations, at least one pneumatic tube runs through a hollow conduit extending the length of the arm 3115. In implementations, two pneumatic tubes run through the hollow conduit, each one of the pneumatic tubes configured to be in fluid connection with one of two sides of a pneumatic actuator. In implementations, the controller 3005 actuates the gripper 3120 to close (e.g., clamp shut) the fingers 3107a-b by pressurizing one side of a pneumatic actuator. In implementations, the controller 3005 actuates the gripper 3120 to open (e.g., spread apart) the fingers 3107a-b by pressurizing the other side of the pneumatic actuator. Additionally or alternatively, in implementations, the fingers can be held open by a cylinder and return spring assembly, which can be weak enough to allow any tangled deformable laundry article 12 to slip off the fingers. Pneumatic actuators have the advantage of being easy to seal against ingress of dirt and germs. Pneumatics actuators have the advantage of being easy to seal against ingress of dirt and germs. In implementations comprising a pneumatic cylinder at 100 psi, a gripper 3120 can comprise the following design factors shown in table 3:

TABLE 3

| | |
|---|---|
| Grip strength | 50N |
| Finger strength-to-force ratio | 2.0 |
| Grip force | 25N |
| Contact distance | 80 mm |
| Grip torque | 2 N-m |
| Gripper transmission factor | 22 mm |
| Piston force | 90N (20 lbs) |
| Piston bore size (assuming 100 psi) | 7/16" |

Figure 43A:
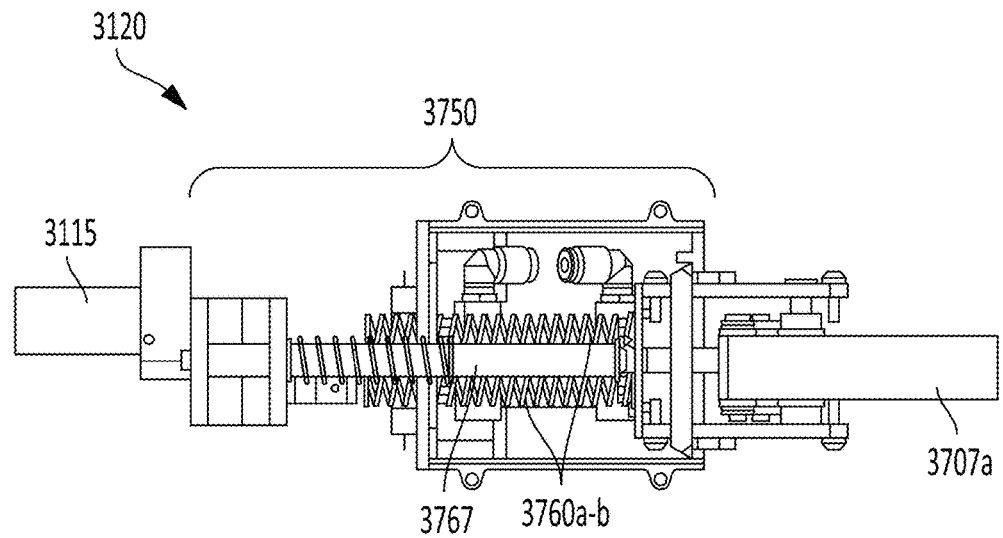
FIG. 43A depicts a side cut away view of an example wrist of the autonomous laundry separating and sorting device.
Figure 43B:
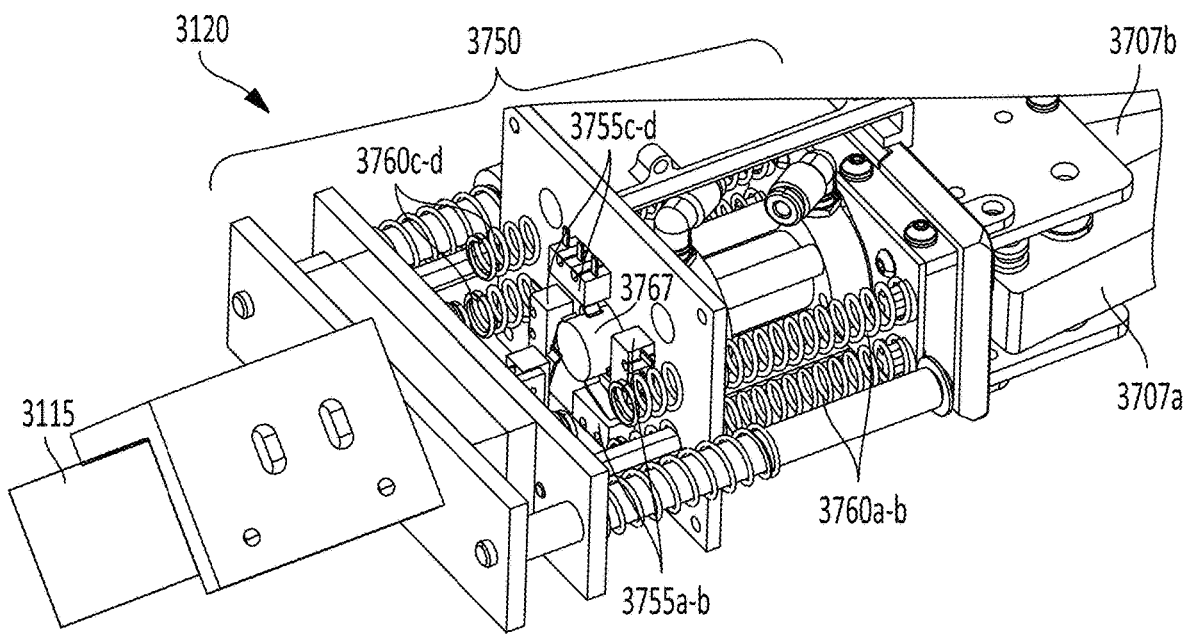
FIG. 43B depicts a back perspective cut away view of the wrist of FIG. 43A.
Figure 44:
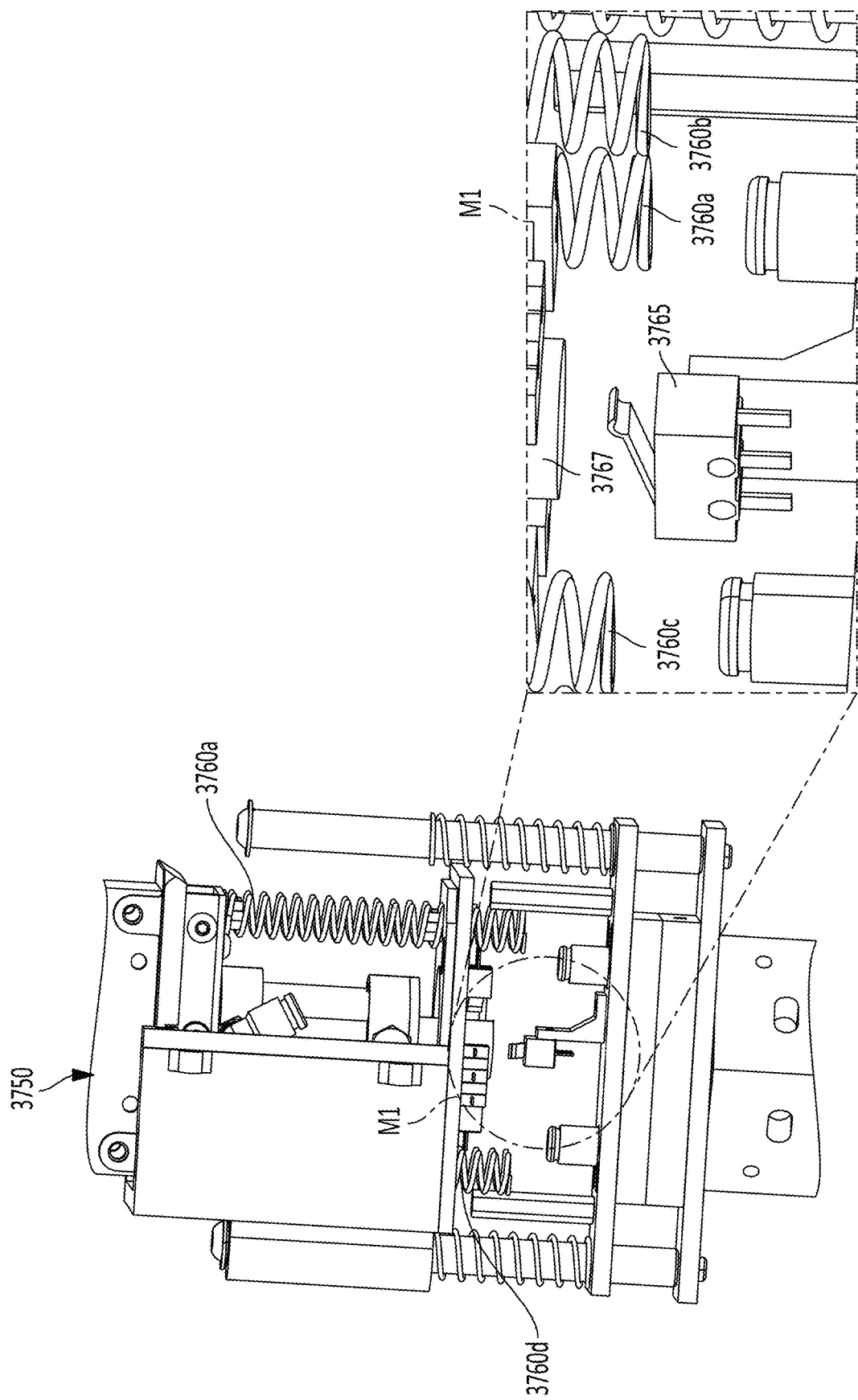
FIG. 44 depicts a side perspective cut away view and close up of a portion of the wrist of FIGS. 43A-B.

Turning to FIGS. 43A through 44 In implementations, the gripper 3120 further comprises a wrist 3750 comprising a plurality of sensors 3755*a-d*, 3765 configured to sense an application of force on the gripper 3120 as applied various directions including at least one of up and down, sided to side, and axially. The plurality of sensors 3755*a-d*, 3765 are configured to output a signal to the controller 3005. The wrist 3750 is disposed between the fingers 3707*a-b* and the arm 3115. In implementations, the wrist 3750 comprises a plurality of compression springs 3760*a-d* configured to flex and compress under an application of force and a rod 3767 configured to trip one or more limit switch sensors 3755*a-d*, 3760 under an application of a threshold force. For example, as shown in the magnified view M1 of FIG. 44, the rod 3767 can compress and trip one of the one or more limit switch sensors 3755*a-d*, 3765 under an application of force in a range of between about 4 to 5 pounds of force. Although the sensors are described as limit switches, in implementations, the plurality of sensors 3755*a-d*, 3765 can be one or more analog sensors configured to detect how much the terminal gripper has moved. In implementations, the sensor 3765 behind the rod 3767 is configured to detect if the gripper 3120 has hit the floor 3110 of the enclosed channel head on, thereby applying an axial force.

In implementations, the controller 3005 receives one or more signals from the plurality of sensors 3755*a-d*, 3765 and determines the application of a side-to-side force indicative of a deformable article being snagged on a first arm or terminal gripper while the terminal gripper of a subsequent arm of the plurality of arms grasps the article. In implementations, the controller 3005 receives one or more signals from the plurality of sensors 3755*a-d*, 3765 and determines the application of a threshold amount of axial force applied as the terminal gripper 3120 pushes against the floor 3110 of the channel 3100 to sweep up and grasp an article resting on the floor. For example, and article such as a thin silk scarf, may be smooth and comprises a low profile. The terminal gripper 3120 can comprise flexible fingers 3707*a-b* and be configured to accommodate being driven into the floor with a threshold amount of force (e.g., 1 lbf, 2 lbf, 3 lbf, e.g., 4.4N, 8.9N, 13.3N) while enabling the flexible fingers 3707*a-b* to be actuated in a grasping motion. In implementations, the controller 3005 receives one or more signals from the plurality of sensors 3755*a-d*, 3765 and determines the application of a threshold amount of axial force applied as the terminal gripper 3120 pushes against a pile of deformable articles to ensure the terminal gripper 3120 is positioned with the pile of deformable articles for successfully grasping at least one article.

Additionally or alternatively, as shown in FIG. 5, one or more sensors can include sensors 3176, 3176*a-c* disposed on or in one or more portions of the grippers 3120, 3120*a-c*. In implementations, the one or more sensors 3176, 3176*a-c* can include a finger torque and position sensor disposed on the gripper 3120 to sense when the fingers 3707*a-b* have closed. This allows the robot 3000 to operate quickly because the closed sensor can signal moving onto the next step. Additionally or alternatively, a force/torque sensor can be disposed on a wrist of a gripper 3120 to determine if the gripper has collided with anything, is pulling too hard on a deformable laundry article 12, or is tangled in the deformable laundry article 12. This sensor assists with pinching the fingers 3707*a-b* to grasp clothes off of a surface (e.g., the conveyor) by determining when contact is made with the surface. Additionally, a force/torque sensor can output a signal to the processor 3155 for estimating a weight of a deformable laundry article 12. Additionally or alternatively, one or more force/torque sensors can be disposed at a tilt axis driven by the arm tilt motor 3125*b-b"*. In implementations, a torque sensor can be disposed on or in a motor for the gripper 3120. Additionally or alternatively, in implementations, strain gauges can be disposed in the bases of the fingers 3707*a-b* (not fingertips). Additionally or alternatively, in implementations, a tension sensor can be disposed in-line with a cable for rotating and closing the fingers 3707*a-b*. In all implementations, a torque sensor could provide an output signal for determining whether or not the fingers 3707*a-b* of each gripper 3120 are engaged with a deformable laundry article 12. In other implementations, engagement can be detected by force/pressure sensors (not shown) disposed on the fingertips of the two or more fingers 3707*a-b*. The force/pressure sensor(s) can be one of the gripper sensor(s) 3176, 3176*a-c* configured to communicate a sensor signal to the controller 3005, as shown in FIG. 5.

Figure 45:
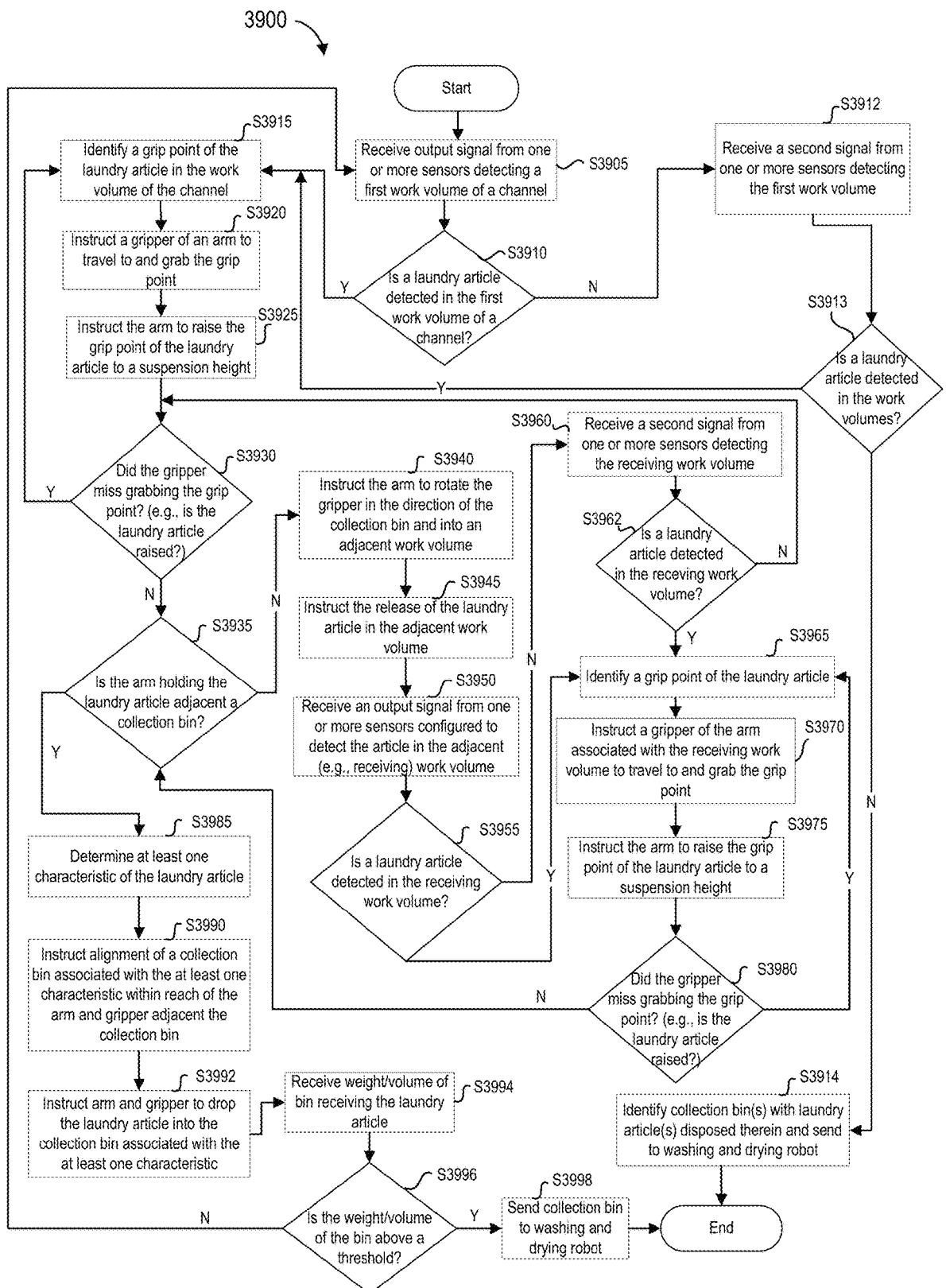
FIG. 45 depicts an implementation of a method of autonomously separating and sorting a load of dirty laundry with an autonomous separating and sorting device.

Referring now to FIG. 45, any of the examples and implementations described previously with regard to an autonomous separating and sorting device 3000 are applicable to implementations described herein with regard to a method 3900 of robotically separating and sorting a deformable article 12 (e.g., also referred to herein as a "deformable laundry article") from an amassed plurality of deformable articles 12*a-n*. Any of the methods described hereinafter applicable in combination with any and all of the processes, devices, and systems described previously with regard to implementations.

In implementations, a method 3900 of autonomously (e.g., robotically) sorting a plurality of deformable laundry articles 12*a-n* into loads for washing, comprises receiving S3905, at a controller, a signal from at least one sensor disposed at least one of on, adjacent to, and within at least one of a plurality of sequential work volumes within an enclosed channel, the signal being indicative of at least one of the plurality of deformable laundry articles being disposed within at least one of the plurality of sequential work volumes. In implementations, the at least one sensor is disposed in a first bay or work volume of a continuous, enclosed channel comprising a plurality of sequential work volumes. The method comprises determining S3910, based on the received signal, a location of the at least one of the plurality of deformable articles on a stationary floor of the associated one of the plurality of sequential work volumes.

At the start of the separating and sorting process, all of the at least one of the plurality of deformable articles are disposed in a first work volume of the enclosed channel. As described previously with regard to implementations, the plurality of sequential work volumes 3105*a-d* are constituent to an enclosed channel 3100 and the stationary floor 3110 of the enclosed channel 3100 extends between an inlet end I and an outlet end O of the enclosed channel. A portion of the stationary floor 3110 adjacent the inlet end I is configured to receive thereon the plurality of deformable laundry articles 12*a-n* when introduced into the channel 3100. If the controller 3005 determines, based on the received signal, that a laundry article is not detected, in implementations, the method comprises receiving S3912 a second signal from another of the at least one sensor. For example, in implementations, the first signal can be at least one of a 2D and 3D image and the second signal can be another at least one of a 2D and 3D image. In implementations, the first and/or second signal can be, for example as shown in FIG. 46, a 2D mask 3800 derived from an image of the floor 3110 of enclosed channel. The 2D mask comprises an outline of the peripheral edge of an article 12 disposed on the floor 3110. In implementations the first signal can include an IR greyscale image or RGB image of the floor 3110 and the second signal can include an IR greyscale image or RGB image of the article disposed on the floor. The controller can take an absolute difference in luminance value of the background image of the floor and the luminance value of the article to find an edge between the article and floor thereby creating a mask, or outline, of the article. Additionally or alternatively, in implementations, the controller 3005 receives the input signal of one or more sensors (e.g., one or more sensors 3140*a-c*, 3145*a-c*, 3147*a-c*), takes an absolute difference between the bits of background and running images, uses a threshold to make that difference image black and white, and then applies at least one of eroding and blurring to generate the final mask. This reduces potential errors caused by lighting differences.

The method comprises determining S3913 wherein at least one article 12 is detected in each of the work volumes. If no article is detected, the method concludes by sending a collection bin containing one or more separated and sorted deformable laundry articles 12 to one or more washing and drying robots 4000. If an article is detected in a work volume, the method comprises identifying S3915 a grip point on the article and instructing S3920 at least one drive of at least one of a plurality of arms 3115*a-c* disposed in series along the enclosed channel 3100 to at least one of rotate, tilt, extend, and retract a terminal gripper 3120 configured to selectively grasp at least one of the plurality of deformable laundry articles at the determined grip point. As described herein with regard to implementations, each one of the plurality of arms is associated with one of the plurality of sequential work volumes. The controller instructs an actuator of the terminal gripper to close on the at least one of the plurality of deformable laundry articles. The method comprises instructing the at least one drive to raise S3925 the closed terminal gripper and the grasped at least one of the plurality of deformable laundry articles to a hoist height above the stationary floor 3110, and move S3940 the gripper 3120 (e.g., at least one of pan, tilt, and extend, e.g., rotate) toward the outlet end O into an adjacent work volume 3105*b-d*. In implementations, the method comprises determining S3930 whether the gripper missed grasping the grip point and repeats the instructions of identifying S3915 a grip point, instructing the arm to pan, tilt, extend and/or retract the gripper to the grip point, instruct the gripper to grasp the grip point, and instruct the arm S3925 to raise the gripper and grasped article to a hoist height.

As described previously with regard to implementations, the method can comprise the controller 3005 executing a subroutine for a miss recovery if the controller 3005 determines the gripper has not grasped the article 12. In implementations, the miss recovery routine comprises moving the target grip point 15 inward from an detected edge of the one or more articles 12*a-n* by a distance in a range of between about 5-10 mm with each subsequent attempt after a missed grab (e.g., grasp by the gripper). Additionally or alternatively, in implementations, the controller 3005 can determine a center of mass of the mask of the at least one article 12 on the floor 3110 of the work volume and move the targeted grip point 15 from the outer most edge of the at least one article 12 toward the center of mass with each subsequent attempt after a missed grab.

In implementations, method comprises the controller 3005 selecting the alternate grip point locations randomly, or by iterating attempted grasps at alternate grip point locations in a deterministic manner. This ensures that the gripper 3120 will find a graspable portion of the article 12, accounting for any spacing between extensions and the core of a garment, such as between sleeves and the torso portions of a shirt, which may place a center of mass in an open location not occupied by the article 12. Additionally or alternatively, in implementations, the controller 3005 is configured to create a bounding box 3805 around the mask 3800 of the article 12 as shown in FIG. 46, the bounding box comprising a length LB and a width WB that places the mask 3800 inside the bounding box 3805. The controller 3005 is configured to choose a random point as the target grip point 15 based on the length LB and width WB of the bounding box, determine whether the grip point 15 is within the mask (e.g., grip point 15*b*) and not just within in the bounding box (e.g., 15*a*), and instruct a gripper 3120 to grasp the grip point 15*b* within the mask area corresponding to the location of the article 12. If the grip point was not within the mask 3800, the controller 3005 randomly selects a new target grip point with the bounding box 3805 and iteratively continues randomly selecting target grip points until a target point is within both the bounding box 3805 and the mask 3800. The randomness of determining a grip point 15 within the bounding box 3805 accounts for the difference in size between an end effector in software path planning (e.g., a single point) and the volume of the gripper 3120, which is a 3D element and not a single point, and results in successful grabs of the article 12 regardless of article size. This enables a gripper 3120 to grab very small items such as baby socks, for example. By comparison, targeting a center of mass could result in the joint at the base of the fingers of the gripper 3120 touching the floor 3110 of the channel 3100 and not reaching the article, even though the center of the gripper 3120 was directly above the given target point, such as an edge point of the small article or a point moved inward from an edge point toward a center of mass.

Additionally or alternatively, prior to instructing the at least one drive to move or rotate S3940 the arm toward the outlet end into an adjacent work volume, the method comprises determining 3935 whether the arm holding the article at the hoist height is adjacent a collection bin at an outlet end of the enclosed channel. If the arm is not adjacent the collection bin, the method comprises instructing S3945 the actuator of the terminal gripper to open the gripper to release the at least one of the plurality of deformable laundry articles in the adjacent work volume (e.g., the receiving work volume). The method comprises receiving S3950 a signal from at least one sensor in the receiving work volume of the plurality of sequential work volumes, and determining S3955, based on the received signal, a state comprising at least one of one or more of the plurality of deformable laundry articles are present on the stationary floor, and one or more of the plurality of deformable laundry articles are not present on the stationary floor.

If the controller determines, based on the received signal, that the laundry article is not detected, in implementations, the method comprises receiving S3960 a second signal from another of the at least one sensor. For example, in implementations, the first signal can be at least one of a 2D and 3D image and the second signal can be another at least one of a 2D and 3D image. In implementations, the second signal can be, for example as shown in FIG. 46, a 2D mask 3800 derived from an image of the floor 3110 of enclosed channel. The 2D mask comprises an outline of the peripheral edge of an article disposed on the floor 3110. In implementations the first signal can include an IR greyscale image or RGB image of the floor 3110 and the second signal can include an IR greyscale image or RGB image of the article disposed on the floor. The controller can take an absolute difference in luminance value of the background image of the floor and the luminance value of the article to find an edge between the article and floor thereby creating a mask, or outline, of the article. Additionally or alternatively, in implementations, the controller 3005 receives the input signal of one or more sensors (e.g., one or more sensors 3140*a-c*, 3145*a-c*, 3147*a-c*), takes an absolute difference between the bits of background and running images, uses a threshold to make that difference image black and white, and then applies at least one of eroding and blurring to generate the final mask. This reduces potential errors caused by lighting differences.

The method comprises determining S3962 whether the second signal indicates an article being detected in the receiving work volume. If any article is not detected, the method returns to determining S39390 whether the previous gripper missed the grab or potentially dropped the article prior to entering the receiving (adjacent) work volume. If the article is on the floor of the prior work volume, the method returns to identifying S3915 a grip point, instructing S3920 the gripper to travel to the grip point, and instructing S3925 the previous arm to hoisting the article.

If the article is determined S2962 to be in the receiving work volume, either detected from the signal of a first of the at least one sensor or a second signal of the at least one sensor, the method comprises identifying S3965 a grip point of the laundry article and instructing S3970 a gripper of the arm associated with the receiving work volume (e.g., the "adjacent work volume") to travel to and grasp the grip point. The method comprising instructing S3975 the arm to raise the article engaged in the gripper to a suspension height and confirm S3980 whether the laundry article is raised. If the article is not detected in the gripper at the hoist height, the method comprises repeating the steps of identifying S3965 a grip point of the laundry article, instructing S3970 a gripper of the arm associated with the receiving work volume to travel to and grasp the grip point, and instructing S3975 the arm to raise the article engaged in the gripper.

The method comprises determining 3980 whether the gripper missed grabbing the grip point. If the gripper missed, the method comprises executing a miss recovery subroutine as previously described. If the gripper did not miss, the method comprises determining 3935 whether the arm holding the article at the hoist height is adjacent a collection bin at an outlet end of the enclosed channel. If the arm is not adjacent the collection bin, the method iteratively repeats S3940-S3980 until the arm holding the article is the arm closes to the outlet orifice and collection bin. The method comprises determining S3985 at least one characteristic of the laundry article 12 and instructing S3990 alignment of a collection bin (e.g., sorting bin) associated with the at least one characteristic within reach of the arm and engage gripper. As described previously with regard to implementations, the collection bin can be one of a plurality of bins disposed on a carousel or load constructor in operable communication with the controller for shuffling bins beneath the channel for receiving separated articles into one or more bins containing articles of matching one or more washing and drying characteristics. The method comprises instructing S3992 the arm to rotate and the gripper to release the article into the collection bin associated with the at least one characteristic. The robot 3000 thus intelligently batches one or more articles into loads for washing and drying with appropriate collective washing and drying cycle parameters (e.g., water temperature, air temperature, cycle durations, agitation speed, etc.).

In implementations, the method comprises receiving a signal indicative of at least one of a weight and an occupied volume of the collection bin receiving the laundry article. The method comprises determining whether the at least one of weight and volume are above a threshold value. If at least one of the weight and volume exceeds a threshold, the method comprises sending S3998 the collection bin to a washing and drying robot 4000 for laundering.

In implementations, the method comprises stopping iterating the grasps, rotations, and releases when each one of the plurality of deformable laundry articles exits the enclosed channel through the outlet orifice as a solitary deformable article. In implementations, the method comprises instructing two or more of the plurality of arms to operate simultaneously within each associated one of the plurality of sequential work volumes. In implementations, the method comprises instructing terminal grippers of two or more of the plurality of arms operating simultaneously to simultaneously grasp at least one of the plurality of deformable articles. In implementations, the method comprises instructing the at least one drive of the arm with an engaged terminal gripper to move the terminal gripper in at least one of alternating side-to-side and alternating up and down motions to shake a grasped deformable article at the hoist height. In implementations, the method comprises receiving a contact sensor signal from at least one contact sensor on a gripping surface of the terminal gripper indicative of none of the plurality of deformable laundry articles being grasped in the terminal gripper at the hoist height. In implementations, rather than an engaged gripper releasing each article 12 on the floor 3110 of an adjacent work volume 3105 following a hoist, the gripper 3120 of an available arm 3115 in a receiving work volume 3105 can grip an edge of the article 12 (e.g., a lowest hanging point), hoist the gripped edge to the hoist height and the longest engaged gripper can release the article 12.

Figure 47:
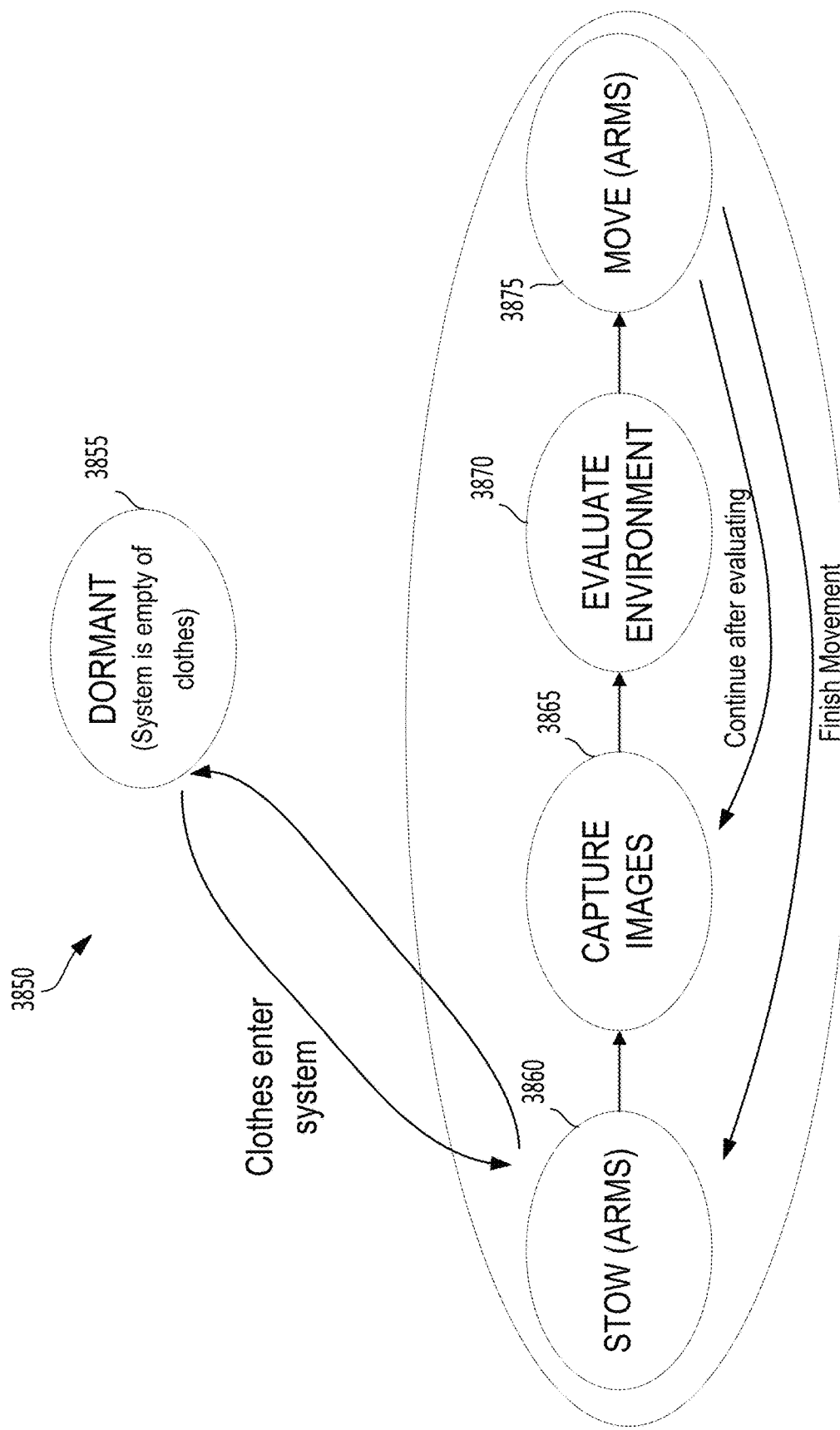
FIG. 47 depicts a state diagram of the autonomous laundry separating and sorting device.
Figure 48:
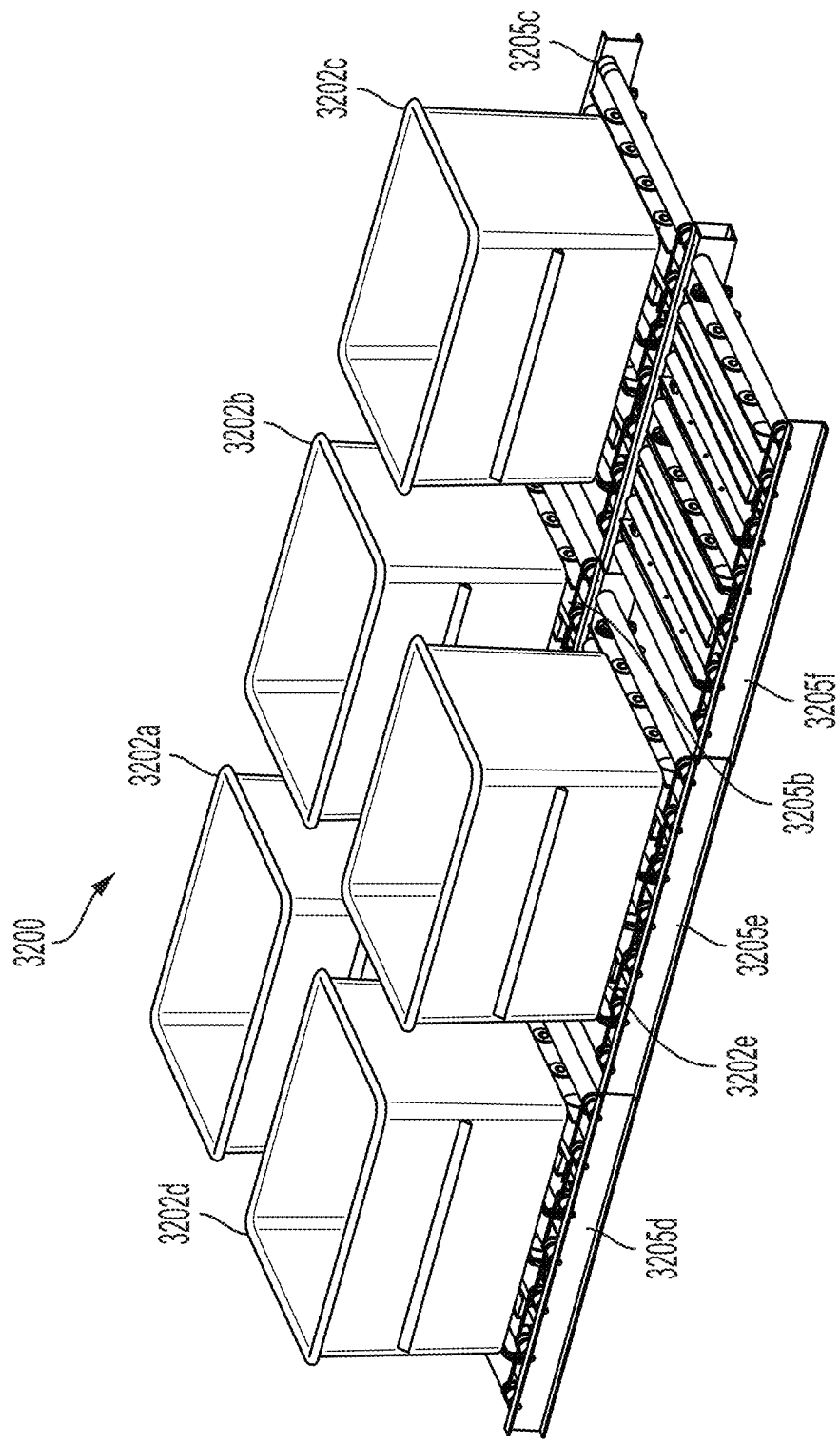
FIG. 48 depicts an implementation of a load constructor for identifying and aligning designated bins with an outlet orifice of the separating and sorting device.
Figure 49:
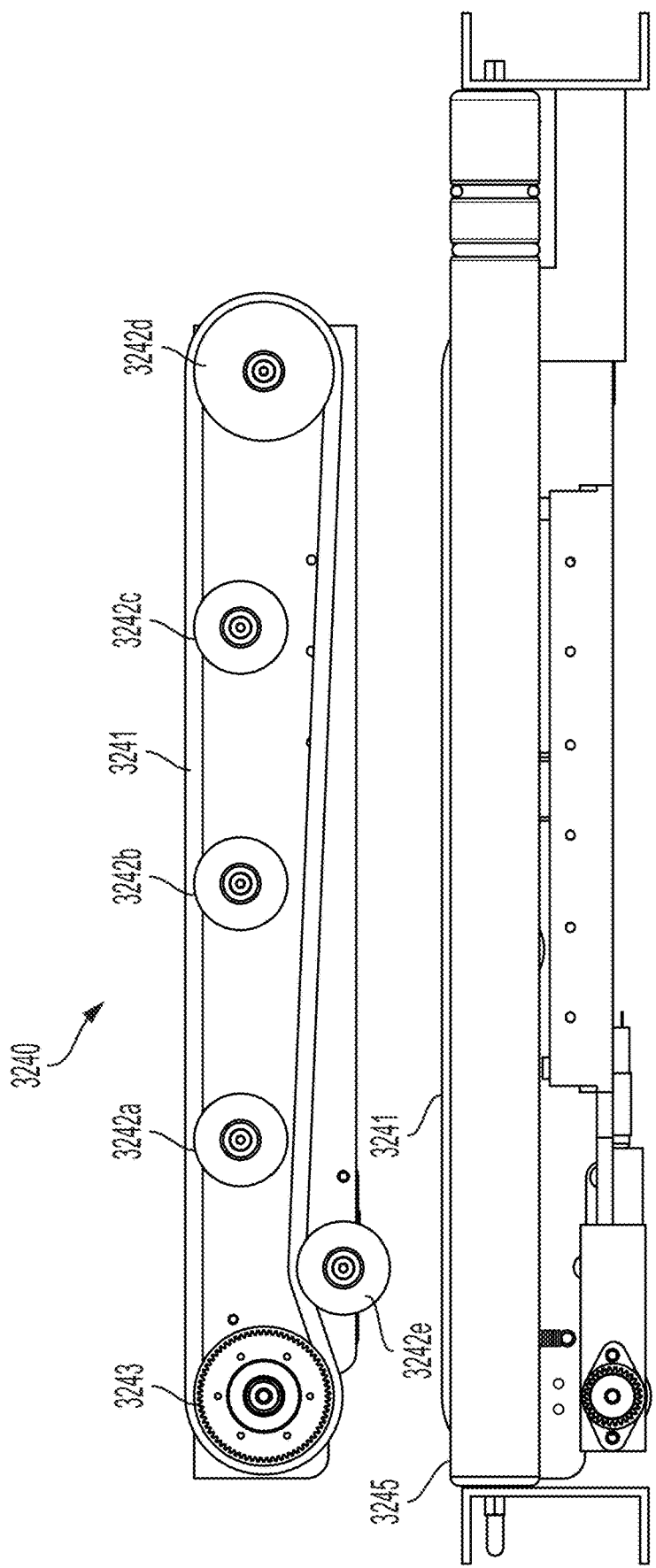
FIG. 49 depicts an exploded view of a portion of the load constructor of FIG. 48 showing a pop up transfer roller assembly raised above a drive roller.

As depicted in FIG. 47, the separating and sorting device 3000 is a state machine that operates based on a current state of the enclosed channel. Between runs of processing loads of one or more deformable articles, the enclosed channel 3100 and the plurality of arms 3115*a-c* therein are in a dormant state 3855, the channel 3100 being devoid of any articles. Once a load of dirty one or more articles 12*a-n* enter the channel 3100, the arms 3115*a-c* are in a stowed position 3860 at rest. The device 3000 captures images 3865, evaluates 3870 the environment of the channel 3100 and based on a state of the one or more articles 12*a-n* within the channel 3100, moves the arms 3875 to action as described previously with regard to implementations. The device 3000 iteratively cycles through the states of capturing images 3865, evaluating 3870 the environment, and moving the arms 3115*a-c* until all of the one or more articles 12*a-n* are sorted out of the channel 3100. The arms 3115*a-c* then resume their stowed state 3860 and the device 3000 again is in a dormant state 3855 awaiting at least one of cleaning and receiving a next load of one or more deformable articles 12*a'-n'*.

All of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors or circuitry or collection of circuits, e.g., a module) that executes program instructions or modules stored in a memory or other non-transitory computer-readable storage medium. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

Although the subject matter contained herein has been described in detail for the purpose of illustration, it is to be understood that such detail is solely for that purpose and that the present disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

Other examples are within the scope and spirit of the description and claims. Additionally, certain functions described above can be implemented using software, hardware, firmware, hardwiring, or combinations of any of these. Features implementing functions can also be physically located at various positions, including being distributed such that portions of functions are implemented at different physical locations.

What is claimed is:

1. A system for autonomously batching a plurality of separated laundry articles into two or more sorted loads for washing, comprising:
    a plurality of collection bins each configured to receive a sorted load of two or more articles of the plurality of separated laundry articles comprising at least one common one of one or more washing and drying characteristics;
    a plurality of conveyors configured to receive thereon the plurality of collection bins and position one bin of the plurality of collection bins into a loading position adjacent to an exit orifice of a sorting surface;
    at least one sensor configured to detect the one or more washing and drying characteristics of each of the plurality of separated laundry articles; and
    at least one controller in operable communication with a drive of the plurality of conveyors and the at least one sensor configured to
        identify, based on a received output signal of the at least one sensor, one or more washing and drying characteristics of each individual laundry article of the plurality of separated laundry articles, and
        instruct one or more of the plurality of conveyors to at least one of: move a collection bin of the plurality of collection bins into the loading position and determine a collection bin positioned in the loading position is configured to receive an article of the detected one or more washing and drying characteristics.

2. The system of claim 1, wherein the plurality of conveyors are configured to hold one fewer bin than a number of available conveyor spaces such that a gap enables free flowing movement of the plurality of collection bins across the plurality of conveyors.

3. The system of claim 1, wherein the plurality of conveyors are configured to move each one of the plurality of collection bins toward and away from the exit orifice and side to side beneath the sorting surface.

4. The system of claim 1, wherein the at least one controller is configured to identify a bin of the plurality of collection bins configured to receive a sorted load comprising the detected one or more washing and drying characteristics and instruct the plurality of conveyors to move the identified bin adjacent the exit orifice.

5. The system of claim 4, wherein the plurality of conveyors comprises a plurality of position sensors configured to detect a passage of a collection bin thereacross and wherein the at least one controller, based on receiving signals from the plurality of position sensors, is configured to determine a position of each one of the plurality of collection bins disposed on the plurality of conveyors.

6. The system of claim 1, wherein each one of the plurality of collection bins comprises an identification marker for associating an identity of each bin.

7. The system of claim 6, further comprising a memory in communication with the at least one controller configured to store at least one relation including one of the one or more washing and drying characteristics associated with each one of the plurality of collection bins, the identification marker for each one of the plurality of collection bins, and a customer identity shared by the plurality of separated laundry articles received onto the sorting surface.

8. The system of claim 7, wherein the at least one sensor comprises at least one of a 3-D camera, an IR sensor, a 2-D camera, LIDAR, LADAR, a sonar proximity sensor, an ultrasonic ranging sensor, a radar sensor, a pair of stereo depth cameras, a colorimeter and a spectrometer.

9. The system of claim 7, wherein the memory further comprises a neural network and determining the one or more washing and drying characteristics of each one of the plurality of separated laundry articles includes processing the received output signal of the at least one sensor with a neural network classifier.

10. The system of claim 6, wherein the identification marker comprises at least one of a machine-readable serial number, a bar code, a machine-readable QR code, an RFID code, NFC tag, a WIFI enabled tag, a ZIGBEE enabled tag, and an active radio telemetry system.

11. The system of claim 1, wherein the at least one common one of the one or more washing and drying characteristics comprises at least one of laundry article color, size, material composition, article type, degree of dirtiness, and fabric heat tolerance.

12. The system of claim 1, wherein the at least one sensor further comprises at least one fill sensor in communication with the at least one controller, the at least one fill sensor being configured to detect an occupied volume of each one of the plurality of collection bins.

13. The system of claim 12, wherein the at least one fill sensor comprises at least one of an optical sensor and a weight sensor disposed beneath the plurality of conveyors.

14. The system of claim 12, wherein, upon determining a volume of one of the plurality of collection bins is filled, the at least one controller is further configured to instruct the plurality of conveyors to unload the filled one of the plurality of collection bins to an autonomous combination washing and drying machine.

15. The system of claim 12, wherein each one of the plurality of conveyors is configured to move rapidly in opposite directions to shake a collection bin disposed thereon and settle one or more of the plurality of separated laundry articles batched therein from a pyramid geometry to a more uniform height across a length and width of the collection bin.

16. The system of claim 12, further comprising one or more plungers configured to push a just loaded laundry article into a collection bin and compress a peak of any pyramid shaped of one or more articles disposed within a collection bin.

17. The system of claim 1, wherein
the sorting surface comprises a floor of an enclosed channel of a separating and sorting device comprising a plurality of sequentially positioned sorting arms comprising terminal grippers,
a terminal sorting arm of the plurality of sequentially positioned sorting arms releases a separated laundry article of a plurality of laundry articles through the exit orifice, and
the plurality of conveyors are disposed below the sorting surface.

18. The system of claim 17, wherein the enclosed channel comprises an inlet orifice through which the plurality of laundry articles are received in a pile adjacent a first one of the plurality of sequentially positioned sorting arms and the exit orifice through which a gripper of the terminal sorting arm releases a separated laundry article.

19. The system of claim 17, wherein the at least one sensor is disposed at least one of on, adjacent to, and within the sorting surface, the at least one sensor further being configured to
detect at least one of a presence and a location of at least one laundry article of the plurality of laundry articles on the sorting surface and one or more washing and drying characteristics of the at least one laundry article, and
output a signal indicative of at least one of the presence, the location, and the one or more washing and drying characteristics to the at least one controller.

20. The system of claim 19, wherein, upon receiving an output signal indicative of none of the plurality of laundry articles remaining on the sorting surface, the at least one controller is further configured to instruct an actuator of the plurality of conveyors to transit one or more of the plurality of collection bins containing one or more batches of the plurality of separated laundry articles to one or more autonomous combination washing and drying machines.

21. The system of claim 20, wherein the at least one controller is configured to determine whether to combine contents of one or more of the plurality of collection bins in a single wash load based on one or more characteristics of one or more separated laundry articles disposed in each bin and at least one of a fill volume and weight of each bin.

22. The system of claim 1, wherein the plurality of separated laundry articles comprises one or more loads of dirty household laundry.

23. The system of claim 22, wherein the plurality of separated laundry articles comprises two or more article types of at least one of different sizes, different shapes, different colors, and different fabrics.

* * * * *